(12) United States Patent
Kiyama et al.

(10) Patent No.: US 12,007,678 B2
(45) Date of Patent: Jun. 11, 2024

(54) PROJECTION SYSTEM AND PROJECTOR WITH FIRST OPTICAL SYSTEM AND SECOND OPTICAL SYSTEM

(71) Applicant: SEIKO EPSON CORPORATION, Tokyo (JP)

(72) Inventors: Yasuyuki Kiyama, Suwa (JP); Hitoshi Hirano, Suwa (JP); Nobutaka Minefuji, Omachi (JP); Koji Shiokawa, Suzaka (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/560,384

(22) Filed: Dec. 23, 2021

(65) Prior Publication Data

US 2022/0206252 A1 Jun. 30, 2022

(30) Foreign Application Priority Data

Dec. 24, 2020 (JP) ................. 2020-214690

(51) Int. Cl.
*G03B 21/28* (2006.01)
*G02B 9/10* (2006.01)
*G02B 13/16* (2006.01)

(52) U.S. Cl.
CPC ............. *G03B 21/28* (2013.01); *G02B 9/10* (2013.01); *G02B 13/16* (2013.01)

(58) Field of Classification Search
CPC .......... G03B 21/28; G02B 9/10; G02B 13/16; G02B 9/64
See application file for complete search history.

(56) References Cited

U.S. PATENT DOCUMENTS

| 7,009,765 | B2 | 3/2006 | Gohman |
| 7,549,755 | B2 | 6/2009 | Suzuki |
| 10,317,786 | B2 * | 6/2019 | Masui ............... G02B 27/0081 |
| 10,539,766 | B2 * | 1/2020 | Shiokawa ............. G02B 13/06 |
| 10,816,777 | B2 | 10/2020 | Amano |
| 10,845,695 | B2 * | 11/2020 | Masui ................... G02B 13/16 |
| 10,890,691 | B2 | 1/2021 | Amano |

(Continued)

FOREIGN PATENT DOCUMENTS

| JP | 2006-235516 A | 9/2006 |
| JP | 2006-523318 A | 10/2006 |

(Continued)

*Primary Examiner* — Bao-Luan Q Le
(74) *Attorney, Agent, or Firm* — Oliff PLC

(57) ABSTRACT

A projection system includes a first optical system and a second optical system. The second optical system includes a first lens group disposed on an enlargement side of an intersection position where a chief ray of an off-axis beam having a maximum angle of view intersects with an optical axis of the projection system in the second optical system, a second lens group disposed on the reduction side of the intersection position and having negative power, and a third lens group disposed on the reduction side of the second lens group and having positive power. The second lens group includes a first lens having positive power, a second lens disposed on the reduction side of the first lens and having positive power, and a third lens disposed on the reduction side of the second lens and having negative power. The third lens group includes two lenses each having positive power.

13 Claims, 23 Drawing Sheets

(56) References Cited

U.S. PATENT DOCUMENTS

| | | | |
|---|---|---|---|
| 11,378,880 B2* | 7/2022 | Masui | G02B 17/008 |
| 2004/0032653 A1 | 2/2004 | Gohman | |
| 2004/0233394 A1* | 11/2004 | Gohman | G03B 21/28 |
| | | | 348/E5.143 |
| 2004/0257539 A1* | 12/2004 | Peterson | G02B 13/16 |
| | | | 353/69 |
| 2006/0193036 A1 | 8/2006 | Suzuki | |
| 2016/0246034 A1* | 8/2016 | Amano | G02B 13/06 |
| 2016/0246037 A1* | 8/2016 | Amano | G02B 13/06 |
| 2017/0343778 A1 | 11/2017 | Amano | |
| 2018/0059380 A1* | 3/2018 | Nagatoshi | G02B 13/16 |
| 2018/0164554 A1* | 6/2018 | Shiokawa | G02B 13/16 |
| 2018/0307041 A1* | 10/2018 | Masui | G02B 13/16 |
| 2019/0056534 A1 | 2/2019 | Amano | |
| 2019/0129285 A1* | 5/2019 | Masui | G02B 13/22 |
| 2019/0250495 A1* | 8/2019 | Masui | G02B 13/06 |
| 2019/0302601 A1* | 10/2019 | Nagatoshi | G02B 9/64 |
| 2020/0033702 A1* | 1/2020 | Inoue | G02B 27/286 |
| 2020/0033712 A1* | 1/2020 | Inoue | H04N 9/3194 |
| 2020/0249450 A1 | 8/2020 | Okubo et al. | |
| 2020/0319376 A1* | 10/2020 | Nakano | G02B 1/115 |
| 2021/0003913 A1* | 1/2021 | Masui | G02B 13/18 |
| 2021/0026229 A1* | 1/2021 | Masui | G02B 13/06 |
| 2021/0063709 A1* | 3/2021 | Nagatoshi | G02B 27/0025 |
| 2021/0063710 A1* | 3/2021 | Nagatoshi | G02B 15/02 |

FOREIGN PATENT DOCUMENTS

| | | |
|---|---|---|
| JP | 2007-147970 A | 6/2007 |
| JP | 2017-211480 A | 11/2017 |
| JP | 2018-097046 A | 6/2018 |
| JP | 2019-035871 A | 3/2019 |
| JP | 2020-126188 A | 8/2020 |
| WO | 2020/045559 A1 | 3/2020 |

* cited by examiner

PROJECTION SYSTEM AND PROJECTOR WITH FIRST OPTICAL SYSTEM AND SECOND OPTICAL SYSTEM

The present application is based on, and claims priority from JP Application Serial Number 2020-214690, filed Dec. 24, 2020, the disclosure of which is hereby incorporated by reference herein in its entirety.

BACKGROUND

1. Technical Field

The present disclosure relates to a projection system and a projector.

2. Related Art

JP-A-2018-97046 describes a projection system incorporated in a projector. The projection system described in JP-A-2018-97046 includes a first optical system having positive power and a second optical system having negative power. The second optical system is disposed on the reduction side of the first optical system. An intermediate image conjugate with the enlargement-side conjugate plane and the reduction-side conjugate plane of the projection system is formed between the first optical system and the second optical system. An aperture is disposed in the second optical system. The aperture is provided in an intersection position where the chief ray of an off-axis beam having a maximum angle of view and the optical axis of the projection system intersect with each other in the second optical system. In the second optical system, the lens group on the reduction side of and adjacent to the aperture includes a lens having positive power and a lens having negative power arranged in this order from the side facing the aperture toward the reduction side.

The projection system according to JP-A-2018-97046, however, has a problem of a tendency to cause a decrease in resolution performance because the lens group located on the reduction side of the intersection position affects the resolution performance. For example, a single lens having positive power and adjacent to the intersection position has a large impact on the resolution performance, and the larger the power of the lens, the larger the aberrations produced due to errors in the manufacturing of the lens, resulting in a decrease in the resolution performance.

SUMMARY

To solve the problem described above, a projection system according to an aspect of the present disclosure includes a first optical system having positive power and a second optical system disposed on a reduction side of the first optical system and having negative power. An intermediate image conjugate with an enlargement-side conjugate plane and a reduction-side conjugate plane of the projection system is formed between the first optical system and the second optical system. The second optical system includes a first lens group disposed on the enlargement side of a first intersection position where a chief ray of an off-axis beam having a maximum angle of view intersects with an optical axis of the projection system in the second optical system, a second lens group disposed on the reduction side of the first intersection position and having negative power, and a third lens group disposed on the reduction side of the second lens group and having positive power. The second lens group includes a first lens having positive power, a second lens disposed on the reduction side of the first lens and having positive power, and a third lens disposed on the reduction side of the second lens and having negative power. The third lens group includes two lenses each having positive power.

A projector according to another aspect of the present disclosure includes a light modulator that modulates light outputted from a light source and the projection system described above that projects the light modulated by the light modulator.

DESCRIPTION OF EXEMPLARY EMBODIMENTS

A projection system and a projector according to an embodiment of the present disclosure will be described below with reference to the drawings.

Projector

Figure 1:
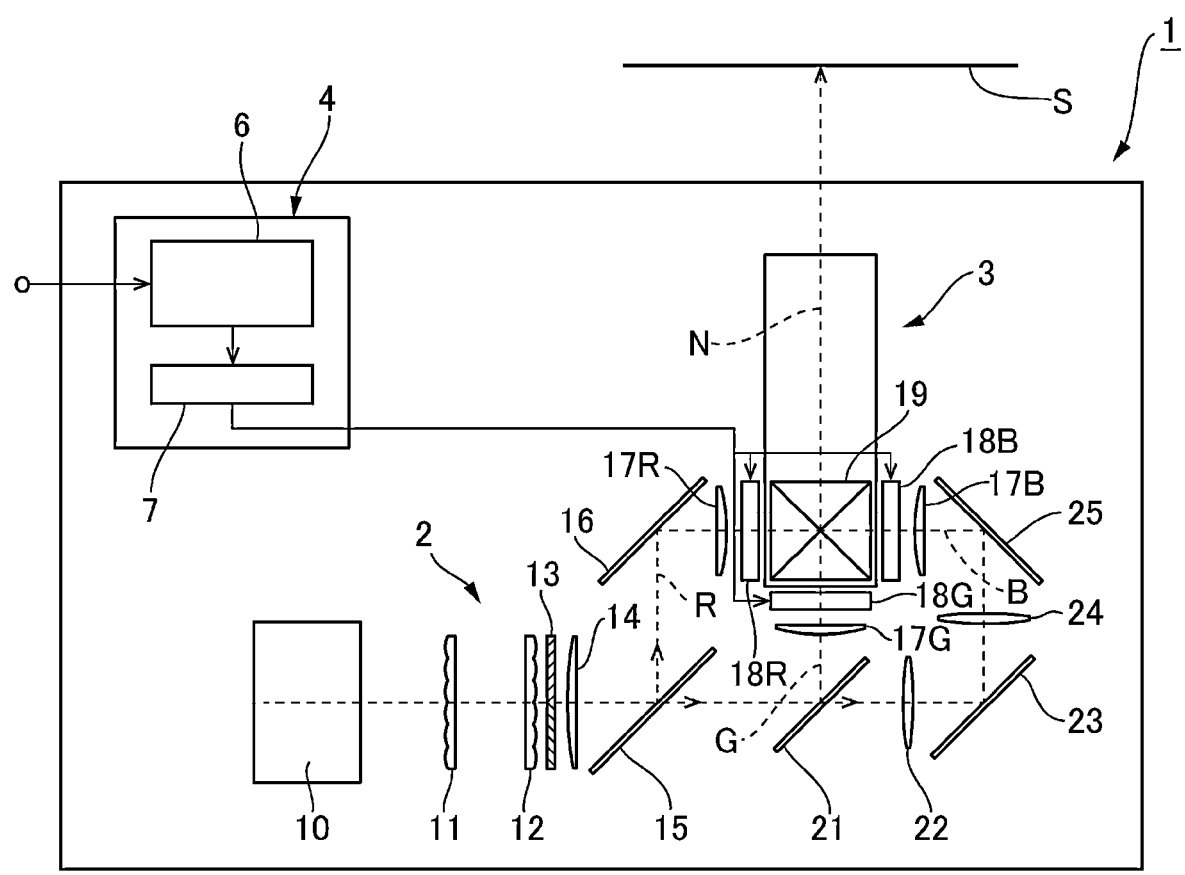
FIG. 1 shows a schematic configuration of a projector including a projection system according to the present disclosure.

FIG. 1 shows a schematic configuration of a projector including a projection system 3 of the present disclosure. A projector 1 includes an image formation section 2, which generates a projection image to be projected on a screen S, the projection system 3, which enlarges the projection image and projects the enlarged image on the screen S, and a controller 4, which controls the action of the image formation section 2, as shown in FIG. 1.

Image Formation Section and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the luminous flux from the light source 10 into a plurality of luminous fluxes. The lens elements of the first optical integration lens 11 focus the luminous flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the beam incident via the superimposing lens 14, and transmits G light and B light, which are part of the beam incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the beam via the first dichroic mirror 15, and transmits the B light, which is part of the beam via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround the cross dichroic prism 19 in such away that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The optical system 3 magnifies and projects the combined projection image combined by the cross dichroic prism 19 on the screen S.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts an image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

The projection system 3 will next be described. Examples 1 to 7 will be described below as examples of the configuration of the projection system 3 incorporated in the projector 1. In the beam diagrams of the projection systems according to Examples 1 to 7, the liquid crystal panels 18R, 18G, and 18B are referred to as liquid crystal panels 18.

Example 1

Figure 2:
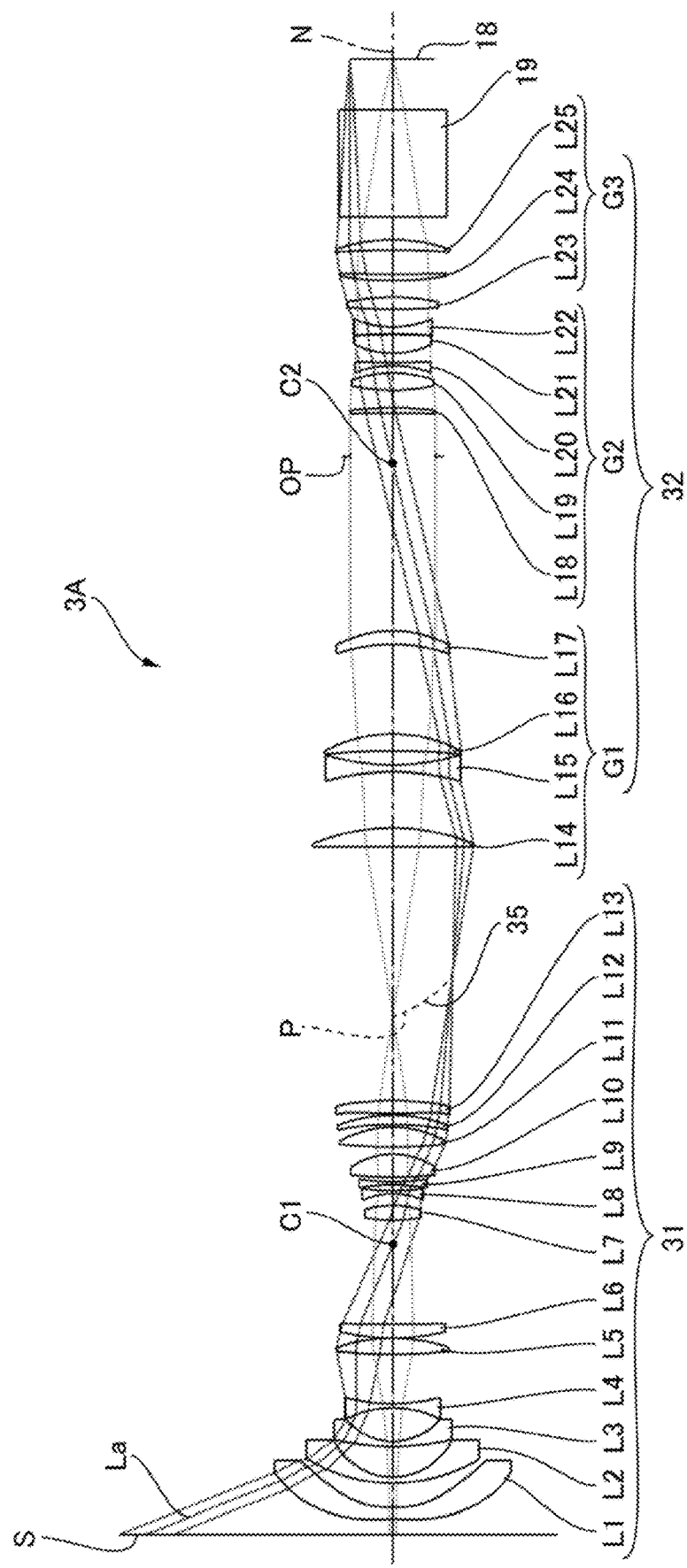
FIG. 2 is a beam diagram of a projection system according to Example 1.

FIG. 2 is a beam diagram of a projection system 3A according to Example 1. The projection system 3A includes a first optical system 31 and a second optical system 32 disposed on the reduction side of the first optical system 31, as shown in FIG. 2. The first optical system 31 has positive power. The second optical system 32 has negative power. An intermediate image 35 conjugate with the reduction-side conjugate plane and the enlargement-side conjugate plane of the projection system 3A is formed between the first optical system 31 and the second optical system 32. In the projector 1, the liquid crystal panels 18 are disposed in the reduction-side conjugate plane of the projection system 3A. The screen S is disposed in the enlargement-side conjugate plane of the projection system 3A.

The first optical system 31 includes 13 lenses L1 to L13. The lenses L1 to L13 are arranged in this order from the enlargement side toward the reduction side. The lens L1 is an aspheric lens having aspheric surfaces on opposite sides. The lens L2 has a meniscus shape having a convex surface on the enlargement side. The lens L3 has a meniscus shape having a convex surface on the enlargement side. The lens L4 has concave surfaces on the enlargement and reduction sides. The lenses L1, L2, L3, and L4 all have negative power. The lens L5 has convex surfaces on the enlargement and reduction sides. The lens L6 (sixth lens) has a meniscus shape having a convex surface on the enlargement side. The lenses L5 and L6 each have positive power.

The lens L7 has convex surfaces on the enlargement and reduction sides. The lens L7 has positive power. The lens L8 has concave surfaces on the enlargement and reduction sides. The lens L8 has negative power. The lens L9 has concave surfaces on the enlargement and reduction sides. The lens L9 has negative power. The lens L10 has convex surfaces on the enlargement and reduction sides. The lens L10 has positive power. The lens L11 has convex surfaces on the enlargement and reduction sides. The lens L11 has positive power. The lens L12 has a meniscus shape having a concave surface on the enlargement side. The lens L12 has positive power. The lens L13 (fourth lens) has convex surfaces on the enlargement and reduction sides. The lens L13 has positive power.

In the first optical system 31, there is an intersection position C1 (in-first-optical-system intersection position), which is located between the lens L6 and lens L7 and where a chief ray La of an off-axis beam having a maximum angle of view intersects with an optical axis N.

The second optical system 32 accommodates an aperture OP. In the present example, the aperture OP is disposed in an intersection position C2 (in-second-optical-system intersection position), where the chief ray La of the off-axis beam having the maximum angle of view intersects with the optical axis N in the second optical system 32. The second optical system 32 includes a first lens group G1 disposed on the enlargement side of the intersection position C2, a second lens group G2 disposed on the reduction side of the intersection position C2, and a third lens group G3 disposed on the reduction side of the second lens group G2. In more detail, the second lens group G2 is disposed in a position on the reduction side of and adjacent to the intersection position C2.

The first lens group G1 includes a lens L14 (fifth lens), a lens L15, a lens L16, and a lens L17 arranged sequentially from the enlargement side toward the reduction side. The lens L14 has a convex surface on the reduction side. The lens L14 has positive power. The lens L15 has concave surfaces on the enlargement and reduction sides. The lens L15 has negative power. The lens L16 has a meniscus shape having a concave surface on the enlargement side. The lens L16 has positive power. The lens L17 has a meniscus shape having a concave surface on the enlargement side. The lens L17 has positive power.

The second lens group G2 includes a lens L18 (first lens), a lens L19 (second lens), a lens L20 (third lens), a lens L21, and a lens L22 arranged sequentially from the enlargement side toward the reduction side. The number of lenses of the second lens group G2 is five.

The lens L18 has a meniscus shape having a concave surface on the enlargement side. The lens L19 has convex surfaces on the enlargement and reduction sides. The lenses L18 and L19 both have positive power. The lens L20 has concave surfaces on the enlargement and reduction sides. The lens L20 has negative power. The lens L21 has convex surfaces on the enlargement and reduction sides. The lens L21 has positive power. The lens L22 has concave surfaces on the enlargement and reduction sides. The lens L22 has negative power.

The third lens group G3 is located between the second lens group G2 and the cross dichroic prism 19. The third lens group G3 includes a lens L23, a lens L24 (eighth lens), and a lens L25 (seventh lens) arranged sequentially from the enlargement side toward the reduction side. The number of lenses that form the third lens group G3 is three. The sum of the number of lenses of the second lens group G2 and the number of lenses of the third lens group G3 is therefore eight.

The lens L23 has convex surfaces on the enlargement and reduction sides. The lens L24 has a meniscus shape having a convex surface on the enlargement side. The lens L25 has a meniscus shape having a concave surface on the enlargement side. The lens L25 is located in a position closest to the reduction side in the second optical system 32. The lenses L23, L24, and L25 all have positive power.

The liquid crystal panels 18 form images on one side of the optical axis N. The intermediate image 35 is formed on the other side of the optical axis N. The enlarged image is formed on the one side of the optical axis N.

The chief ray La of the off-axis beam having the maximum angle of view, which passes through the space between the lens L13 of the first optical system 31 and the lens L14 of the second optical system 32, which are lenses located on opposite sides of the intermediate image 35 in the direction of the optical axis N, approaches the optical axis N as the chief ray La travels from the reduction side toward the enlargement side, as shown in FIG. 2. A focal position P, where the off-axis beam is brought into focus in the intermediate image 35, approaches the lens L14 of the second optical system 32 as the focal position P is separate away from the optical axis.

Data on the projection system 3A according to Example 1 are listed below,

| | |
|---|---|
| f0 | −11.10 mm |
| FNo | 2.19 |
| Φ | 56.40 mm |
| BF | 93.75 mm |
| fLU1 | 16.06 mm |
| fLU2 | −1384.59 mm | where f0 represents the focal length of the entire projection system 3A, FNo represents the F-number, Φ represents the effective image circle diameter, BF represents the back focal length in air, fLU1 represents the focal length of the first optical system 31, and fLU2 represents the focal length of the second optical system 32.

Data on the lenses of the projection system 3A are listed below. The surfaces of the lenses are numbered sequentially from the enlargement side toward the reduction side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspheric surface has a surface number followed by *. Reference character R represents the radius of curvature. Reference character D represents the on-axis inter-surface distance. Reference character nd represents the refractive index. Reference character vd represents the Abbe number. Reference character f represents the focal length of the lens and is a normalized value resulting from division of the focal length by the focal length f0 of the entire projection system 3A. Reference characters R and D are expressed in millimeters.

| Reference character | Surface number | r | d | nd | vd | f |
|---|---|---|---|---|---|---|
| S | 0 | Infinity | 1507.00 | | | |
| L1 | 1* | −150.419 | 7.50 | 1.50919 | 56.32 | 13.27 |
| | 2* | 153.318 | 15.74 | | | |
| L2 | 3 | 108.006 | 3.94 | 1.83481 | 42.74 | 7.88 |
| | 4 | 42.953 | 19.96 | | | |
| L3 | 5 | 170.621 | 3.26 | 1.83481 | 42.74 | 5.68 |
| | 6 | 39.995 | 21.81 | | | |
| L4 | 7 | −68.348 | 2.86 | 1.49700 | 81.61 | 8.01 |
| | 8 | 127.868 | 32.05 | | | |
| L5 | 9 | 343.939 | 10.41 | 1.88300 | 40.81 | −8.87 |
| | 10 | −115.543 | 0.10 | | | |
| L6 | 11 | 140.120 | 9.13 | 1.88300 | 40.81 | −15.67 |
| | 12 | 1471.152 | 67.17 | | | |

-continued

| Reference character | Surface number | r | d | nd | vd | f |
|---|---|---|---|---|---|---|
| L7 | 13 | 102.439 | 9.73 | 1.61800 | 63.40 | −5.86 |
|  | 14 | −64.102 | 7.61 |  |  |  |
| L8 | 15 | −46.476 | 2.05 | 1.73800 | 32.33 | 4.36 |
|  | 16 | 160.859 | 3.82 |  |  |  |
| L9 | 17 | −122.314 | 2.02 | 1.86966 | 20.02 | 7.25 |
|  | 18 | 168.799 | 2.94 |  |  |  |
| L10 | 19 | 345.451 | 14.93 | 1.49700 | 81.61 | −7.95 |
|  | 20 | −49.673 | 4.62 |  |  |  |
| L11 | 21 | 326.911 | 12.92 | 1.43700 | 95.10 | −12.09 |
|  | 22 | −70.798 | 1.69 |  |  |  |
| L12 | 23 | −187.747 | 6.32 | 1.43700 | 95.10 | −41.36 |
|  | 24 | −98.076 | 1.16 |  |  |  |
| L13 | 25* | 3527.093 | 8.19 | 1.58699 | 59.48 | −17.68 |
|  | 26* | −119.394 | 164.71 |  |  |  |
| L14 | 27 | Infinity | 12.45 | 1.83481 | 42.72 | −14.60 |
|  | 28 | −135.950 | 36.16 |  |  |  |
| L15 | 29 | −174.660 | 4.39 | 1.73800 | 32.33 | 9.65 |
|  | 30 | 147.713 | 9.21 |  |  |  |
| L16 | 31 | −458.416 | 11.04 | 1.83481 | 42.72 | −12.45 |
|  | 32 | −93.557 | 58.22 |  |  |  |
| L17 | 33 | −114.611 | 8.96 | 1.43700 | 95.10 | −43.94 |
|  | 34 | −76.366 | 113.25 |  |  |  |
| OP | 35 | Infinity | 28.00 |  |  |  |
| L18 | 36 | −2454.824 | 3.42 | 1.48749 | 70.24 | −45.05 |
|  | 37 | −222.448 | 11.51 |  |  |  |
| L19 | 38 | 128.440 | 11.28 | 1.43700 | 95.10 | −10.28 |
|  | 39 | −79.575 | 4.72 |  |  |  |
| L20 | 40 | −71.701 | 2.00 | 1.73800 | 32.33 | 8.70 |
|  | 41 | 860.000 | 6.02 |  |  |  |
| L21 | 42 | 57.277 | 12.18 | 1.43700 | 95.10 | −11.78 |
|  | 43 | −372.690 | 0.45 |  |  |  |
| L22 | 44 | −285.811 | 4.71 | 1.73800 | 32.33 | 6.71 |
|  | 45 | 69.140 | 11.40 |  |  |  |
| L23 | 46 | 513.693 | 7.86 | 1.43700 | 95.10 | −23.39 |
|  | 47 | −145.300 | 10.80 |  |  |  |
| L24 | 48 | 206.867 | 4.02 | 1.86966 | 20.02 | −26.03 |
|  | 49 | 1107.683 | 15.44 |  |  |  |
| L25 | 50 | −518.953 | 6.68 | 1.86966 | 20.02 | −15.13 |
|  | 51 | −115.570 | 15.00 |  |  |  |
| 19 | 52 | Infinity | 70.00 | 1.51680 | 64.20 |  |
|  | 53 | Infinity | 32.65 |  |  |  |
| 18 |  | Infinity | 0.00 |  |  |  |

The aspheric coefficients are listed below.

| Surface number | 1 | 2 |
|---|---|---|
| Conic constant | −111.4649 | 1.9322 |
| Third-order aspheric coefficient | 1.366163E−04 | 1.860209E−04 |
| Fourth-order aspheric coefficient | −6.428096E−07 | −5.407498E−07 |
| Fifth-order aspheric coefficient | −1.557642E−08 | −2.182229E−08 |
| Sixth-order aspheric coefficient | 1.019733E−10 | −1.781996E−10 |
| Seventh-order aspheric coefficient | 2.650002E−12 | 7.055865E−13 |
| Eighth-order aspheric coefficient | −1.815933E−14 | 9.968883E−15 |
| Ninth-order aspheric coefficient | −7.229382E−17 | 9.849165E−16 |
| Tenth-order aspheric coefficient | 1.847520E−19 | −3.622591E−18 |
| Eleventh-order aspheric coefficient | 4.831431E−22 | 1.020132E−19 |
| Twelfth-order aspheric coefficient | −5.668487E−23 | −2.945852E−21 |
| Thirteenth-order aspheric coefficient | 1.143693E−24 | −3.428635E−23 |
| Fourteenth-order aspheric coefficient | 1.397605E−26 | 1.666661E−25 |
| Fifteenth-order aspheric coefficient | −1.429345E−28 | 1.036160E−26 |
| Sixteenth-order aspheric coefficient | 6.830258E−31 | −5.880049E−29 |
| Seventeenth-order aspheric coefficient | −1.116066E−32 | −1.182233E−31 |
| Eighteenth-order aspheric coefficient | 8.680185E−35 | −1.714698E−34 |

| Surface number | 25 | 26 |
|---|---|---|
| Conic constant | 0 | 0 |
| Fourth-order aspheric coefficient | 2.464206E−06 | 4.471324E−06 |
| Sixth-order aspheric coefficient | −2.336798E−09 | −2.779875E−09 |
| Eighth-order aspheric coefficient | −5.632634E−13 | −2.517168E−13 |
| Tenth-order aspheric coefficient | 1.120895E−15 | 1.227886E−16 |
| Twelfth-order aspheric coefficient | −1.570840E−18 | 7.314470E−21 |
| Fourteenth-order aspheric coefficient | 1.095355E−21 | 1.230487E−22 |
| Sixteenth-order aspheric coefficient | −1.722241E−25 | 2.405275E−26 |
| Eighteenth-order aspheric coefficient | −4.289037E−29 | −4.068513E−29 |
| Twentieth-order aspheric coefficient | 3.941891E−33 | 6.032799E−33 |

Effects and Advantages

The projection system 3A according to the present example includes the first optical system 31 having positive power and the second optical system 32 having negative power, and the intermediate image 35 is formed between the first optical system 31 and the second optical system 32. The second optical system 32 includes the first lens group G1 disposed on the enlargement side of the intersection position C2 and having positive power, the second lens group G2 disposed on the reduction side of the intersection position C2 and having negative power, and the third lens group G3 disposed on the reduction side of the second lens group G2 and having positive power. In the thus configured projection system 3A, the second lens group G2, which is on the reduction side of and adjacent to the intersection position C2 in the second optical system 32, affects the resolution performance of the projection system 3A. In particular, the lens L18 located in a position adjacent to the intersection position C2 has a large impact on the resolution performance, and the larger the power of the lens L18, the larger the amount of aberrations caused by errors in the manufacturing of the lens L18, resulting in a problem of a tendency to cause a decrease in the resolution performance.

To solve the problem, in the present example, the second lens group G2 includes the lens L18 having positive power, the lens L19 having positive power, and the lens L20 having negative power in this order from the side facing the intersection position C2 toward the reduction side. That is, in the present example, the second lens group G2 located in a position adjacent to the intersection position C2 includes two lenses both having positive power and successively arranged from the side facing the intersection position C2. Therefore, in the design of the second lens group G2 having necessary power, the power can be distributed between the two lenses. Therefore, in the design of the second lens group G2 having necessary power, an increase in the power of the lens located in a position adjacent to the intersection position C2 can be suppressed as compared with a case where the second lens group G2 includes only one lens having positive power and located in a position adjacent to the intersection position C2. As a result, the tendency to cause a decrease in the resolution performance due to errors in the manufacturing of the lens L18 can be suppressed.

Furthermore, in the present example, the lens L20 having negative power is provided on the reduction side of the two lenses both having positive power in the second lens group G2, whereby aberrations generated by the lenses L18 and L19 are readily corrected.

Moreover, in the present example, the lenses L23, L24, and L25, which form the third lens group G3, are each a single lens having positive power. Since the three lenses in the projection system 3A that are successively arranged from the reduction side all have positive power, the beam from the third lens group G3 toward the enlargement side can be made substantially telecentric. In the design of the third lens group G3 having necessary power, the power can be distributed among the lenses L23, L24, and L25. The lenses L23, L24, and L25 can therefore be equally responsible for aberrations, whereby aberrations produced by the entire third lens group G3 can be suppressed.

The projection system 3A according to the present example satisfies Conditional Expression (1) below, $$-0.5 < fLU2G3/fLU2G2 < 0 \quad (1)$$

where fLU2G2 represents the focal length of the second lens group G2 in the second optical system 32 and fLU2G3 represents the focal length of the third lens group G3 in the second optical system 32.

Conditional Expression (1) is intended to ensure a necessary back focal length while suppressing an increase in the overall size of the projection system 3A. That is, when the value of Conditional Expression (1) is smaller than the lower limit, which is advantageous for securing the back focal length, the size of the projection system 3A disadvantageously increases. That is, the overall length of the projection system 3A increases. When the value of Conditional Expression (1) is greater than the upper limit, which is advantageous for reducing the size of the projection system 3A, the back focal length disadvantageously decreases.

In the present example, $$fLU2G2 = -405.01, \text{ and}$$

$$fLU2G3 = 84.11$$

are satisfied. Therefore, $$fLU2G3/fLU2G2 = -0.21$$

is satisfied, and Conditional Expression (1) is therefore satisfied.

The projection system 3A according to the present example satisfies Conditional Expression (2) below, $$|fs1/f0| > 10 \quad (2)$$

where fs1 represents the focal length of the lens L18 on the reduction side of and adjacent to the aperture OP, and f0 represents the focal length of the entire projection system 3A.

Conditional Expression (2) is intended to suppress occurrence of aberrations while reducing the size of the projection system 3A. That is, to reduce the size of the projection system 3A, it is desirable to increase the power of the lens L18. When the power of lens L18 is increased, however, it becomes difficult to correct the aberrations produced by the projection system 3A. When Conditional Expression (2) is satisfied, coma, field curvature, and distortion can be satisfactorily corrected in a well-balanced manner while reducing the size of the projection system 3A. Furthermore, the back focal length of the projection system 3A can be readily ensured.

In the present example, $$fs1 = 500.00, \text{ and}$$

$$f0 = -11.10$$

are satisfied, and $$|fs1/f0| = 45.05$$

is satisfied, and Conditional Expression (2) is therefore satisfied.

In the present example, the third lens group G3 includes three lenses all having positive power and successively arranged from the reduction side toward the enlargement side. Furthermore, in the third lens group G3, the Abbe number of the lens L25, which is located in a position closest to the reduction side, and the Abbe number of the lens L24, which is located in a position adjacent to the lens L25, are each smaller than 30. That is, the Abbe number of the lens L24 is 20.02, and the Abbe number of the lens L25 is 20.02. As a result, the projection system 3A according to the present example allows satisfactory correction of the chromatic aberration of magnification. Furthermore, since the projection system 3A according to the present example includes a series of lenses each having positive power and an Abbe number smaller than 30, aberrations caused by the refractive power of the lenses L24 and L25 can be reduced. Moreover, the tendency to cause a decrease in the resolution performance of the projection system 3A due to errors in the manufacturing of the lenses L24 and L25 can be suppressed.

In the projection system 3A according to the present example, the sum of the number of lenses of the second lens group G2 and the number of lenses of the third lens group G3 is eight, which is greater than or equal to seven. When the number of lenses is greater than or equal to seven, the lenses of the second lens group G2 and the third lens group G3 is each designed with an increased degree of freedom, whereby a variety of aberrations produced by the projection system 3A can be readily corrected. Furthermore, when the number of lenses is greater than or equal to seven, the power of each of the lenses of the second lens group G2 and the third lens group G3 can be controlled. The lenses can therefore be equally responsible for aberrations, whereby the aberrations produced by the entire projection system 3A can be suppressed.

The chief ray La of the off-axis beam having the maximum angle of view, which passes through the space between the lens L13 in the first optical system 31, which is the lens closest to the intermediate image 35, and the lens L14 in the second optical system 32, which is the lens closest to the intermediate image 35, approaches the optical axis N as the chief ray La travels toward the enlargement side. The second optical system 32 can thus readily correct the distortion produced by the first optical system 31, whereby the aberration correction burden on the first optical system 31 can be reduced.

Furthermore, in the projection system 3A according to the present example, the focal position P, where the off-axis beam is brought into focus in the intermediate image 35, approaches lens L14 as the focal position P is separate away from the optical axis. That is, the focal position P approaches the second optical system 32 as the focus position P is separate away from the optical axis. The distortion and field curvature produced by the first optical system 31 can thus be more readily corrected by the second optical system 32.

The projection system 3A according to the present example includes the lens L6, which is located on the enlargement side of the intersection position C1, where the chief ray La of the off-axis beam having the maximum angle of view intersects with the optical axis N in the first optical system 31, and is adjacent to the intersection position C1, and satisfies Conditional Expression (3) below, $$|Ra2/Ra1|>9 \quad (3)$$

where Ra1 represents the enlargement-side radius of curvature of the lens L6, and Ra2 represents the reduction-side radius of curvature of the lens L6.

Conditional Expression (3) is intended to suppress occurrence of the aberrations in the first optical system 31. That is, in the first optical system 31, the aberrations tend to occur in the lens L6 on the enlargement side of and adjacent to the intersection position C1, and the projection system 3A cannot fully correct the aberrations as the radius of curvature of the reduction-side surface of lens L6 decreases. In contrast, when Conditional Expression (3) is satisfied, the aberrations can be corrected in the projection system 3A. As a result, the tendency to cause a decrease in the resolution performance of the projection system 3A due to errors in the manufacturing of the lens L6 can be suppressed.

In the present example, $Ra1=140.12$, and $Ra2=1471.15$ are satisfied, and $|Ra2/Ra1|=10.50$ is satisfied, and Conditional Expression (3) is therefore satisfied.

The projection system 3A according to the present example satisfies Conditional Expression (4) below, $$0.4<FLU1\text{ave}/FLU2\text{ave}<0.9 \quad (4)$$

where the focal length of each of the lenses that form the first optical system 31 and the second optical system 32 is divided by the focal length f0 of the entire projection system 3A to normalize the focal length, FLU1ave representing the average of the absolute values of the focal lengths of the lenses in the first optical system 31, and FLU2ave representing the average of the absolute values of the focal lengths of the lenses in the second optical system 32.

Conditional Expression (4) is intended to shorten the focal length of the projection system 3A and suppress the tendency to cause deterioration of the resolution performance of the projection system due to errors in the manufacturing of each of the lenses. That is, when the value of Conditional Expression (4) is smaller than the lower limit, the thickness of each of the lenses of the first optical system 31 increases, so that the power of the first optical system 31 increases. Therefore, the situation described above is advantageous for shortening the focal length of the projection system 3A, but the resolution performance of the projection system tends to decrease due to errors in the manufacturing of each of the lenses. On the other hand, when the value of Conditional Expression (4) is greater than the upper limit, the thickness of each of the lenses of the second optical system 32 decreases, so that the power of the second optical system 32 decreases, resulting in a difficulty in shortening the focal length of the projection system 3A. However, the tendency to cause a decrease in the resolution performance of the projection system 3A due to errors in the manufacturing of each of the lenses can be suppressed.

In the present example, $FLU1\text{ave}=11.99$, and $FLU2\text{ave}=18.98$ are satisfied, and $FLU1\text{ave}/FLU2\text{ave}=0.63$ is satisfied, and Conditional Expression (4) is therefore satisfied.

The projection system 3A according to the present example includes no bonded lens. There is therefore no need to consider degradation in the life of a bonding material used in a bonded lens due to light or heat. Furthermore, as compared with a bonded lens, the curvature of each of the lenses located at edges of the projection system 3A is designed with an increased degree of freedom. The aberrations are thus readily corrected, whereby the design performance of the projection system 3A is improved.

Figure 3:
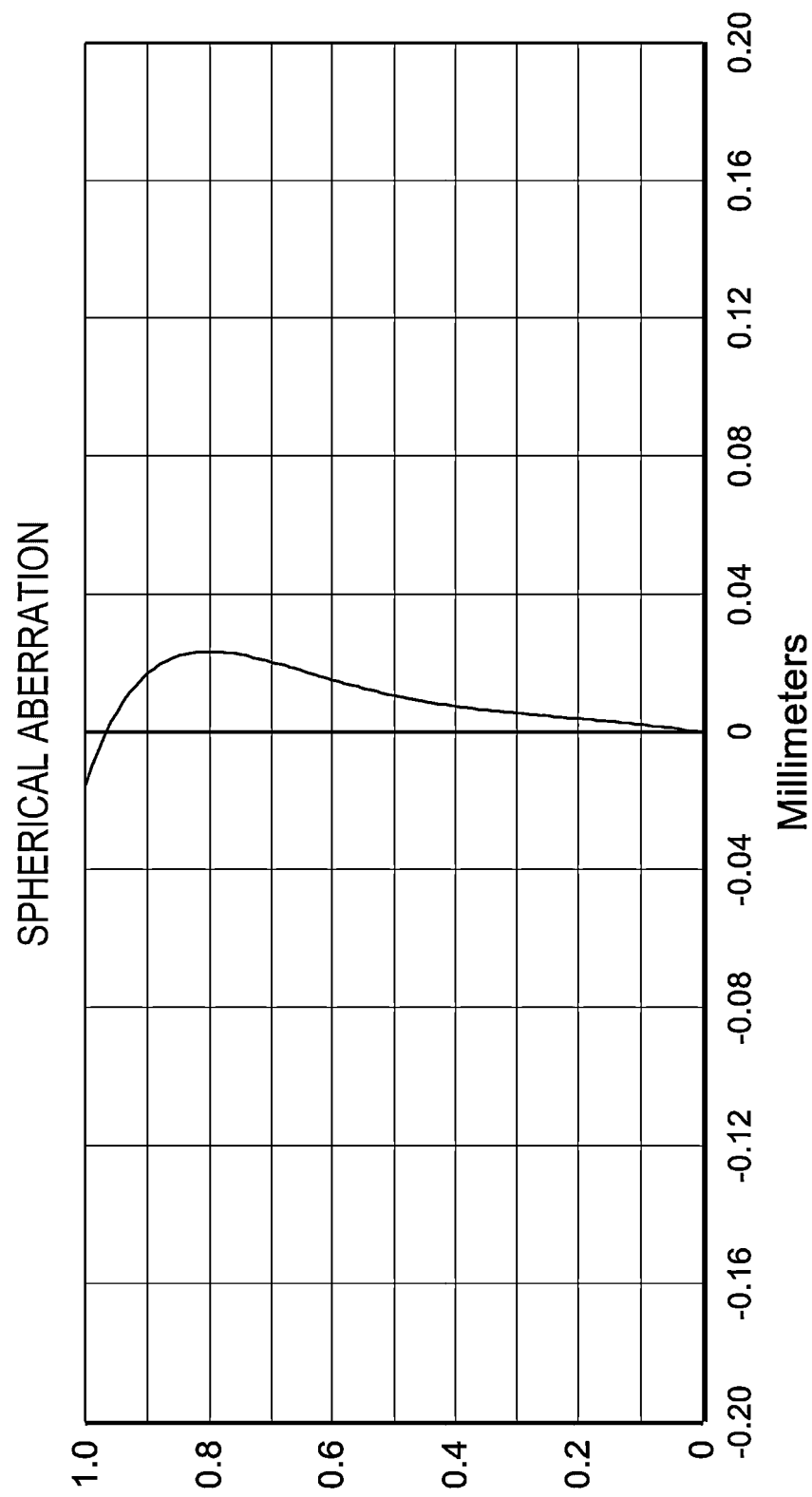
FIG. 3 shows the spherical aberration produced by the projection system according to Example 1.
Figure 4:
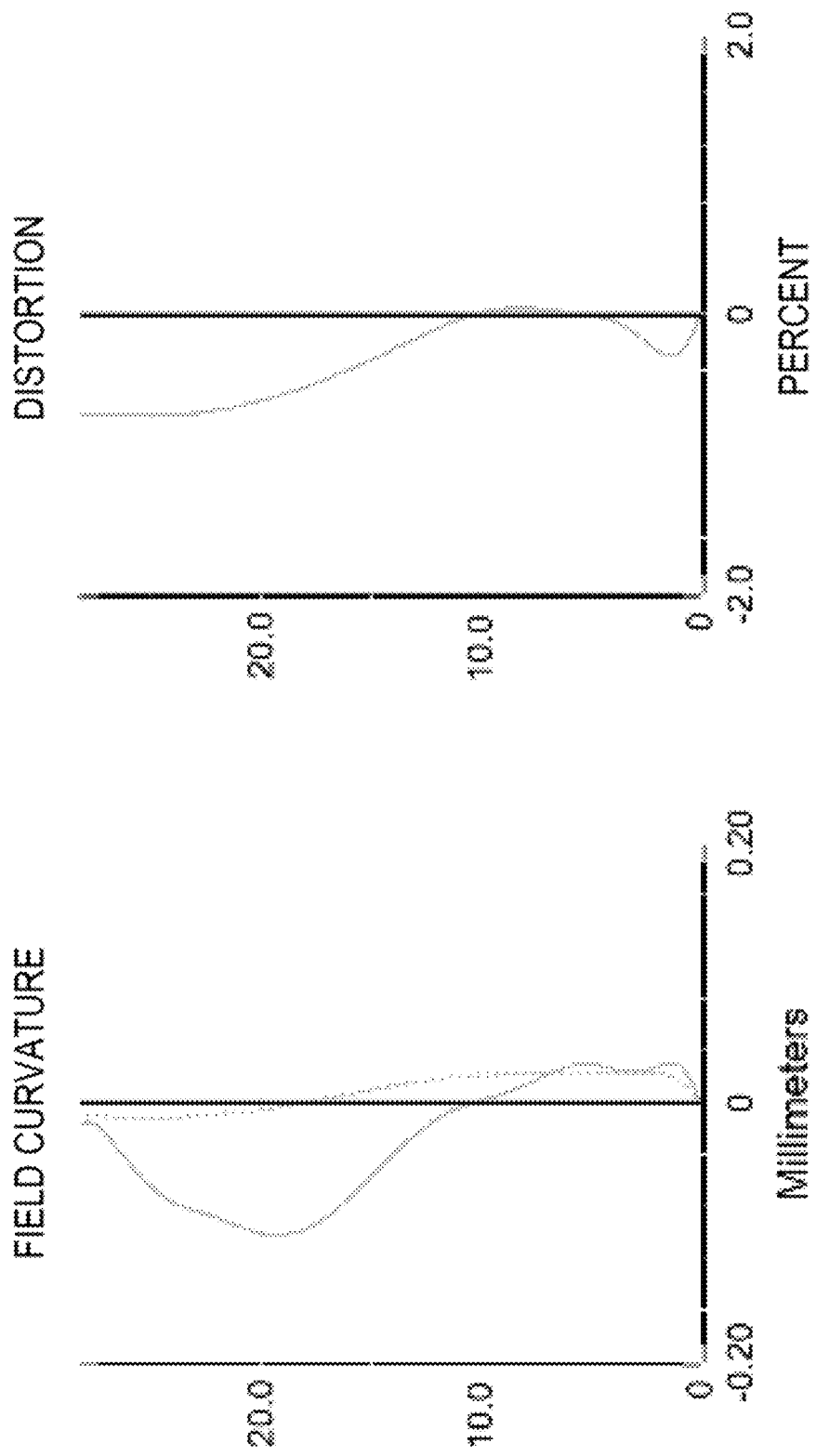
FIG. 4 shows the field curvature and the distortion produced by the projection system according to Example 1.

FIG. 3 shows the spherical aberration produced by the projection system 3A. FIG. 4 shows the field curvature and the distortion produced by the projection system 3A. The spherical aberration, the field curvature, and the distortion produced by the projection system 3A according to the present example are suppressed, as shown in FIGS. 3 and 4.

Variation of Example 1

Figure 5:
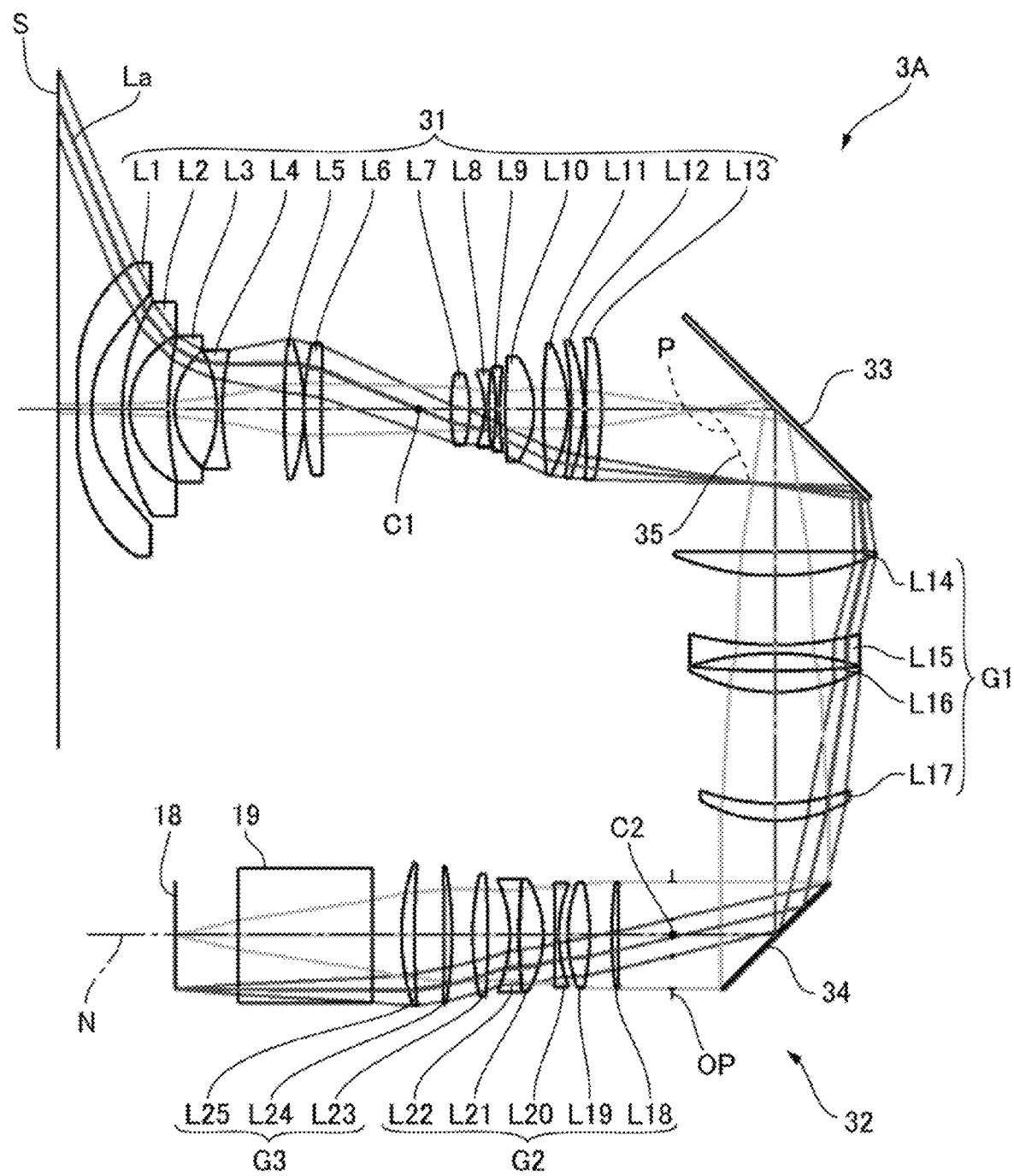
FIG. 5 is a beam diagram of the projection system according to a variation of Example 1.

FIG. 5 is a beam diagram of the projection system 3A according to a variation of Example 1. The projection system 3A according to the present example includes a first mirror 33 (first deflector) and a second mirror 34 (second deflector), which deflect the optical path of the projection system 3A. The first mirror 33 is disposed between the first optical system 31 and the second optical system 32 and deflects the optical path (optical axis N) of the projection system 3A. In the present example, the first mirror 33 is located on the reduction side of the intermediate image 35.

The second mirror 34 is disposed between the lens L17 of the second optical system 32 and the lens L18 of the second optical system 32 and deflects the optical path (optical axis N) of the projection system 3A. The second mirror 34 is located on the enlargement side of the aperture OP, that is, the intersection position C2. The on-axis inter-surface distance between the lenses L17 and L18 is the longest of the plurality of on-axis inter-surface distances between two adjacent lenses in the second optical system 32. The second mirror 34 is therefore readily disposed between lenses L17 and L18.

The first mirror 33 and the second mirror 34 disposed in the projection system 3A allow the optical axis N to be oriented in a desired direction, whereby projection system 3A can be readily incorporated in the projector 1. In the present example, the first mirror 33 and the second mirror 34 are not disposed in the first optical system 31. The positional accuracy of each of the lenses of the first optical system 31 can thus be readily ensured. Furthermore, since the first mirror 33 or the second mirror 34 is not disposed in the first optical system 31, the overall length of the first optical system 31 does not increase.

Example 2

Figure 6:
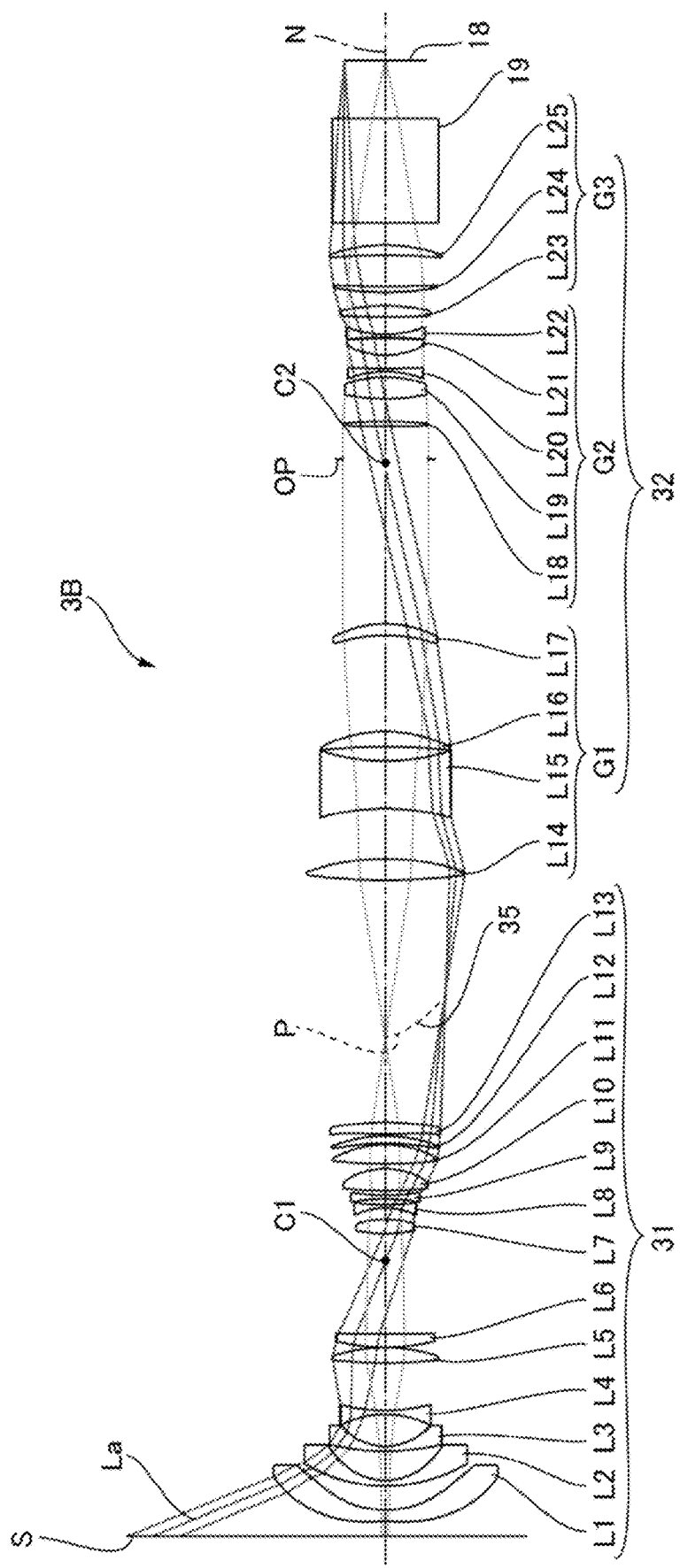
FIG. 6 is a beam diagram of a projection system according to Example 2.

FIG. 6 is a beam diagram of a projection system 3B according to Example 2. The projection system 3B includes a first optical system 31 and a second optical system 32 disposed on the reduction side of the first optical system 31, as shown in FIG. 6. The first optical system 31 has positive power. The second optical system 32 has negative power. An intermediate image 35 conjugate with the reduction-side conjugate plane and the enlargement-side conjugate plane of the projection system 3B is formed between the first optical system 31 and the second optical system 32.

The first optical system 31 includes 13 lenses L1 to L13. The lenses L1 to L13 are arranged in this order from the enlargement side toward the reduction side. The lenses L1 to L13 have the same shapes as those of the lenses of the projection system 3A according to Example 1. Furthermore, the lenses L1 to L13 each have the same power as that of the corresponding lens of the projection system 3A according to Example 1.

In the first optical system 31, there is therefore an intersection position C1, where a chief ray La of an off-axis beam having a maximum angle of view intersects with an optical axis N, between the lens L6 and the lens L7. In the first optical system 31, the lens L6, which is on the enlargement side of and adjacent to the intersection position C1, has a meniscus shape having a convex surface on the enlargement side. The lens L6 has positive power.

The second optical system 32 accommodates an aperture OP. In the present example, the aperture OP is disposed in an intersection position C2, where the chief ray La of the off-axis beam having the maximum angle of view intersects with the optical axis N in the second optical system 32. The second optical system 32 includes a first lens group G1 disposed on the enlargement side of the intersection position C2, a second lens group G2 disposed on the reduction side of the intersection position C2, and a third lens group G3 disposed on the reduction side of the second lens group G2. In more detail, the second lens group G2 is disposed in a position on the reduction side of and adjacent to the intersection position C2. The second lens group G2 includes a lens L18, a lens L19, a lens L20, a lens L21, and a lens L22 arranged sequentially from the enlargement side toward the reduction side. The number of lenses of the second lens group G2 is five. The lenses L18 and L19 each have positive power. The lens L20 has negative power. The lens L21 has convex surfaces on the enlargement and reduction sides. The lens L21 has positive power. The lens L22 has negative power.

The third lens group G3 is located between the second lens group G2 and a cross dichroic prism 19. The third lens group G3 includes a lens L23, a lens L24, and a lens L25 arranged sequentially from the enlargement side toward the reduction side. The lenses L23, L24, and L25 all have positive power. The number of lenses that form the third lens group G3 is three. The sum of the number of lenses of the second lens group G2 and the number of lenses of the third lens group G3 is therefore eight.

Liquid crystal panels 18 form images on one side of the optical axis N. The intermediate image 35 is formed on the other side of the optical axis N. The enlarged image is formed on the one side of the optical axis N. The chief ray La of the off-axis beam, which passes through the space between the lens L13 of the first optical system 31 and the lens L14 of the second optical system 32, which are lenses located on opposite sides of the intermediate image 35 in the direction of the optical axis N, approaches the optical axis N as the chief ray La travels from the reduction side toward the enlargement side, as shown in FIG. 6. A focal position P, where the off-axis beam is brought into focus in the intermediate image 35, approaches the lens L14 of the second optical system 32 as the focal position P is separate away from the optical axis.

Data on the projection system 3B according to Example 2 are listed below,

| | |
|---|---|
| f0 | −11.20 mm |
| FNo | 2.18 |
| Φ | 56.40 mm |
| BF | 99.95 mm |
| fLU1 | 16.17 mm |
| fLU2 | −652.99 mm | where f0 represents the focal length of the entire projection system 3B, FNo represents the F-number, Φ represents the effective image circle diameter, BF represents the back focal length in air, fLU1 represents the focal length of the first optical system 31, and fLU2 represents the focal length of the second optical system 32.

Data on the lenses of the projection system 3B are listed below. The surfaces of the lenses are numbered sequentially from the enlargement side toward the reduction side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspheric surface has a surface number followed by *. Reference character R represents the radius of curvature. Reference character D represents the on-axis inter-surface distance. Reference character nd represents the refractive index. Reference character νd represents the Abbe number. Reference character f represents the focal length of the lens and is a normalized value resulting from division of the focal length by the focal length f0 of the entire projection system 3B. Reference characters R and D are expressed in millimeters.

| Reference character | Surface number | r | d | nd | νd | f |
|---|---|---|---|---|---|---|
| S | 0 | Infinity | 1507.00 | | | |
| L1 | 1* | −153.996 | 7.51 | 1.50919 | 56.32 | 13.32 |
| | 2* | 153.440 | 15.78 | | | |
| L2 | 3 | 107.793 | 3.88 | 1.83481 | 42.74 | 7.83 |
| | 4 | 42.998 | 19.54 | | | |
| L3 | 5 | 167.979 | 3.22 | 1.83481 | 42.74 | 5.66 |
| | 6 | 40.048 | 21.41 | | | |
| L4 | 7 | −68.393 | 2.82 | 1.49700 | 81.61 | 7.94 |
| | 8 | 127.486 | 31.90 | | | |
| L5 | 9 | 346.058 | 10.06 | 1.88300 | 40.81 | −8.83 |
| | 10 | −116.085 | 0.10 | | | |
| L6 | 11 | 137.988 | 8.99 | 1.88300 | 40.81 | −15.28 |
| | 12 | 1464.120 | 67.15 | | | |
| L7 | 13 | 102.238 | 9.59 | 1.61800 | 63.40 | −5.82 |
| | 14 | −64.371 | 7.63 | | | |
| L8 | 15 | −46.726 | 2.04 | 1.73800 | 32.33 | 4.35 |
| | 16 | 163.998 | 3.88 | | | |
| L9 | 17 | −123.716 | 2.80 | 1.86966 | 20.02 | 7.26 |
| | 18 | 170.976 | 2.89 | | | |
| L10 | 19 | 332.539 | 14.72 | 1.49700 | 81.61 | −7.86 |
| | 20 | −49.826 | 3.22 | | | |
| L11 | 21 | 319.315 | 13.01 | 1.43700 | 95.10 | −11.88 |
| | 22 | −70.425 | 0.68 | | | |
| L12 | 23 | −191.676 | 5.04 | 1.43700 | 95.10 | −40.54 |
| | 24 | −98.381 | 1.48 | | | |
| L13 | 25* | 8568.373 | 7.65 | 1.58699 | 59.48 | −18.31 |
| | 26* | −122.534 | 162.17 | | | |
| L14 | 27 | 430.821 | 14.25 | 1.83481 | 42.72 | −12.83 |
| | 28 | −164.971 | 33.65 | | | |
| L15 | 29 | −165.730 | 31.65 | 1.73800 | 32.33 | 8.85 |
| | 30 | 143.231 | 9.42 | | | |

-continued

| Reference character | Surface number | r | d | nd | vd | f |
|---|---|---|---|---|---|---|
| L16 | 31 | −430.942 | 10.34 | 1.83481 | 42.72 | −12.79 |
| | 32 | −94.983 | 64.48 | | | |
| L17 | 33 | −111.766 | 7.61 | 1.43700 | 95.10 | −46.29 |
| | 34 | −76.456 | 109.98 | | | |
| OP | 35 | Infinity | 22.37 | | | |
| L18 | 36 | 1322.721 | 3.23 | 1.48749 | 70.24 | −44.64 |
| | 37 | −299.687 | 15.17 | | | |
| L19 | 38 | 142.225 | 14.64 | 1.43700 | 95.10 | −10.57 |
| | 39 | −79.014 | 3.63 | | | |
| L20 | 40 | −72.956 | 2.00 | 1.73800 | 32.33 | 8.77 |
| | 41 | 638.307 | 9.06 | | | |
| L21 | 42 | 56.755 | 11.15 | 1.43700 | 95.10 | −11.57 |
| | 43 | −393.855 | 0.57 | | | |
| L22 | 44 | −278.905 | 2.00 | 1.73800 | 32.33 | 6.67 |
| | 45 | 69.544 | 11.70 | | | |
| L23 | 46 | 499.711 | 7.65 | 1.43700 | 95.10 | −21.95 |
| | 47 | −136.644 | 8.98 | | | |
| L24 | 48 | 208.064 | 4.00 | 1.86966 | 20.02 | −26.90 |
| | 49 | 963.214 | 20.52 | | | |
| L25 | 50 | −493.726 | 6.78 | 1.86966 | 20.02 | −15.12 |
| | 51 | −115.091 | 15.00 | | | |
| 19 | 52 | Infinity | 70.00 | 1.51680 | 64.20 | |
| | 53 | Infinity | 38.86 | | | |
| 18 | | Infinity | 0.00 | | | |

The aspheric coefficients are listed below.

| Surface number | 1 | 2 |
|---|---|---|
| Conic constant | −120.6838 | 1.9306 |
| Third-order aspheric coefficient | 1.370900E−04 | 1.860304E−04 |
| Fourth-order aspheric coefficient | −6.395981E−07 | −5.394286E−07 |
| Fifth-order aspheric coefficient | −1.554154E−08 | −2.181641E−08 |
| Sixth-order aspheric coefficient | 1.017167E−10 | −1.783394E−10 |
| Seventh-order aspheric coefficient | 2.651309E−12 | 7.049241E−13 |
| Eighth-order aspheric coefficient | −1.811654E−14 | 9.953124E−15 |
| Ninth-order aspheric coefficient | −7.159675E−17 | 9.846407E−16 |
| Tenth-order aspheric coefficient | 1.817588E−19 | −3.622593E−18 |
| Eleventh-order aspheric coefficient | 5.459378E−22 | 1.018807E−19 |
| Twelfth-order aspheric coefficient | −5.603592E−23 | −2.947412E−21 |
| Thirteenth-order aspheric coefficient | 1.160333E−24 | −3.429782E−23 |
| Fourteenth-order aspheric coefficient | 1.413026E−26 | 1.665889E−25 |
| Fifteenth-order aspheric coefficient | −1.409958E−28 | 1.036376E−26 |
| Sixteenth-order aspheric coefficient | 6.940630E−31 | −5.873154E−29 |
| Seventeenth-order aspheric coefficient | −1.112583E−32 | −1.202604E−31 |
| Eighteenth-order aspheric coefficient | 8.652139E−35 | −1.454433E−34 |

| Surface number | 25 | 26 |
|---|---|---|
| Conic constant | 0 | 0 |
| Fourth-order aspheric coefficient | 2.415001E−06 | 4.510063E−06 |
| Sixth-order aspheric coefficient | −2.351079E−09 | −2.766601E−09 |
| Eighth-order aspheric coefficient | −5.621732E−13 | −2.494474E−13 |
| Tenth-order aspheric coefficient | 1.123939E−15 | 1.231342E−16 |
| Twelfth-order aspheric coefficient | −1.569190E−18 | 8.168097E−21 |
| Fourteenth-order aspheric coefficient | 1.096247E−21 | 1.242700E−22 |
| Sixteenth-order aspheric coefficient | −1.714836E−25 | 2.505676E−26 |
| Eighteenth-order aspheric coefficient | −4.201806E−29 | −3.980853E−29 |
| Twentieth-order aspheric coefficient | 5.103806E−33 | 6.551791E−33 |

The projection system 3B according to the present example satisfies Conditional Expression (1) below, $$-0.5 < fLU2G3/fLU2G2 < 0 \tag{1}$$

where fLU2G2 represents the focal length of the second lens group G2 in the second optical system 32, and fLU2G3 represents the focal length of the third lens group G3 in the second optical system 32.

That is, in the present example, $$fLU2G3 = -320.41, \text{ and}$$

$$fLU2G3 = 85.20$$

are satisfied, and $$fLU2G3/fLU2G2 = -0.27$$

is satisfied.

The projection system 3B according to the present example satisfies Conditional Expression (2) below, $$|fs1/f0| > 10 \tag{2}$$

where fs1 represents the focal length of the lens L18, and f0 represents the focal length of the entire projection system 3B.

That is, in the present example, $$fs1 = 500.00, \text{ and}$$

$$f0 = -11.20$$

are satisfied, and $$|fs1/f0| = 44.64$$

is satisfied.

The projection system 3B according to the present example includes the lens L6, which is located on the enlargement side of the intersection position C1, where the chief ray La of the off-axis beam having the maximum angle of view intersects with the optical axis N in the first optical system 31, and is adjacent to the intersection position C1, and satisfies Conditional Expression (3) below, $$|Ra2/Ra1| > 9 \tag{3}$$

where Ra1 represents the enlargement-side radius of curvature of the lens L6, and Ra2 represents the reduction-side radius of curvature of the lens L6.

That is, in the present example, $$Ra1 = 137.99, \text{ and}$$

$$Ra2 = 1464.12$$

are satisfied, and $$|Ra2/Ra1| = 10.61$$

is satisfied.

The projection system 3B according to the present example satisfies Conditional Expression (4) below, $$0.4 < FLU1\text{ave}/FLU2\text{ave} < 0.9 \quad (4)$$

where the focal length of each of the lenses that form the first optical system 31 and the second optical system 32 is divided by the focal length f0 of the entire projection system 3B to normalize the focal length, FLU1ave representing the average of the absolute values of the focal lengths of the lenses in the first optical system 31, and FLU2ave representing the average of the absolute values of the focal lengths of the lenses in the second optical system 32.

That is, in the present example, $FLU1\text{ave}=11.91$, and $FLU2\text{ave}=18.91$ are satisfied, and $FLU1\text{ave}/FLU2\text{ave}=0.63$ is satisfied.

Furthermore, in the present example, in the third lens group G3, the Abbe number of the lens L25, which is located in a position closest to the reduction side, and the Abbe number of the lens L24, which is located in a position adjacent to the lens L25, are each smaller than 30. That is, the Abbe number of the lens L24 is 20.02, and the Abbe number of the lens L25 is 20.02.

Effects and Advantages

Figure 7:
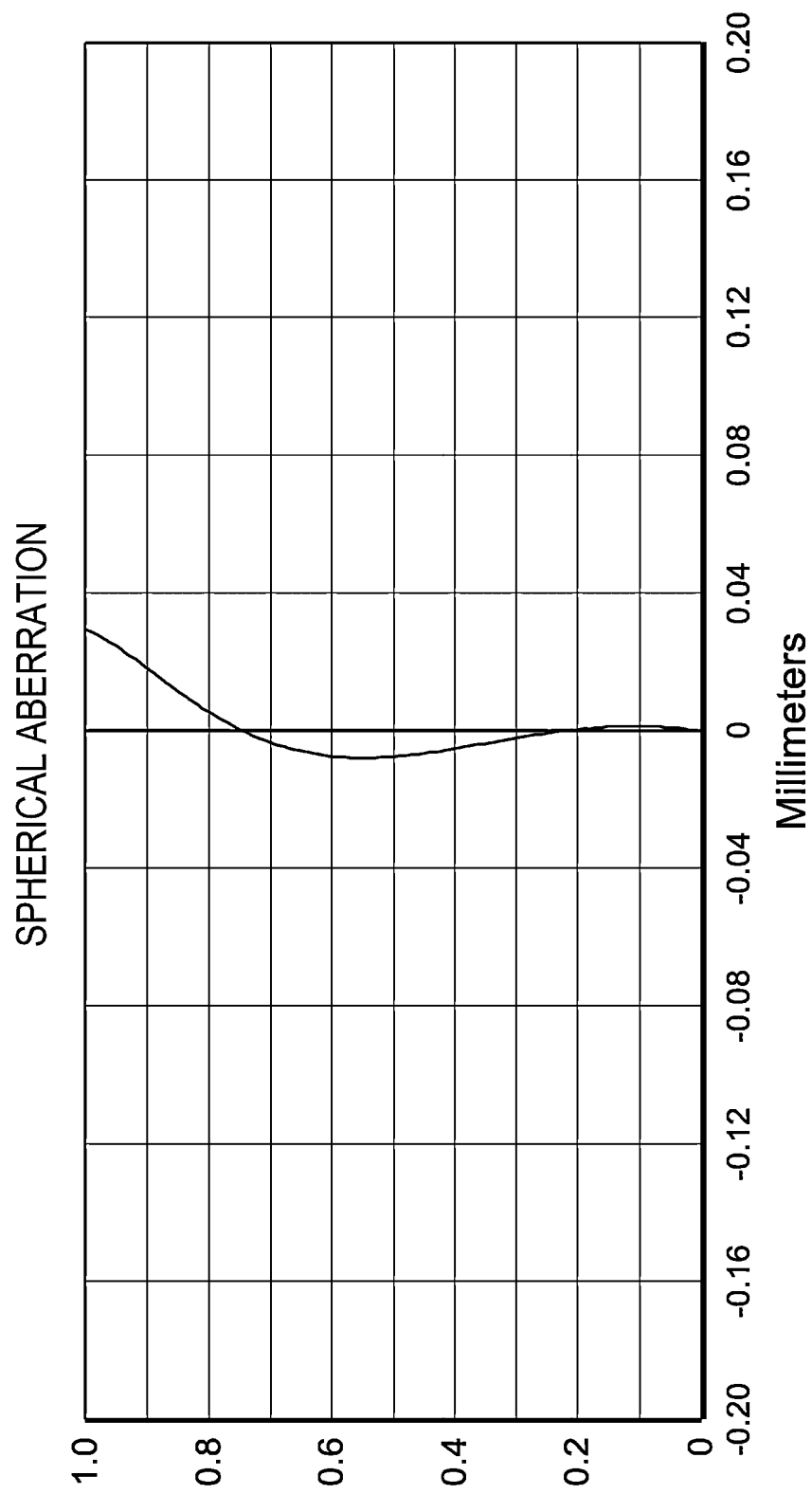
FIG. 7 shows the spherical aberration produced by the projection system according to Example 2.
Figure 8:
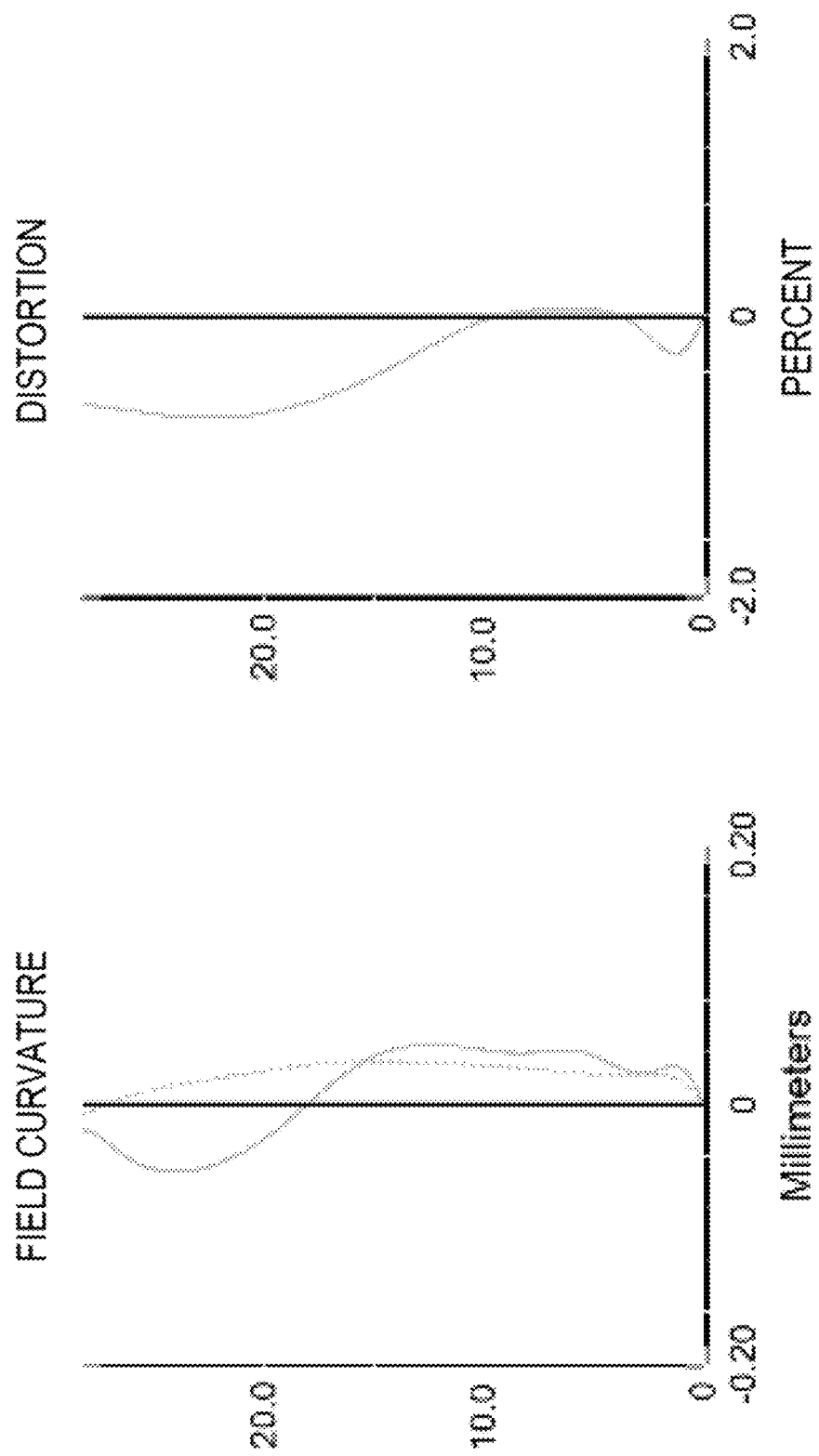
FIG. 8 shows the field curvature and the distortion produced by the projection system according to Example 2.

The projection system 3B according to the present example can provide the same effects and advantages as those provided by the projection system 3A according to Example 1. FIG. 7 shows the spherical aberration produced by the projection system 3B. FIG. 8 shows the field curvature and the distortion produced by the projection system 3B. The spherical aberration, the field curvature, and the distortion produced by the projection system 3B according to the present example are suppressed, as shown in FIGS. 7 and 8.

Variation of Example 2

The projection system 3B can include a first mirror (first deflector) and a second mirror (second deflector), which deflect the optical path of the projection system 3B, as the projection system 3A according to the variation of Example 1 can. In this case, a first mirror 33 is disposed between the first optical system 31 and the second optical system 32, and the first mirror 33 is located on the reduction side of the intermediate image 35. A second mirror 34 is disposed between the lens L17 of the second optical system 32 and the lens L18 of the second optical system 32. The second mirror 34 is located on the enlargement side of the aperture OP. The on-axis inter-surface distance between the lenses L17 and L18 is the longest of the plurality of on-axis inter-surface distances between two adjacent lenses in the second optical system 32. The second mirror 34 is therefore readily disposed between lenses L17 and L18.

The projection system 3B according to the variation of Example 2 can also provide the same effects and advantages as those provided by the projection system 3A according to the variation of Example 1.

Example 3

Figure 9:
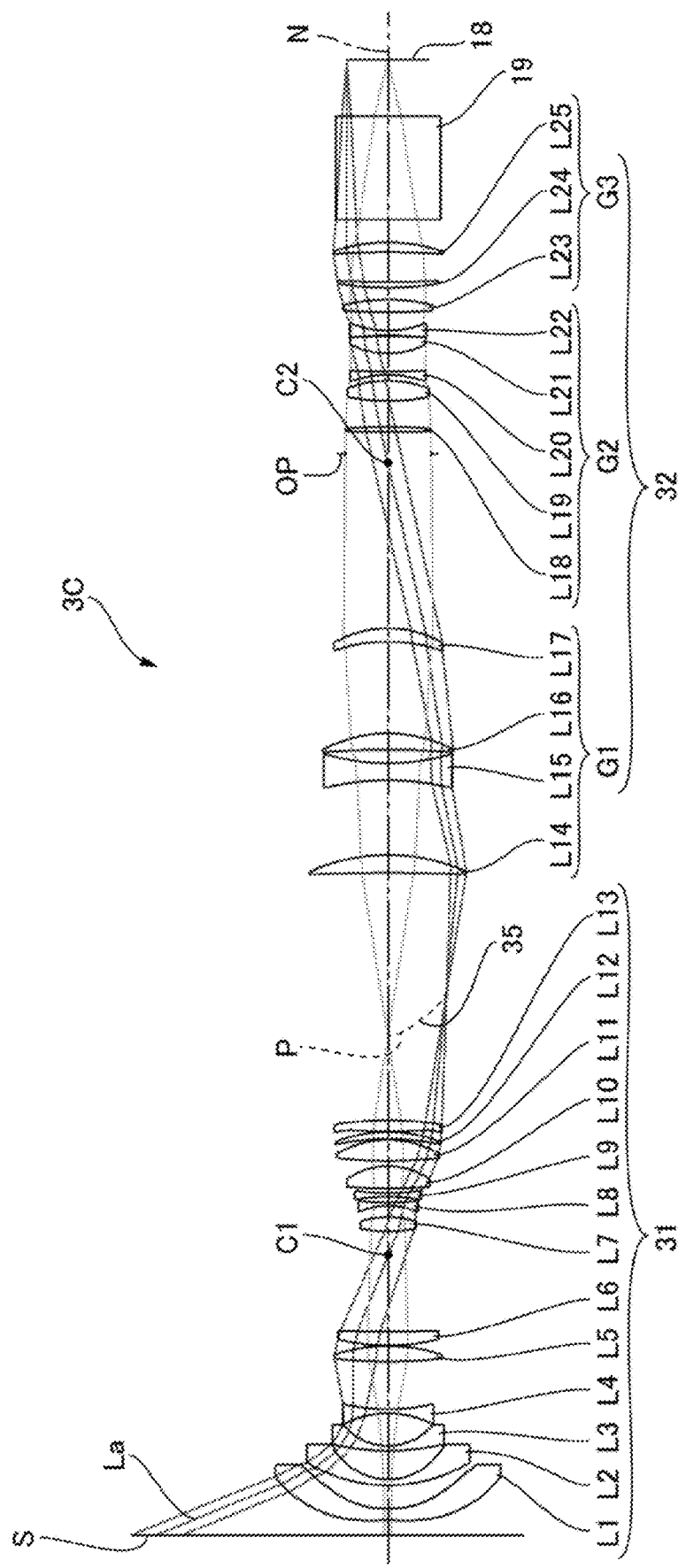
FIG. 9 is a beam diagram of a projection system according to Example 3.

FIG. 9 is a beam diagram of a projection system 3C according to Example 3. The projection system 3C includes a first optical system 31 and a second optical system 32 disposed on the reduction side of the first optical system 31, as shown in FIG. 9. The first optical system 31 has positive power. The second optical system 32 has negative power. An intermediate image 35 conjugate with the reduction-side conjugate plane and the enlargement-side conjugate plane of the projection system 3C is formed between the first optical system 31 and the second optical system 32.

The first optical system 31 includes 13 lenses L1 to L13. The lenses L1 to L13 are arranged in this order from the enlargement side toward the reduction side. The lenses L1 to L13 have the same shapes as those of the lenses of the projection system 3A according to Example 1. Furthermore, the lenses L1 to L13 each have the same power as that of the corresponding lens of the projection system 3A according to Example 1.

In the first optical system 31, there is therefore an intersection position C1, where a chief ray La of an off-axis beam having a maximum angle of view intersects with an optical axis N, between the lens L6 and the lens L7. In the first optical system 31, the lens L6, which is on the enlargement side of and adjacent to the intersection position C1, has a meniscus shape having a convex surface on the enlargement side. The lens L6 has positive power.

The second optical system 32 accommodates an aperture OP. In the present example, the aperture OP is disposed in an intersection position C2, where the chief ray La of the off-axis beam having the maximum angle of view intersects with the optical axis N in the second optical system 32. The second optical system 32 includes a first lens group G1 disposed on the enlargement side of the intersection position C2, a second lens group G2 disposed on the reduction side of the intersection position C2, and a third lens group G3 disposed on the reduction side of the second lens group G2. In more detail, the second lens group G2 is disposed in a position on the reduction side of and adjacent to the intersection position C2. The second lens group G2 includes a lens L18, a lens L19, a lens L20, a lens L21, and a lens L22 arranged sequentially from the enlargement side toward the reduction side. The number of lenses of the second lens group G2 is five. The lenses L18 and L19 each have positive power. The lens L20 has negative power. The lens L21 has convex surfaces on the enlargement and reduction sides. The lens L21 has positive power. The lens L22 has negative power.

The third lens group G3 is located between the second lens group G2 and a cross dichroic prism 19. The third lens group G3 includes a lens L23, a lens L24, and a lens L25 arranged sequentially from the enlargement side toward the reduction side. The lenses L23, L24, and L25 all have positive power. The number of lenses that form the third lens group G3 is three. The sum of the number of lenses of the second lens group G2 and the number of lenses of the third lens group G3 is therefore eight.

Liquid crystal panels 18 form images on one side of the optical axis N. The intermediate image 35 is formed on the other side of the optical axis N. The enlarged image is formed on the one side of the optical axis N. The chief ray La of the off-axis beam, which passes through the space between the lens L13 of the first optical system 31 and the lens L14 of the second optical system 32, which are lenses located on opposite sides of the intermediate image 35 in the direction of the optical axis N, approaches the optical axis N as the chief ray La travels from the reduction side toward the enlargement side, as shown in FIG. 9. A focal position P, where the off-axis beam is brought into focus in the intermediate image 35, approaches the lens L14 of the second optical system 32 as the focal position P is separate away from the optical axis.

Data on the projection system 3C according to Example 3 are listed below,

| | |
|---|---|
| f0 | −11.20 mm |
| FNo | 2.18 |
| Φ | 56.40 mm |
| BF | 98.84 mm |
| fLU1 | 16.23 mm |
| fLU2 | −818.32 mm | where f0 represents the focal length of the entire projection system 3C, FNo represents the F-number, Φ represents the effective image circle diameter, BF represents the back focal length in air, fLU1 represents the focal length of the first optical system 31, and fLU2 represents the focal length of the second optical system 32.

Data on the lenses of the projection system 3C are listed below. The surfaces of the lenses are numbered sequentially from the enlargement side toward the reduction side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspheric surface has a surface number followed by *. Reference character R represents the radius of curvature. Reference character D represents the on-axis inter-surface distance. Reference character nd represents the refractive index. Reference character vd represents the Abbe number. Reference character f represents the focal length of the lens and is a normalized value resulting from division of the focal length by the focal length f0 of the entire projection system 3C. Reference characters R and D are expressed in millimeters.

| Reference character | Surface number | r | d | nd | vd | f |
|---|---|---|---|---|---|---|
| S | 0 | Infinity | 1507.00 | | | |
| L1 | 1* | −152.638 | 7.50 | 1.50919 | 56.32 | 13.25 |
| | 2* | 153.159 | 15.71 | | | |
| L2 | 3 | 108.434 | 3.86 | 1.83481 | 42.74 | 7.79 |
| | 4 | 42.980 | 19.25 | | | |
| L3 | 5 | 169.605 | 3.23 | 1.83481 | 42.74 | 5.63 |
| | 6 | 39.955 | 21.74 | | | |
| L4 | 7 | −68.261 | 2.84 | 1.49700 | 81.61 | 7.97 |
| | 8 | 129.380 | 32.04 | | | |
| L5 | 9 | 338.251 | 10.53 | 1.88300 | 40.81 | −8.80 |
| | 10 | −116.357 | 0.17 | | | |
| L6 | 11 | 137.829 | 9.57 | 1.88300 | 40.81 | −15.27 |
| | 12 | 1447.203 | 66.88 | | | |
| L7 | 13 | 101.352 | 9.57 | 1.61800 | 63.40 | −5.83 |
| | 14 | −65.049 | 7.69 | | | |
| L8 | 15 | −46.581 | 2.00 | 1.73800 | 32.33 | 4.35 |
| | 16 | 164.386 | 3.95 | | | |
| L9 | 17 | −123.147 | 2.60 | 1.86966 | 20.02 | 7.26 |
| | 18 | 171.915 | 2.96 | | | |
| L10 | 19 | 320.920 | 14.87 | 1.49700 | 81.61 | −7.91 |
| | 20 | −50.430 | 3.72 | | | |
| L11 | 21 | 333.821 | 14.05 | 1.43700 | 95.10 | −11.90 |
| | 22 | −69.817 | 0.47 | | | |
| L12 | 23 | −183.974 | 4.90 | 1.43700 | 95.10 | −40.97 |
| | 24 | −96.826 | 0.46 | | | |
| L13 | 25* | 2256.117 | 7.40 | 1.58699 | 59.48 | −18.51 |
| | 26* | −128.970 | 165.86 | | | |
| L14 | 27 | −1009.561 | 11.94 | 1.83481 | 42.72 | −15.80 |
| | 28 | −130.114 | 50.09 | | | |
| L15 | 29 | −187.282 | 11.00 | 1.73800 | 32.33 | 9.84 |
| | 30 | 149.102 | 9.21 | | | |
| L16 | 31 | −546.981 | 10.90 | 1.83481 | 42.72 | −12.15 |
| | 32 | −95.324 | 61.58 | | | |
| L17 | 33 | −114.486 | 8.94 | 1.43700 | 95.10 | −42.84 |
| | 34 | −75.872 | 116.94 | | | |
| OP | 35 | Infinity | 14.77 | | | |
| L18 | 36 | 1155.479 | 3.30 | 1.48749 | 70.24 | −43.56 |
| | 37 | −300.335 | 17.32 | | | |
| L19 | 38 | 143.824 | 13.50 | 1.43700 | 95.10 | −10.69 |
| | 39 | −80.152 | 4.19 | | | |
| L20 | 40 | −72.980 | 2.00 | 1.73800 | 32.33 | 8.77 |
| | 41 | 492.227 | 12.27 | | | |
| L21 | 42 | 56.409 | 11.49 | 1.43700 | 95.10 | −11.50 |
| | 43 | −413.987 | 0.62 | | | |
| L22 | 44 | −276.257 | 3.25 | 1.73800 | 32.33 | 6.62 |
| | 45 | 69.140 | 12.34 | | | |
| L23 | 46 | 458.239 | 8.45 | 1.43700 | 95.10 | −20.58 |
| | 47 | −128.750 | 8.00 | | | |
| L24 | 48 | 210.805 | 3.89 | 1.86966 | 20.02 | −27.72 |
| | 49 | 919.839 | 19.59 | | | |
| L25 | 50 | −500.433 | 6.66 | 1.86966 | 20.02 | −15.09 |
| | 51 | −115.241 | 15.00 | | | |
| 19 | 52 | Infinity | 70.00 | 1.51680 | 64.20 | |
| | 53 | Infinity | 37.75 | | | |
| 18 | | Infinity | 0.00 | | | |

The aspheric coefficients are listed below.

| Surface number | 1 | 2 |
|---|---|---|
| Conic constant | −119.7103 | 1.9244 |
| Third-order aspheric coefficient | 1.366428E−04 | 1.861998E−04 |
| Fourth-order aspheric coefficient | −6.430187E−07 | −5.392909E−07 |
| Fifth-order aspheric coefficient | −1.558731E−08 | −2.183333E−08 |
| Sixth-order aspheric coefficient | 1.020358E−10 | −1.786044E−10 |
| Seventh-order aspheric coefficient | 2.651448E−12 | 6.967365E−13 |
| Eighth-order aspheric coefficient | −1.815337E−14 | 9.821237E−15 |
| Ninth-order aspheric coefficient | −7.192103E−17 | 9.828223E−16 |
| Tenth-order aspheric coefficient | 1.889734E−19 | −3.650778E−18 |
| Eleventh-order aspheric coefficient | 5.379147E−22 | 1.015785E−19 |
| Twelfth-order aspheric coefficient | −5.571374E−23 | −2.949327E−21 |
| Thirteenth-order aspheric coefficient | 1.151431E−24 | −3.430402E−23 |
| Fourteenth-order aspheric coefficient | 1.403591E−26 | 1.663389E−25 |
| Fifteenth-order aspheric coefficient | −1.427416E−28 | 1.036457E−26 |
| Sixteenth-order aspheric coefficient | 6.741919E−31 | −5.852990E−29 |
| Seventeenth-order aspheric coefficient | −1.137267E−32 | −1.134273E−31 |
| Eighteenth-order aspheric coefficient | 8.287620E−35 | −6.691283E−35 |

| Surface number | 25 | 26 |
|---|---|---|
| Conic constant | 0 | 0 |
| Fourth-order aspheric coefficient | 2.424794E−06 | 4.501771E−06 |
| Sixth-order aspheric coefficient | −2.348936E−09 | −2.769279E−09 |
| Eighth-order aspheric coefficient | −5.616765E−13 | −2.504772E−13 |
| Tenth-order aspheric coefficient | 1.123729E−15 | 1.230737E−16 |

-continued

| | | |
|---|---|---|
| Twelfth-order aspheric coefficient | −1.569325E−18 | 8.374809E−21 |
| Fourteenth-order aspheric coefficient | 1.095975E−21 | 1.249824E−22 |
| Sixteenth-order aspheric coefficient | −1.716377E−25 | 2.577756E−26 |
| Eighteenth-order aspheric coefficient | −4.181907E−29 | −3.943275E−29 |
| Twentieth-order aspheric coefficient | 5.564477E−33 | 6.609295E−33 |

The projection system 3C according to the present example satisfies Conditional Expression (1) below, $$-0.5 < fLU2G3/fLU2G2 < 0 \quad (1)$$

where fLU2G2 represents the focal length of the second lens group G2 in the second optical system 32, and fLU2G3 represents the focal length of the third lens group G3 in the second optical system 32.

That is, in the present example, $$fLU2G2 = -289.45, \text{ and}$$

$$fLU2G3 = 83.67$$

are satisfied, and $$fLU2G3/fLU2G2 = -0.29$$

is satisfied.

The projection system 3C according to the present example satisfies Conditional Expression (2) below, $$|fs1/f0| > 10 \quad (2)$$

where fs1 represents the focal length of the lens L18, and f0 represents the focal length of the entire projection system 3C.

That is, in the present example, $$fs1 = 487.86, \text{ and}$$

$$f0 = -11.20$$

are satisfied, and $$|fs1/f0| = 43.56$$

is satisfied.

Furthermore, the projection system 3C according to the present example includes the lens L6, which is located on the enlargement side of the intersection position C1, where the chief ray La of the off-axis beam having the maximum angle of view intersects with the optical axis N in the first optical system 31, and is adjacent to the intersection position C1, and satisfies Conditional Expression (3) below, $$|Ra2/Ra1| > 9 \quad (3)$$

where Ra1 represents the enlargement-side radius of curvature of the lens L6, and Ra2 represents the reduction-side radius of curvature of the lens L6.

That is, in the present example, $$Ra1 = 137.83, \text{ and}$$

$$Ra2 = 1447.20$$

are satisfied, and $$|Ra2/Ra1| = 10.50$$

is satisfied.

The projection system 3C according to the present example satisfies Conditional Expression (4) below, $$0.4 < FLU1\text{ave}/FLU2\text{ave} < 0.9 \quad (4)$$

where the focal length of each of the lenses that form the first optical system 31 and the second optical system 32 is divided by the focal length f0 of the entire projection system 3C to normalize the focal length, FLU1ave representing the average of the absolute values of the focal lengths of the lenses in the first optical system 31, and FLU2ave representing the average of the absolute values of the focal lengths of the lenses in the second optical system 32.

That is, in the present example, $$FLU1\text{ave} = 11.96, \text{ and}$$

$$FLU2\text{ave} = 18.76$$

are satisfied, and $$FLU1\text{ave}/FLU2\text{ave} = 0.64$$

is satisfied.

Furthermore, in the present example, in the third lens group G3, the Abbe number of the lens L25, which is located in a position closest to the reduction side, and the Abbe number of the lens L24, which is located in a position adjacent to the lens L25, are each smaller than 30. That is, the Abbe number of the lens L24 is 20.02, and the Abbe number of the lens L25 is 20.02.

Effects and Advantages

Figure 10:
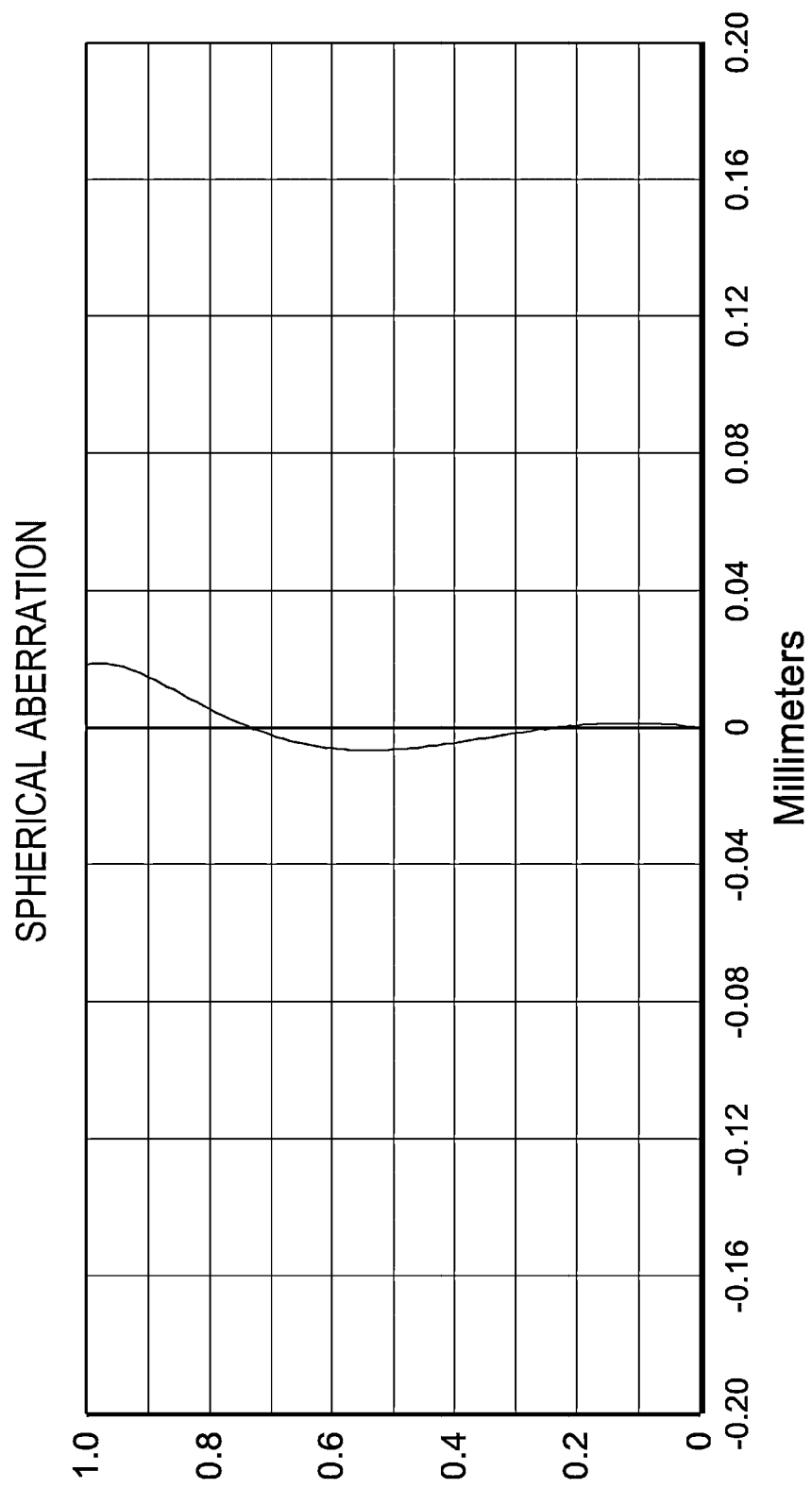
FIG. 10 shows the spherical aberration produced by the projection system according to Example 3.
Figure 11:
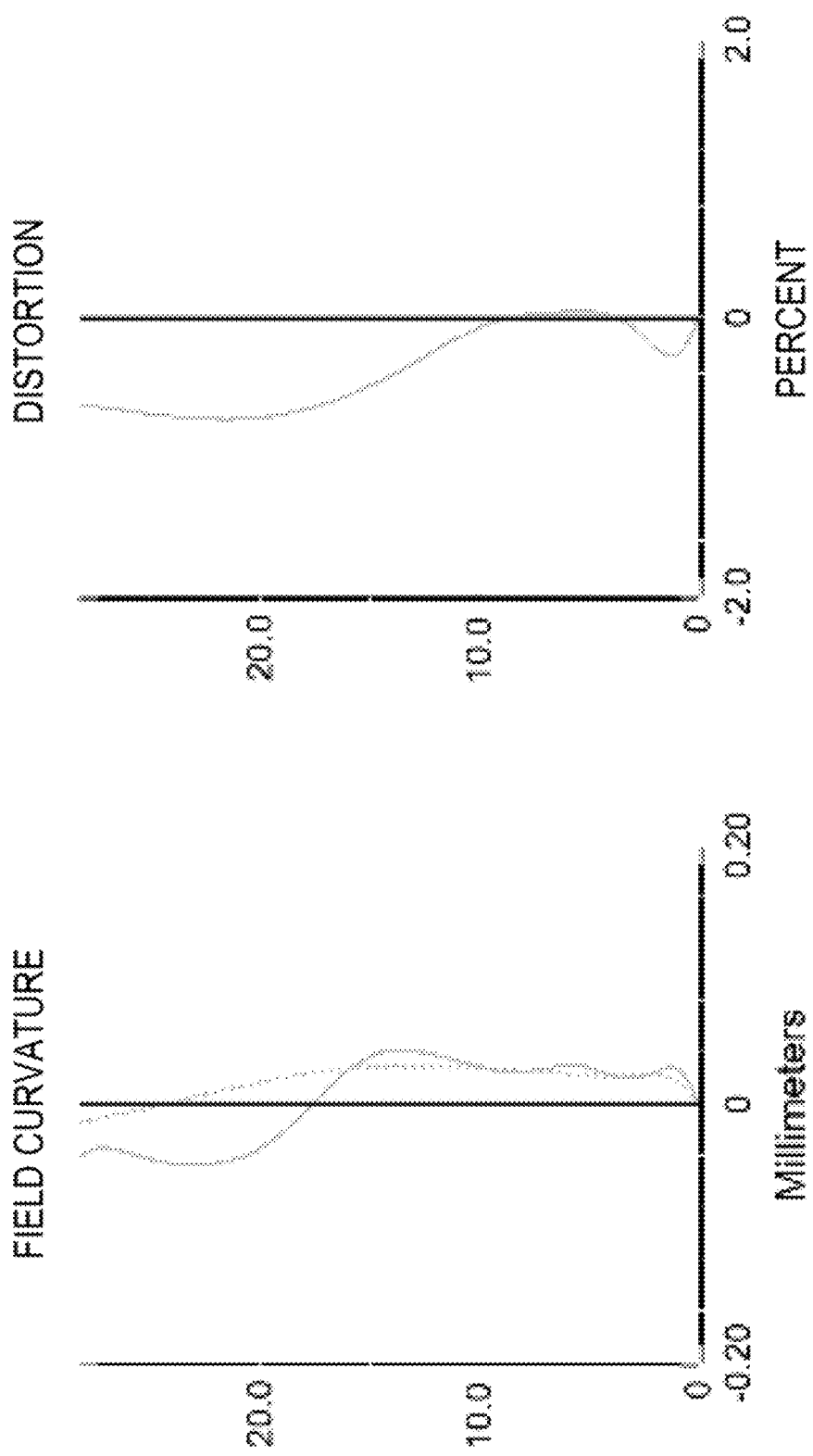
FIG. 11 shows the field curvature and the distortion produced by the projection system according to Example 3.

The projection system 3C according to the present example can provide the same effects and advantages as those provided by the projection system 3A according to Example 1. FIG. 10 shows the spherical aberration produced by the projection system 3C. FIG. 11 shows the field curvature and the distortion produced by the projection system 3C. The spherical aberration, the field curvature, and the distortion produced by the projection system 3C according to the present example are suppressed, as shown in FIGS. 10 and 11.

Variation of Example 3

The projection system 3C can include a first mirror (first deflector) and a second mirror (second deflector), which deflect the optical path of the projection system 3C, as the projection system 3A according to the variation of Example 1 can. In this case, a first mirror 33 is disposed between the first optical system 31 and the second optical system 32, and the first mirror 33 is located on the reduction side of the intermediate image 35. A second mirror 34 is disposed between the lens L17 of the second optical system 32 and the lens L18 of the second optical system 32. The second mirror 34 is located on the enlargement side of the aperture OP. The on-axis inter-surface distance between the lenses L17 and L18 is the longest of the plurality of on-axis inter-surface distances between two adjacent lenses in the second optical system 32. The second mirror 34 is therefore readily disposed between lenses L17 and L18.

The projection system 3C according to the variation of Example 3 can also provide the same effects and advantages as those provided by the projection system 3A according to the variation of Example 1.

Example 4

Figure 12:
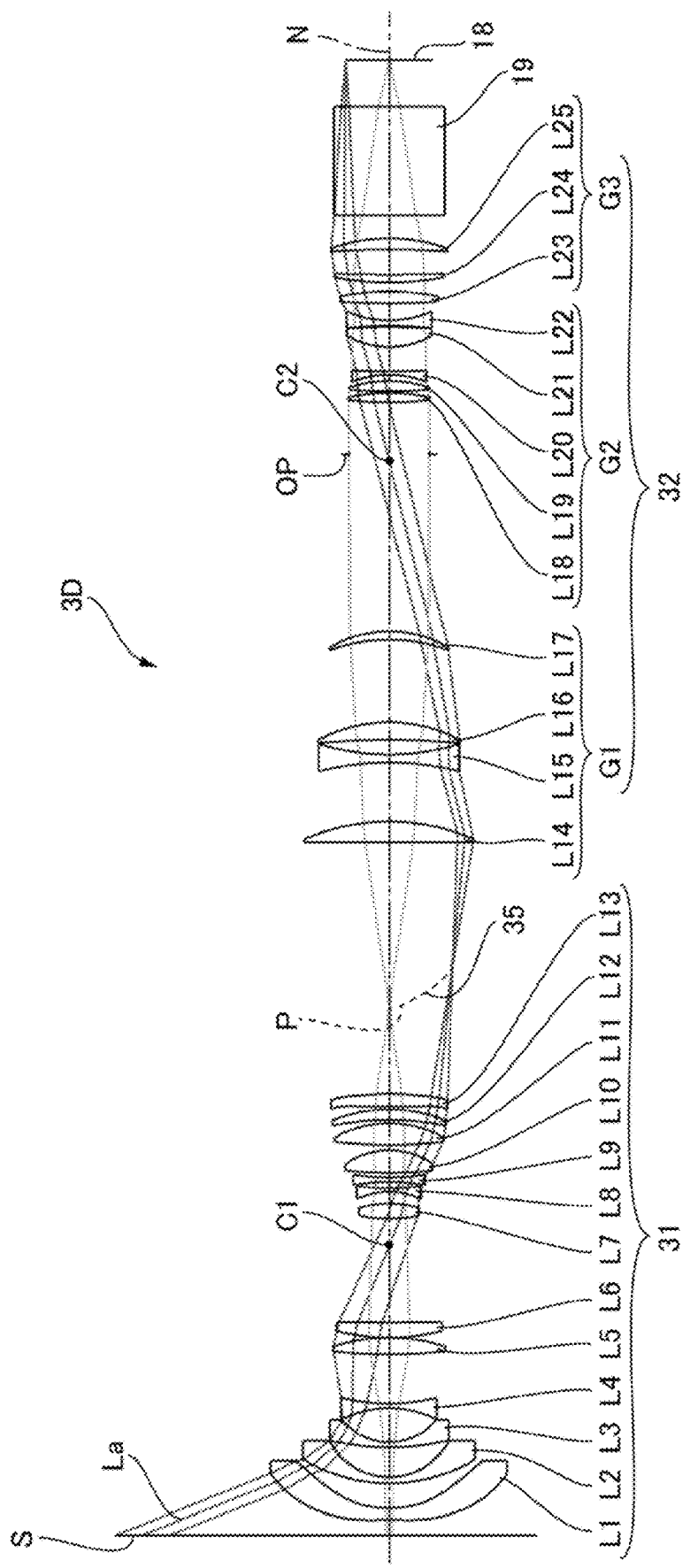
FIG. 12 is a beam diagram of a projection system according to Example 4.

FIG. 12 is a beam diagram of a projection system 3D according to Example 4. The projection system 3D includes a first optical system 31 and a second optical system 32 disposed on the reduction side of the first optical system 31, as shown in FIG. 12. The first optical system 31 has positive power. The second optical system 32 has negative power. An intermediate image 35 conjugate with the reduction-side conjugate plane and the enlargement-side conjugate plane of the projection system 3D is formed between the first optical system 31 and the second optical system 32.

The first optical system 31 includes 13 lenses L1 to L13. The lenses L1 to L13 are arranged in this order from the enlargement side toward the reduction side. The lenses L1 to L13 have the same shapes as those of the lenses of the projection system 3A according to Example 1. Furthermore, the lenses L1 to L13 each have the same power as that of the corresponding lens of the projection system 3A according to Example 1.

In the first optical system 31, there is therefore an intersection position C1, where a chief ray La of an off-axis beam having a maximum angle of view intersects with an optical axis N, between the lens L6 and the lens L7. In the first optical system 31, the lens L6, which is on the enlargement side of and adjacent to the intersection position C1, has a meniscus shape having a convex surface on the enlargement side. The lens L6 has positive power.

The second optical system 32 accommodates an aperture OP. In the present example, the aperture OP is disposed in an intersection position C2, where the chief ray La of the off-axis beam having the maximum angle of view intersects with the optical axis N in the second optical system 32. The second optical system 32 includes a first lens group G1 disposed on the enlargement side of the intersection position C2, a second lens group G2 disposed on the reduction side of the intersection position C2, and a third lens group G3 disposed on the reduction side of the second lens group G2. In more detail, the second lens group G2 is disposed in a position on the reduction side of and adjacent to the intersection position C2. The second lens group G2 includes a lens L18, a lens L19, a lens L20, a lens L21, and a lens L22 arranged sequentially from the enlargement side toward the reduction side. The number of lenses of the second lens group G2 is five. The lenses L18 and L19 each have positive power. The lens L20 has negative power. The lens L21 has convex surfaces on the enlargement and reduction sides. The lens L21 has positive power. The lens L22 has negative power.

The third lens group G3 is located between the second lens group G2 and a cross dichroic prism 19. The third lens group G3 includes a lens L23, a lens L24, and a lens L25 arranged sequentially from the enlargement side toward the reduction side. The lenses L23, L24, and L25 all have positive power. The number of lenses that form the third lens group G3 is three. The sum of the number of lenses of the second lens group G2 and the number of lenses of the third lens group G3 is therefore eight.

Liquid crystal panels 18 form images on one side of the optical axis N. The intermediate image 35 is formed on the other side of the optical axis N. The enlarged image is formed on the one side of the optical axis N. The chief ray La of the off-axis beam, which passes through the space between the lens L13 of the first optical system 31 and the lens L14 of the second optical system 32, which are lenses located on opposite sides of the intermediate image 35 in the direction of the optical axis N, approaches the optical axis N as the chief ray La travels from the reduction side toward the enlargement side, as shown in FIG. 12. A focal position P, where the off-axis beam is brought into focus in the intermediate image 35, approaches the lens L14 of the second optical system 32 as the focal position P is separate away from the optical axis.

Data on the projection system 3D according to Example 4 are listed below,

| | |
|---|---|
| f0 | −11.10 mm |
| FNo | 2.23 |
| Φ | 56.40 mm |
| BF | 91.26 mm |
| fLU1 | 16.96 mm |
| fLU2 | −1089.32 mm | where f0 represents the focal length of the entire projection system 3D, FNo represents the F-number, Φ represents the effective image circle diameter, BF represents the back focal length in air, fLU1 represents the focal length of the first optical system 31, and fLU2 represents the focal length of the second optical system 32.

Data on the lenses of the projection system 3D are listed below. The surfaces of the lenses are numbered sequentially from the enlargement side toward the reduction side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspheric surface has a surface number followed by *. Reference character R represents the radius of curvature. Reference character D represents the on-axis inter-surface distance. Reference character nd represents the refractive index. Reference character vd represents the Abbe number. Reference character f represents the focal length of the lens and is a normalized value resulting from division of the focal length by the focal length f0 of the entire projection system 3D. Reference characters R and D are expressed in millimeters.

| Reference character | Surface number | r | d | nd | vd | f |
|---|---|---|---|---|---|---|
| S | 0 | Infinity | 1507.00 | | | |
| L1 | 1* | −160.995 | 7.67 | 1.50919 | 56.32 | 13.74 |
| | 2* | 153.518 | 15.67 | | | |
| L2 | 3 | 108.418 | 3.91 | 1.83481 | 42.74 | 7.98 |
| | 4 | 43.363 | 19.45 | | | |
| L3 | 5 | 169.564 | 3.27 | 1.83481 | 42.74 | 5.75 |
| | 6 | 40.332 | 21.92 | | | |
| L4 | 7 | −67.728 | 2.86 | 1.49700 | 81.61 | 7.96 |
| | 8 | 127.478 | 31.94 | | | |
| L5 | 9 | 346.143 | 10.63 | 1.88300 | 40.81 | −8.94 |
| | 10 | −116.370 | 0.10 | | | |
| L6 | 11 | 138.604 | 9.63 | 1.88300 | 40.81 | −15.50 |
| | 12 | 1455.342 | 66.75 | | | |
| L7 | 13 | 102.040 | 9.79 | 1.61800 | 63.40 | −5.88 |
| | 14 | −64.598 | 7.64 | | | |
| L8 | 15 | −46.672 | 2.17 | 1.73800 | 32.33 | 4.40 |
| | 16 | 165.292 | 4.13 | | | |
| L9 | 17 | −121.882 | 2.89 | 1.86966 | 20.02 | 7.27 |
| | 18 | 171.254 | 2.90 | | | |
| L10 | 19 | 321.653 | 14.39 | 1.49700 | 81.61 | −7.99 |
| | 20 | −50.482 | 3.66 | | | |
| L11 | 21 | 299.580 | 13.98 | 1.43700 | 95.10 | −11.95 |
| | 22 | −71.074 | 2.16 | | | |
| L12 | 23 | −182.412 | 6.72 | 1.43700 | 95.10 | −42.04 |
| | 24 | −97.468 | 1.85 | | | |
| L13 | 25* | −4153.025 | 8.09 | 1.58699 | 59.48 | −19.51 |
| | 26* | −123.877 | 162.01 | | | |
| L14 | 27 | Infinity | 13.47 | 1.83481 | 42.72 | −14.69 |
| | 28 | −136.754 | 37.80 | | | |
| L15 | 29 | −179.259 | 4.96 | 1.73800 | 32.33 | 9.78 |
| | 30 | 148.296 | 9.59 | | | |

-continued

| Reference character | Surface number | r | d | nd | vd | f |
|---|---|---|---|---|---|---|
| L16 | 31 | −506.982 | 11.42 | 1.83481 | 42.72 | −12.54 |
|  | 32 | −95.893 | 53.24 |  |  |  |
| L17 | 33 | −111.382 | 5.34 | 1.43700 | 95.10 | −47.23 |
|  | 34 | −76.097 | 113.91 |  |  |  |
| OP | 35 | Infinity | 33.67 |  |  |  |
| L18 | 36 | 276.676 | 5.88 | 1.48749 | 70.24 | −16.00 |
|  | 37 | −125.639 | 1.01 |  |  |  |
| L19 | 38 | 336.958 | 6.80 | 1.43700 | 95.10 | −13.53 |
|  | 39 | −81.242 | 3.84 |  |  |  |
| L20 | 40 | −69.628 | 2.09 | 1.73800 | 32.33 | 8.45 |
|  | 41 | 389.006 | 16.04 |  |  |  |
| L21 | 42 | 56.293 | 12.88 | 1.43700 | 95.10 | −11.58 |
|  | 43 | −436.037 | 0.69 |  |  |  |
| L22 | 44 | −273.783 | 3.50 | 1.73800 | 32.33 | 6.66 |
|  | 45 | 69.077 | 11.00 |  |  |  |
| L23 | 46 | 431.517 | 7.68 | 1.43700 | 95.10 | −23.37 |
|  | 47 | −153.342 | 5.78 |  |  |  |
| L24 | 48 | 193.157 | 5.10 | 1.86966 | 20.02 | −23.12 |
|  | 49 | 1328.802 | 15.91 |  |  |  |
| L25 | 50 | −518.200 | 7.02 | 1.86966 | 20.02 | −14.89 |
|  | 51 | −114.172 | 15.00 |  |  |  |
| 19 | 52 | Infinity | 70.00 | 1.51680 | 64.20 |  |
|  | 53 | Infinity | 30.17 |  |  |  |
| 18 |  | Infinity | 0.00 |  |  |  |

The aspheric coefficients are listed below.

| Surface number | 1 | 2 |
|---|---|---|
| Conic constant | −119.1883 | 1.9160 |
| Third-order aspheric coefficient | 1.369435E−04 | 1.861840E−04 |
| Fourth-order aspheric coefficient | −6.417622E−07 | −5.411199E−07 |
| Fifth-order aspheric coefficient | −1.559801E−08 | −2.186490E−08 |
| Sixth-order aspheric coefficient | 1.013066E−10 | −1.785149E−10 |
| Seventh-order aspheric coefficient | 2.644644E−12 | 6.981191E−13 |
| Eighth-order aspheric coefficient | −1.814145E−14 | 9.789075E−15 |
| Ninth-order aspheric coefficient | −7.209171E−17 | 9.838815E−16 |
| Tenth-order aspheric coefficient | 1.917689E−19 | −3.633544E−18 |
| Eleventh-order aspheric coefficient | 5.498971E−22 | 1.017929E−19 |
| Twelfth-order aspheric coefficient | −5.581196E−23 | −2.945517E−21 |
| Thirteenth-order aspheric coefficient | 1.147253E−24 | −3.426776E−23 |
| Fourteenth-order aspheric coefficient | 1.389968E−26 | 1.667164E−25 |
| Fifteenth-order aspheric coefficient | −1.433909E−28 | 1.036990E−26 |
| Sixteenth-order aspheric coefficient | 6.646756E−31 | −5.866360E−29 |
| Seventeenth-order aspheric coefficient | −1.138980E−32 | −1.131038E−31 |
| Eighteenth-order aspheric coefficient | 8.335797E−35 | −9.816995E−35 |

| Surface number | 25 | 26 |
|---|---|---|
| Conic constant | 0 | 0 |
| Fourth-order aspheric coefficient | 2.494645E−06 | 4.454144E−06 |
| Sixth-order aspheric coefficient | −2.343693E−09 | −2.770878E−09 |
| Eighth-order aspheric coefficient | −5.687602E−13 | −2.476486E−13 |
| Tenth-order aspheric coefficient | 1.119673E−15 | 1.232995E−16 |
| Twelfth-order aspheric coefficient | −1.570825E−18 | 6.907288E−21 |
| Fourteenth-order aspheric coefficient | 1.095639E−21 | 1.227550E−22 |
| Sixteenth-order aspheric coefficient | −1.717624E−25 | 2.407175E−26 |
| Eighteenth-order aspheric coefficient | −4.243686E−29 | −4.047153E−29 |
| Twentieth-order aspheric coefficient | 4.368049E−33 | 6.352225E−33 |

The projection system 3D according to the present example satisfies Conditional Expression (1) below, $$-0.5 < fLU2G3/fLU2G2 < 0 \quad (1)$$

where fLU2G2 represents the focal length of the second lens group G2 in the second optical system 32 and fLU2G3 represents the focal length of the third lens group G3 in the second optical system 32.

That is, in the present example, $$fLU2G2 = -402.02, \text{ and}$$

$$fLU2G3 = 80.38$$

are satisfied, and $$fLU2G3/fLU2G2 = -0.20$$

is satisfied.

The projection system 3D according to the present example satisfies Conditional Expression (2) below, $$|fs1/f0| > 10 \quad (2)$$

where fs1 represents the focal length of the lens L18, and f0 represents the focal length of the entire projection system 3D.

That is, in the present example, $$fs1 = 177.55, \text{ and}$$

$$f0 = -11.10$$

are satisfied, and $$|fs1/f0| = 16.00$$

is satisfied.

Furthermore, the projection system 3D according to the present example includes the lens L6, which is located on the enlargement side of the intersection position C1, where the chief ray La of the off-axis beam having the maximum angle of view intersects with the optical axis N in the first optical system 31, and is adjacent to the intersection position C1, and satisfies Conditional Expression (3) below, $$|Ra2/Ra1| > 9 \quad (3)$$

where Ra1 represents the enlargement-side radius of curvature of the lens L6, and Ra2 represents the reduction-side radius of curvature of the lens L6.

That is, in the present example, $$Ra1 = 138.60, \text{ and}$$

$$Ra2 = 1455.34$$

are satisfied, and $$|Ra2/Ra1| = 10.50$$

is satisfied.

The projection system 3D according to the present example satisfies Conditional Expression (4) below, $$0.4 < FLU1\text{ave}/FLU2\text{ave} < 0.9 \quad (4)$$

where the focal length of each of the lenses that form the first optical system 31 and the second optical system 32 is divided by the focal length f0 of the entire projection system 3D to normalize the focal length, FLU1ave representing the average of the absolute values of the focal lengths of the lenses in the first optical system 31, and FLU2ave representing the average of the absolute values of the focal lengths of the lenses in the second optical system 32.

That is, in the present example, $FLU1\text{ave} = 12.22$, and $FLU2\text{ave} = 16.82$ are satisfied, and $FLU1\text{ave}/FLU2\text{ave} = 0.73$ is satisfied.

Furthermore, in the present example, in the third lens group G3, the Abbe number of the lens L25, which is located in a position closest to the reduction side, and the Abbe number of the lens L24, which is located in a position adjacent to the lens L25, are each smaller than 30. That is, the Abbe number of the lens L24 is 20.02, and the Abbe number of the lens L25 is 20.02.

Effects and Advantages

Figure 13:
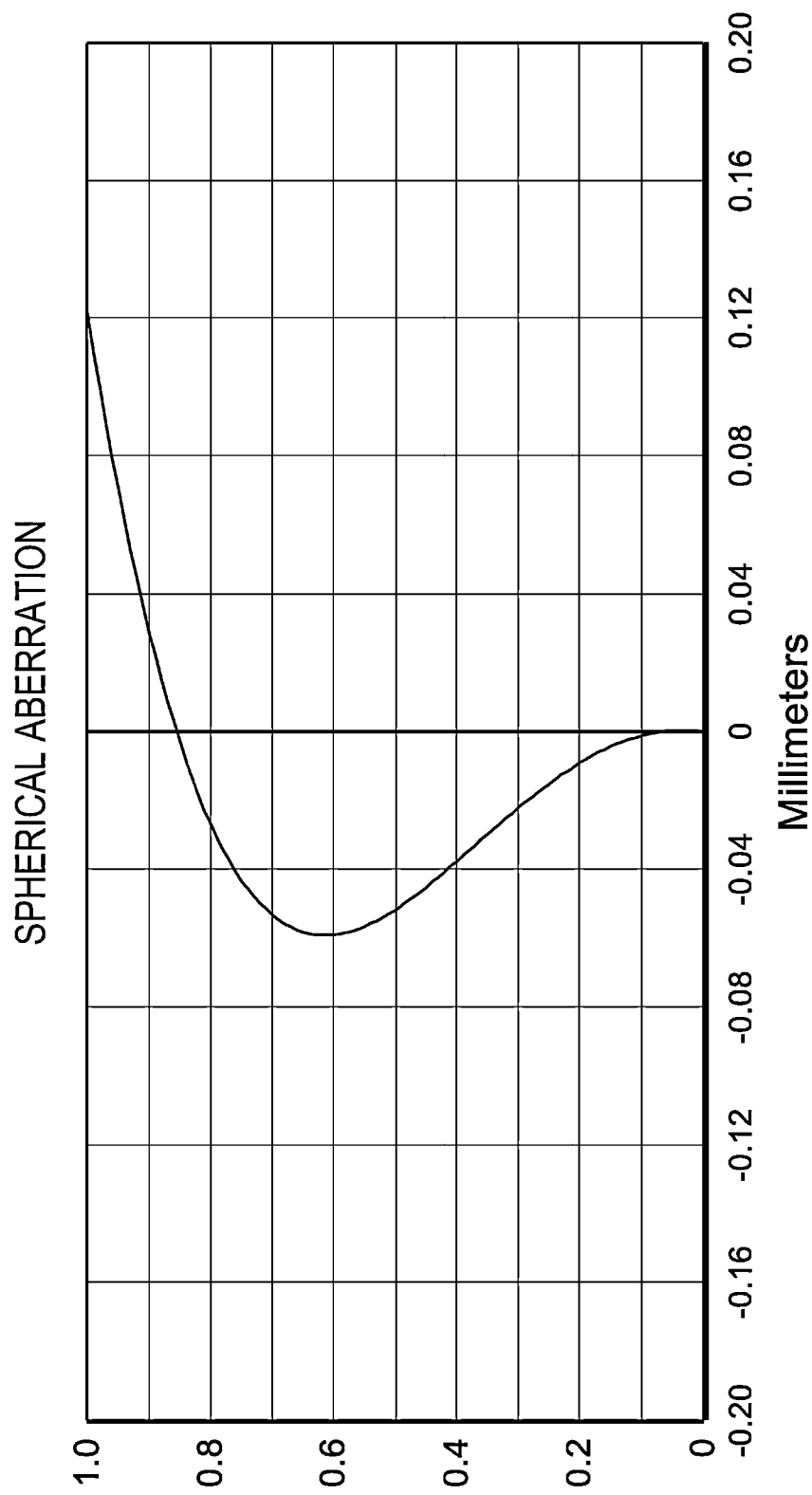
FIG. 13 shows the spherical aberration produced by the projection system according to Example 4.
Figure 14:
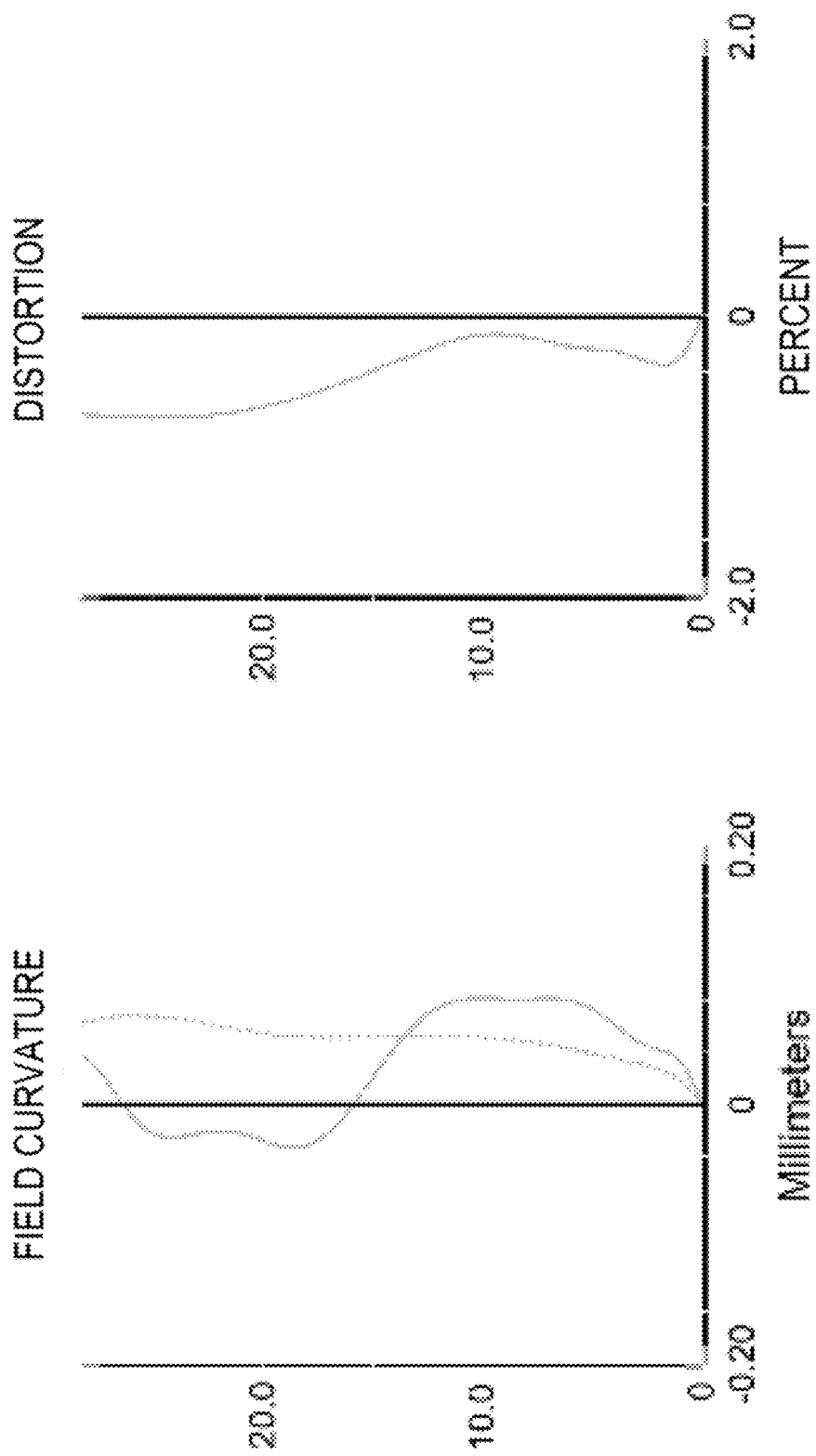
FIG. 14 shows the field curvature and the distortion produced by the projection system according to Example 4.

The projection system 3D according to the present example can provide the same effects and advantages as those provided by the projection system 3A according to Example 1. FIG. 13 shows the spherical aberration produced by the projection system 3D. FIG. 14 shows the field curvature and the distortion produced by the projection system 3D. The spherical aberration, the field curvature, and the distortion produced by the projection system 3D according to the present example are suppressed, as shown in FIGS. 13 and 14.

Variation of Example 4

The projection system 3D can include a first mirror (first deflector) and a second mirror (second deflector), which deflect the optical path of the projection system 3D, as the projection system 3A according to the variation of Example 1 can. In this case, a first mirror 33 is disposed between the first optical system 31 and the second optical system 32, and the first mirror 33 is located on the reduction side of the intermediate image 35. A second mirror 34 is disposed between the lens L17 of the second optical system 32 and the lens L18 of the second optical system 32. The second mirror 34 is located on the enlargement side of the aperture OP. The on-axis inter-surface distance between the lenses L17 and L18 is the longest of the plurality of on-axis inter-surface distances between two adjacent lenses in the second optical system 32. The second mirror 34 is therefore readily disposed between lenses L17 and L18.

The projection system 3D according to the variation of Example 4 can also provide the same effects and advantages as those provided by the projection system 3A according to the variation of Example 1.

Example 5

Figure 15:
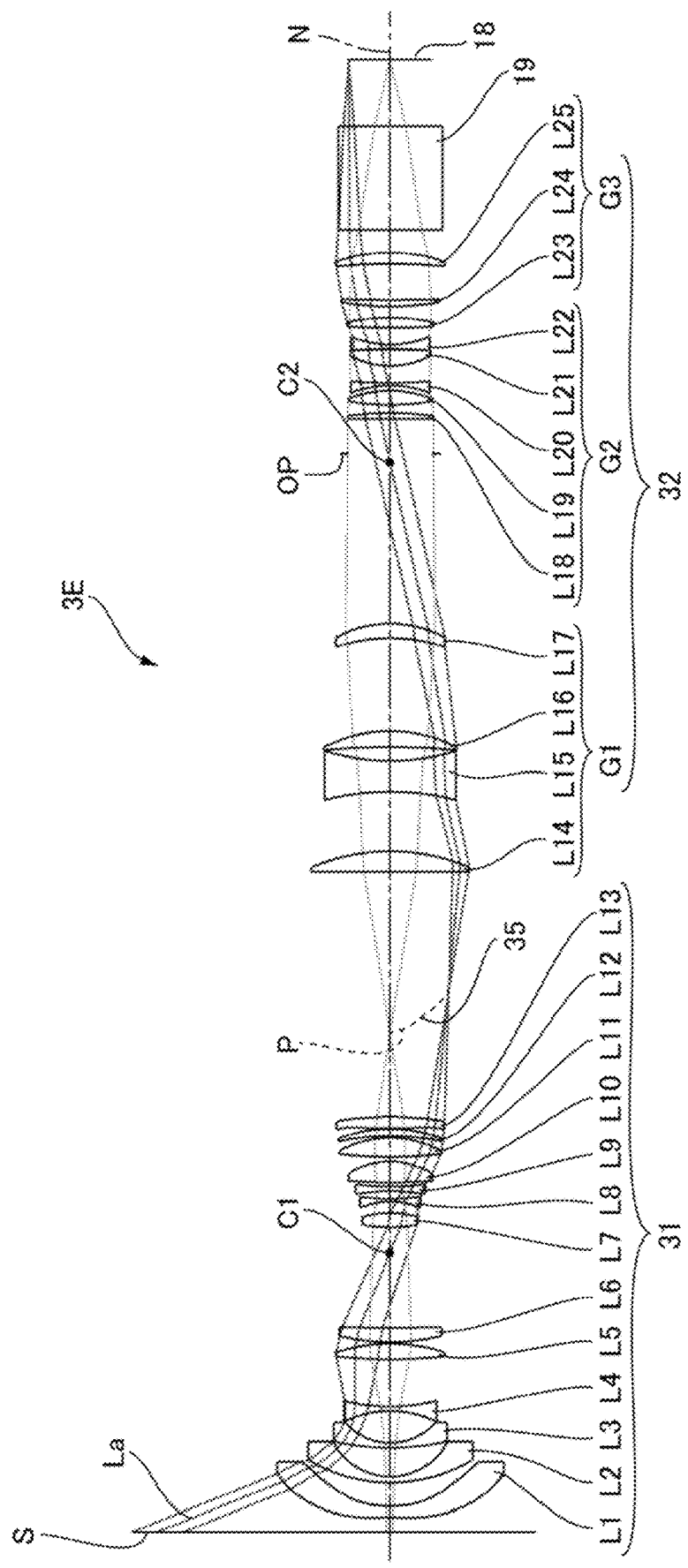
FIG. 15 is a beam diagram of a projection system according to Example 5.

FIG. 15 is a beam diagram of a projection system 3E according to Example 5. The projection system 3E includes a first optical system 31 and a second optical system 32 disposed on the reduction side of the first optical system 31, as shown in FIG. 15. The first optical system 31 has positive power. The second optical system 32 has negative power. An intermediate image 35 conjugate with the reduction-side conjugate plane and the enlargement-side conjugate plane of the projection system 3E is formed between the first optical system 31 and the second optical system 32.

The first optical system 31 includes 13 lenses L1 to L13. The lenses L1 to L13 are arranged in this order from the enlargement side toward the reduction side. The lenses L1 to L13 have the same shapes as those of the lenses of the projection system 3A according to Example 1. Furthermore, the lenses L1 to L13 each have the same power as that of the corresponding lens of the projection system 3A according to Example 1.

In the first optical system 31, there is therefore an intersection position C1, where a chief ray La of an off-axis beam having a maximum angle of view intersects with an optical axis N, between the lens L6 and the lens L7. In the first optical system 31, the lens L6, which is on the enlargement side of and adjacent to the intersection position C1, has a meniscus shape having a convex surface on the enlargement side. The lens L6 has positive power.

The second optical system 32 accommodates an aperture OP. In the present example, the aperture OP is disposed in an intersection position C2, where the chief ray La of the off-axis beam having the maximum angle of view intersects with the optical axis N in the second optical system 32. The second optical system 32 includes a first lens group G1 disposed on the enlargement side of the intersection position C2, a second lens group G2 disposed on the reduction side of the intersection position C2, and a third lens group G3 disposed on the reduction side of the second lens group G2. In more detail, the second lens group G2 is disposed in a position on the reduction side of and adjacent to the intersection position C2. The second lens group G2 includes a lens L18, a lens L19, a lens L20, a lens L21, and a lens L22 arranged sequentially from the enlargement side toward the reduction side. The number of lenses of the second lens group G2 is five. The lenses L18 and L19 each have positive power. The lens L20 has negative power. The lens L21 has convex surfaces on the enlargement and reduction sides. The lens L21 has positive power. The lens L22 has negative power.

The third lens group G3 is located between the second lens group G2 and a cross dichroic prism 19. The third lens group G3 includes a lens L23, a lens L24, and a lens L25 arranged sequentially from the enlargement side toward the reduction side. The lenses L23, L24, and L25 all have positive power. The number of lenses that form the third lens group G3 is three. The sum of the number of lenses of the second lens group G2 and the number of lenses of the third lens group G3 is therefore eight.

Liquid crystal panels 18 form images on one side of the optical axis N. The intermediate image 35 is formed on the other side of the optical axis N. The enlarged image is formed on the one side of the optical axis N. The chief ray La of the off-axis beam, which passes through the space between the lens L13 of the first optical system 31 and the lens L14 of the second optical system 32, which are lenses located on opposite sides of the intermediate image 35 in the direction of the optical axis N, approaches the optical axis N as the chief ray La travels from the reduction side toward the enlargement side, as shown in FIG. 15. A focal position P, where the off-axis beam is brought into focus in the intermediate image 35, approaches the lens L14 of the second optical system 32 as the focal position P is separate away from the optical axis.

Data on the projection system 3E according to Example 5 are listed below,

| | |
|---|---|
| f0 | −11.20 mm |
| FNo | 2.18 |
| Φ | 56.40 mm |
| BF | 106.10 mm |
| fLU1 | 16.11 mm |
| fLU2 | −1069.90 mm | where f0 represents the focal length of the entire projection system 3E, FNo represents the F-number, Φ represents the effective image circle diameter, BF represents the back focal length in air, fLU1 represents the focal length of the first optical system 31, and fLU2 represents the focal length of the second optical system 32.

Data on the lenses of the projection system 3E are listed below. The surfaces of the lenses are numbered sequentially from the enlargement side toward the reduction side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspheric surface has a surface number followed by *. Reference character R represents the radius of curvature. Reference character D represents the on-axis inter-surface distance. Reference character nd represents the refractive index. Reference character vd represents the Abbe number. Reference character f represents the focal length of the lens and is a normalized value resulting from division of the focal length by the focal length f0 of the entire projection system 3E. Reference characters R and D are expressed in millimeters.

| Reference character | Surface number | r | d | nd | vd | f |
|---|---|---|---|---|---|---|
| S | 0 | Infinity | 1507.00 | | | |
| L1 | 1* | −152.115 | 7.53 | 1.50919 | 56.32 | 13.23 |
| | 2* | 153.360 | 15.70 | | | |
| L2 | 3 | 108.435 | 3.87 | 1.83481 | 42.74 | 7.75 |
| | 4 | 42.849 | 19.53 | | | |
| L3 | 5 | 172.104 | 3.22 | 1.83481 | 42.74 | 5.61 |
| | 6 | 40.005 | 21.62 | | | |
| L4 | 7 | −68.348 | 2.83 | 1.49700 | 81.61 | 7.86 |
| | 8 | 124.144 | 32.00 | | | |
| L5 | 9 | 332.406 | 10.39 | 1.88300 | 40.81 | −8.80 |
| | 10 | −116.928 | 0.97 | | | |
| L6 | 11 | 138.163 | 9.99 | 1.88300 | 40.81 | −15.31 |
| | 12 | 1450.712 | 67.17 | | | |
| L7 | 13 | 97.555 | 9.58 | 1.61800 | 63.40 | −5.81 |
| | 14 | −66.291 | 7.68 | | | |
| L8 | 15 | −47.461 | 2.02 | 1.73800 | 32.33 | 4.35 |
| | 16 | 155.249 | 5.11 | | | |
| L9 | 17 | −121.645 | 2.97 | 1.86966 | 20.02 | 7.17 |
| | 18 | 170.284 | 2.75 | | | |
| L10 | 19 | 319.724 | 14.33 | 1.49700 | 81.61 | −7.83 |
| | 20 | −49.900 | 3.05 | | | |
| L11 | 21 | 309.581 | 12.72 | 1.43700 | 95.10 | −11.91 |
| | 22 | −71.125 | 1.11 | | | |
| L12 | 23 | −180.458 | 4.88 | 1.43700 | 95.10 | −40.54 |
| | 24 | −95.386 | 0.53 | | | |
| L13 | 25* | 6071.656 | 7.73 | 1.58699 | 59.48 | −18.35 |
| | 26* | −123.491 | 164.97 | | | |
| L14 | 27 | Infinity | 13.42 | 1.83481 | 42.72 | −14.53 |
| | 28 | −136.491 | 40.23 | | | |
| L15 | 29 | −177.886 | 20.40 | 1.73800 | 32.33 | 9.40 |
| | 30 | 146.429 | 9.22 | | | |
| L16 | 31 | −485.770 | 10.97 | 1.83481 | 42.72 | −12.27 |
| | 32 | −94.134 | 62.51 | | | |
| L17 | 33 | −114.287 | 9.71 | 1.43700 | 95.10 | −43.10 |
| | 34 | −76.106 | 114.06 | | | |
| OP | 35 | Infinity | 23.62 | | | |
| L18 | 36 | −2635.832 | 3.94 | 1.48749 | 70.24 | −44.64 |
| | 37 | −223.849 | 5.50 | | | |
| L19 | 38 | 160.049 | 9.37 | 1.43700 | 95.10 | −10.77 |
| | 39 | −77.491 | 3.60 | | | |
| L20 | 40 | −71.168 | 2.00 | 1.73800 | 32.33 | 8.55 |
| | 41 | 468.419 | 11.22 | | | |
| L21 | 42 | 56.343 | 11.11 | 1.43700 | 95.10 | −11.49 |
| | 43 | −372.164 | 0.54 | | | |
| L22 | 44 | −270.785 | 2.88 | 1.73800 | 32.33 | 6.58 |
| | 45 | 68.948 | 10.99 | | | |
| L23 | 46 | 396.788 | 6.96 | 1.43700 | 95.10 | −20.56 |
| | 47 | −134.491 | 7.69 | | | |
| L24 | 48 | 203.790 | 4.27 | 1.86966 | 20.02 | −26.63 |
| | 49 | 906.718 | 23.91 | | | |
| L25 | 50 | −471.539 | 7.63 | 1.86966 | 20.02 | −15.03 |
| | 51 | −113.447 | 15.00 | | | |
| 19 | 52 | Infinity | 70.00 | 1.51680 | 64.20 | |
| | 53 | Infinity | 45.00 | | | |
| 18 | | Infinity | 0.00 | | | |

The aspheric coefficients are listed below.

| Surface number | 1 | 2 |
|---|---|---|
| Conic constant | −119.4491 | 1.9425 |
| Third-order aspheric coefficient | 1.365299E−04 | 1.864329E−04 |
| Fourth-order aspheric coefficient | −6.436096E−07 | −5.398429E−07 |
| Fifth-order aspheric coefficient | −1.560324E−08 | −2.185322E−08 |
| Sixth-order aspheric coefficient | 1.021146E−10 | −1.787108E−10 |
| Seventh-order aspheric coefficient | 2.651793E−12 | 6.940895E−13 |
| Eighth-order aspheric coefficient | −1.812828E−14 | 9.757488E−15 |
| Ninth-order aspheric coefficient | −7.202431E−17 | 9.814859E−16 |
| Tenth-order aspheric coefficient | 1.944362E−19 | −3.657555E−18 |
| Eleventh-order aspheric coefficient | 5.001509E−22 | 1.015151E−19 |
| Twelfth-order aspheric coefficient | −5.605950E−23 | −2.953251E−21 |
| Thirteenth-order aspheric coefficient | 1.156948E−24 | −3.435002E−23 |
| Fourteenth-order aspheric coefficient | 1.395159E−26 | 1.661758E−25 |
| Fifteenth-order aspheric coefficient | −1.442562E−28 | 1.037122E−26 |
| Sixteenth-order aspheric coefficient | 6.680577E−31 | −5.860167E−29 |
| Seventeenth-order aspheric coefficient | −1.137045E−32 | −1.102597E−31 |
| Eighteenth-order aspheric coefficient | 8.295887E−35 | 1.417173E−35 |

| Surface number | 25 | 26 |
|---|---|---|
| Conic constant | 0 | 0 |
| Fourth-order aspheric coefficient | 2.421442E−06 | 4.516746E−06 |
| Sixth-order aspheric coefficient | −2.340972E−09 | −2.774087E−09 |
| Eighth-order aspheric coefficient | −5.625175E−13 | −2.528468E−13 |
| Tenth-order aspheric coefficient | 1.121958E−15 | 1.235647E−16 |

-continued

| | | |
|---|---|---|
| Twelfth-order aspheric coefficient | −1.570027E−18 | 8.390623E−21 |
| Fourteenth-order aspheric coefficient | 1.095857E−21 | 1.243009E−22 |
| Sixteenth-order aspheric coefficient | −1.714197E−25 | 2.512070E−26 |
| Eighteenth-order aspheric coefficient | −4.180930E−29 | −3.980066E−29 |
| Twentieth-order aspheric coefficient | 5.303740E−33 | 6.553663E−33 |

The projection system 3E according to the present example satisfies Conditional Expression (1) below, $$-0.5 < fLU2G3/fLU2G2 < 0 \quad (1)$$

where fLU2G2 represents the focal length of the second lens group G2 in the second optical system 32, and fLU2G3 represents the focal length of the third lens group G3 in the second optical system 32.

That is, in the present example, $fLU2G2 = -223.21$, and $fLU2G3 = 84.34$ are satisfied, and $fLU2G3/fLU2G2 = -0.38$ is satisfied.

The projection system 3E according to the present example satisfies Conditional Expression (2) below, $$|fs1/f0| > 10 \quad (2)$$

where fs1 represents the focal length of the lens L18, and f0 represents the focal length of the entire projection system 3E.

That is, in the present example, $fs1 = 500.01$, and $f0 = -11.20$ are satisfied, and $|fs1/f0| = 44.64$ is satisfied.

Furthermore, the projection system 3E according to the present example includes the lens L6, which is located on the enlargement side of the intersection position C1, where the chief ray La of the off-axis beam having the maximum angle of view intersects with the optical axis N in the first optical system 31, and is adjacent to the intersection position C1, and satisfies Conditional Expression (3) below, $$|Ra2/Ra1| > 9 \quad (3)$$

where Ra1 represents the enlargement-side radius of curvature of the lens L6, and Ra2 represents the reduction-side radius of curvature of the lens L6.

That is, in the present example, $Ra1 = 138.16$, and $Ra2 = 1450.71$ are satisfied, and $|Ra2/Ra1| = 10.50$ is satisfied.

The projection system 3E according to the present example satisfies Conditional Expression (4) below, $$0.4 < FLU1\text{ave}/FLU2\text{ave} < 0.9 \quad (4)$$

where the focal length of each of the lenses that form the first optical system 31 and the second optical system 32 is divided by the focal length f0 of the entire projection system 3E to normalize the focal length, FLU1ave representing the average of the absolute values of the focal lengths of the lenses in the first optical system 31, and FLU2ave representing the average of the absolute values of the focal lengths of the lenses in the second optical system 32.

That is, in the present example, $FLU1\text{ave} = 11.89$, and $FLU2\text{ave} = 18.63$ are satisfied, and $FLU1\text{ave}/FLU2\text{ave} = 0.64$ is satisfied.

Furthermore, in the present example, in the third lens group G3, the Abbe number of the lens L25, which is located in a position closest to the reduction side, and the Abbe number of the lens L24, which is located in a position adjacent to the lens L25, are each smaller than 30. That is, the Abbe number of the lens L24 is 20.02, and the Abbe number of the lens L25 is 20.02.

Effects and Advantages

Figure 16:
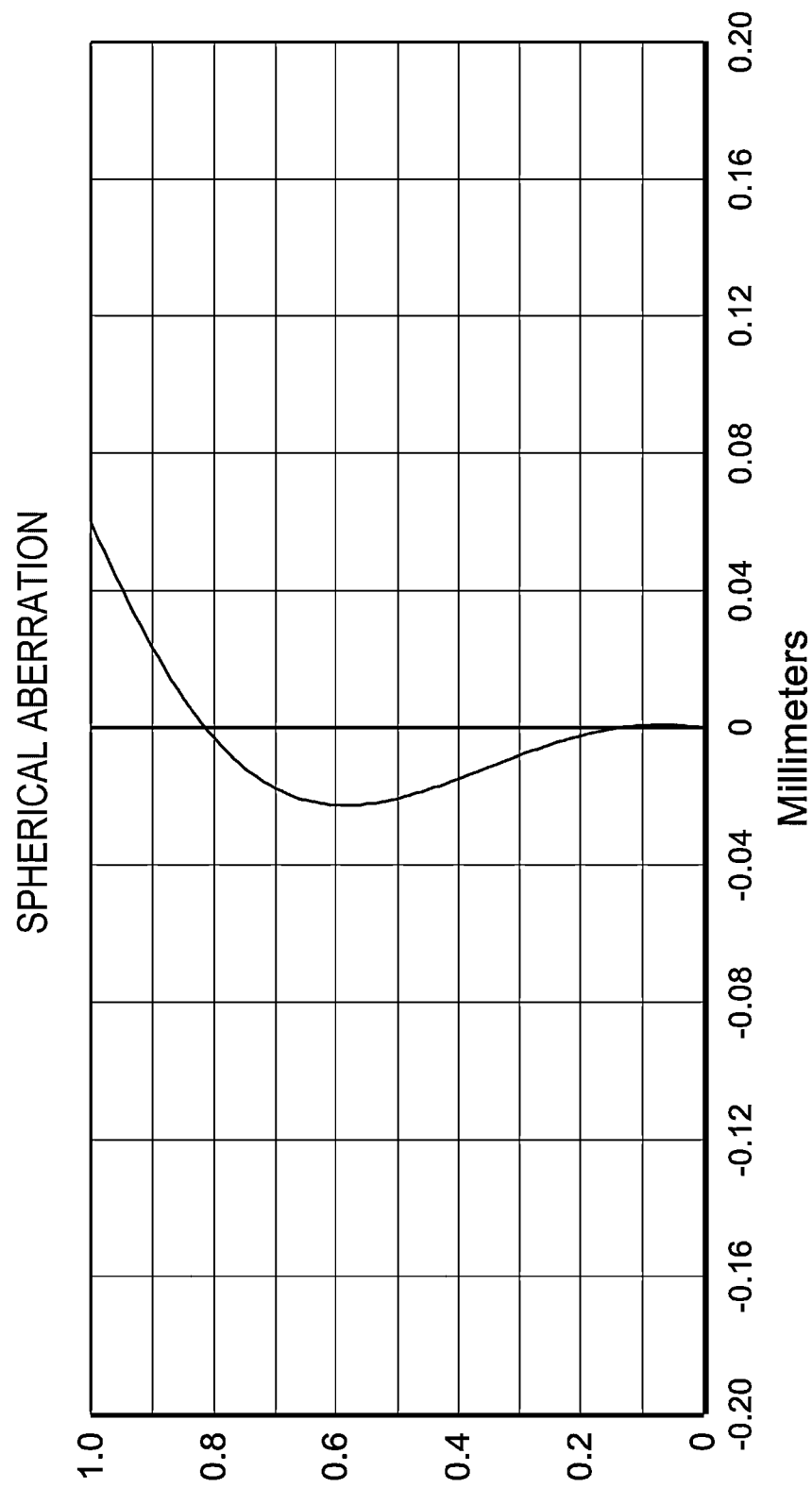
FIG. 16 shows the spherical aberration produced by the projection system according to Example 5.
Figure 17:
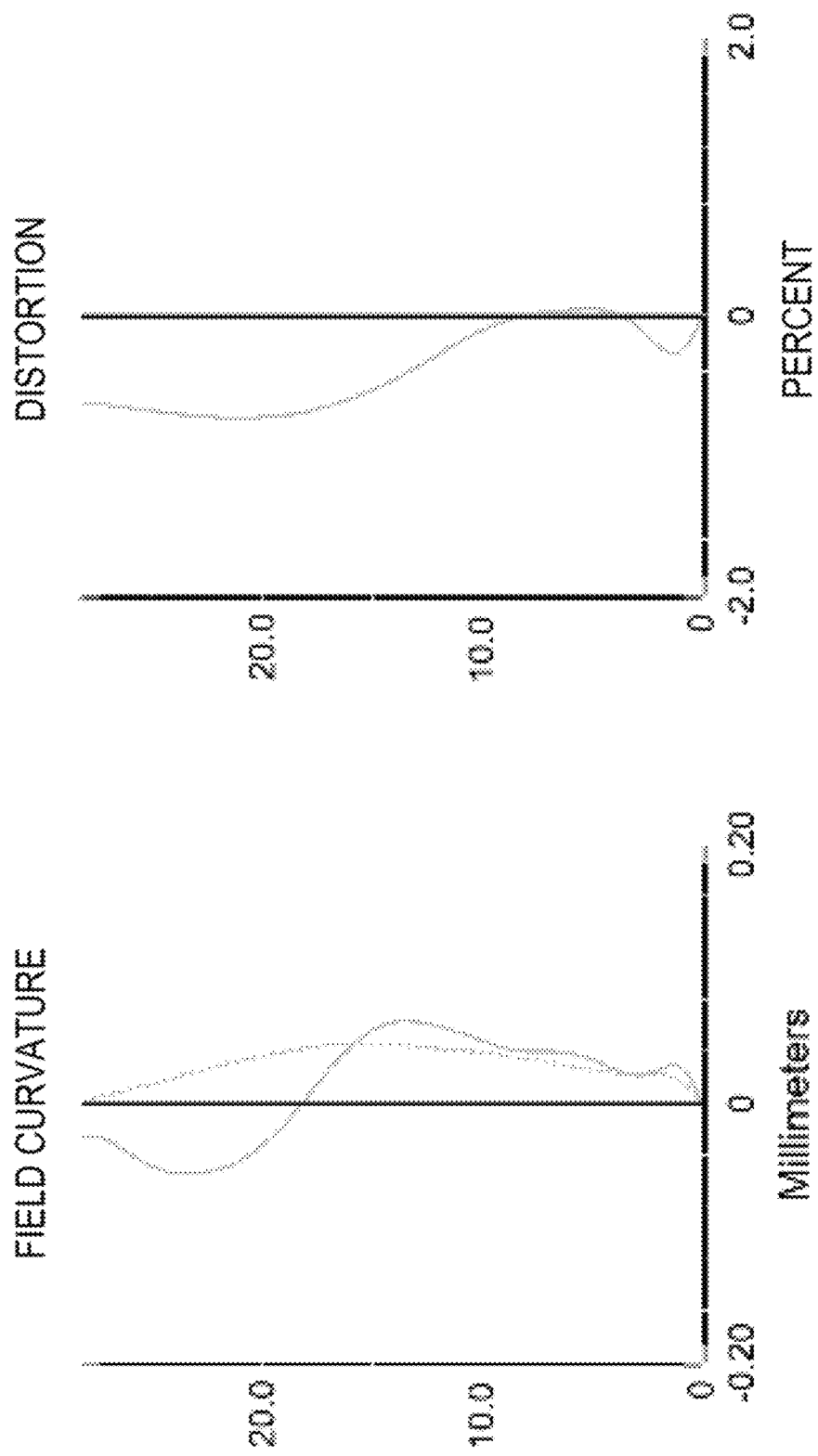
FIG. 17 shows the field curvature and the distortion produced by the projection system according to Example 5.

The projection system 3E according to the present example can provide the same effects and advantages as those provided by the projection system 3A according to Example 1. FIG. 16 shows the spherical aberration produced by the projection system 3E. FIG. 17 shows the field curvature and the distortion produced by the projection system 3E. The spherical aberration, the field curvature, and the distortion produced by the projection system 3E according to the present example are suppressed, as shown in FIGS. 16 and 17.

Variation of Example 5

The projection system 3E can include a first mirror (first deflector) and a second mirror (second deflector), which deflect the optical path of the projection system 3E, as the projection system 3A according to the variation of Example 1 can. In this case, a first mirror 33 is disposed between the first optical system 31 and the second optical system 32, and the first mirror 33 is located on the reduction side of the intermediate image 35. A second mirror 34 is disposed between the lens L17 of the second optical system 32 and the lens L18 of the second optical system 32. The second mirror 34 is located on the enlargement side of the aperture OP. The on-axis inter-surface distance between the lenses L17 and L18 is the longest of the plurality of on-axis inter-surface distances between two adjacent lenses in the second optical system 32. The second mirror 34 is therefore readily disposed between lenses L17 and L18.

The projection system 3E according to the variation of Example 5 can also provide the same effects and advantages as those provided by the projection system 3A according to the variation of Example 1.

Example 6

Figure 18:
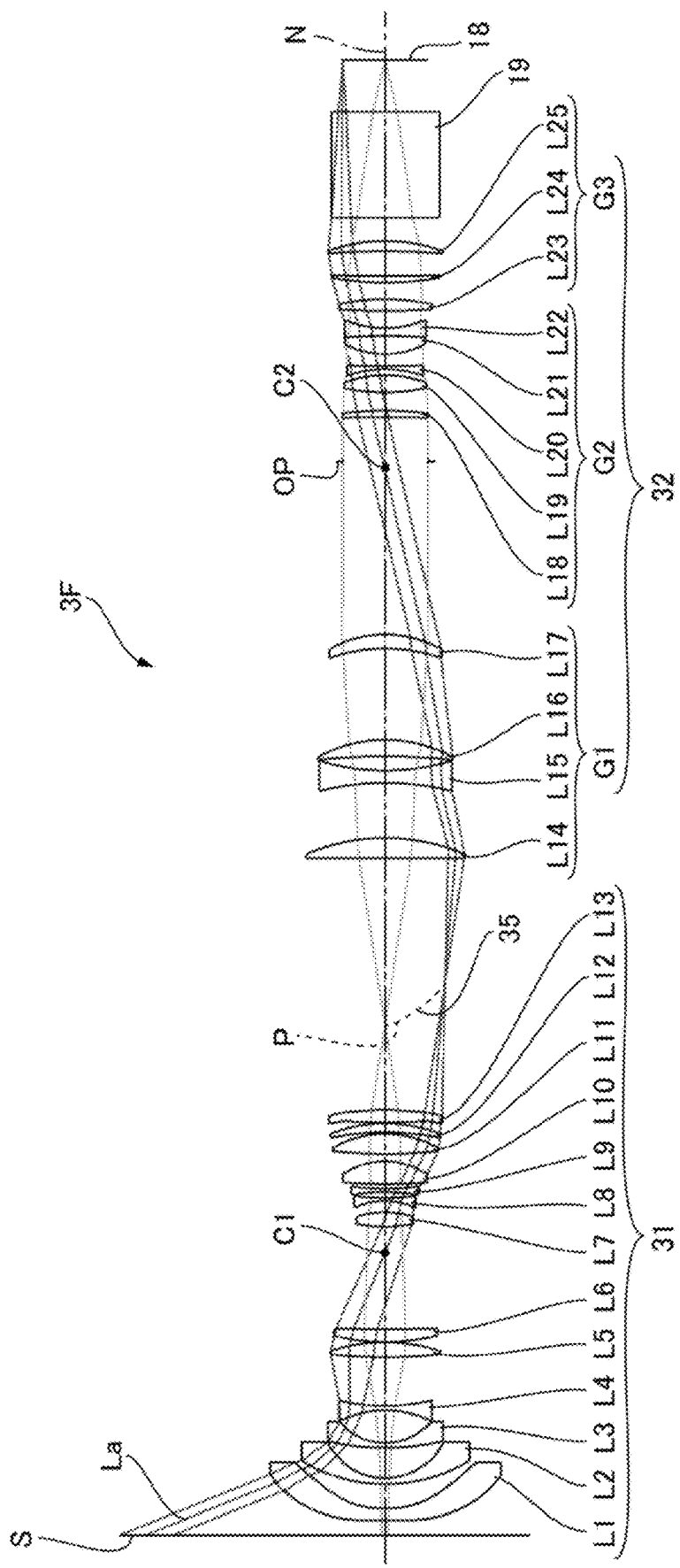
FIG. 18 is a beam diagram of a projection system according to Example 6.

FIG. 18 is a beam diagram of a projection system 3F according to Example 6. The projection system 3F includes a first optical system 31 and a second optical system 32 disposed on the reduction side of the first optical system 31, as shown in FIG. 18. The first optical system 31 has positive power. The second optical system 32 has negative power. An intermediate image 35 conjugate with the reduction-side conjugate plane and the enlargement-side conjugate plane of the projection system 3F is formed between the first optical system 31 and the second optical system 32.

The first optical system 31 includes 13 lenses L1 to L13. The lenses L1 to L13 are arranged in this order from the enlargement side toward the reduction side. The lenses L1 to L13 have the same shapes as those of the lenses of the projection system 3A according to Example 1. Furthermore, the lenses L1 to L13 each have the same power as that of the corresponding lens of the projection system 3A according to Example 1.

In the first optical system 31, there is therefore an intersection position C1, where a chief ray La of an off-axis beam having a maximum angle of view intersects with an optical axis N, between the lens L6 and the lens L7. In the first optical system 31, the lens L6, which is on the enlargement side of and adjacent to the intersection position C1, has a meniscus shape having a convex surface on the enlargement side. The lens L6 has positive power.

The second optical system 32 accommodates an aperture OP. In the present example, the aperture OP is disposed in an intersection position C2, where the chief ray La of the off-axis beam having the maximum angle of view intersects with the optical axis N in the second optical system 32. The second optical system 32 includes a first lens group G1 disposed on the enlargement side of the intersection position C2, a second lens group G2 disposed on the reduction side of the intersection position C2, and a third lens group G3 disposed on the reduction side of the second lens group G2. In more detail, the second lens group G2 is disposed in a position on the reduction side of and adjacent to the intersection position C2. The second lens group G2 includes a lens L18, a lens L19, a lens L20, a lens L21, and a lens L22 arranged sequentially from the enlargement side toward the reduction side. The number of lenses of the second lens group G2 is five. The lenses L18 and L19 each have positive power. The lens L20 has negative power. The lens L21 has convex surfaces on the enlargement and reduction sides. The lens L21 has positive power. The lens L22 has negative power.

The third lens group G3 is located between the second lens group G2 and a cross dichroic prism 19. The third lens group G3 includes a lens L23, a lens L24, and a lens L25 arranged sequentially from the enlargement side toward the reduction side. The lenses L23, L24, and L25 all have positive power. The number of lenses that form the third lens group G3 is three. The sum of the number of lenses of the second lens group G2 and the number of lenses of the third lens group G3 is therefore eight.

Liquid crystal panels 18 form images on one side of the optical axis N. The intermediate image 35 is formed on the other side of the optical axis N. The enlarged image is formed on the one side of the optical axis N. The chief ray La of the off-axis beam, which passes through the space between the lens L13 of the first optical system 31 and the lens L14 of the second optical system 32, which are lenses located on opposite sides of the intermediate image 35 in the direction of the optical axis N, approaches the optical axis N as the chief ray La travels from the reduction side toward the enlargement side, as shown in FIG. 18. A focal position P, where the off-axis beam is brought into focus in the intermediate image 35, approaches the lens L14 of the second optical system 32 as the focal position P is separate away from the optical axis.

Data on the projection system 3F according to Example 6 are listed below,

| | |
|---|---|
| f0 | −11.13 mm |
| FNo | 2.19 |
| Φ | 56.40 mm |
| BF | 95.07 mm |
| fLU1 | 16.20 mm |
| fLU2 | −1094.40 mm | where f0 represents the focal length of the entire projection system 3F, FNo represents the F-number, Φ represents the effective image circle diameter, BF represents the back focal length in air, fLU1 represents the focal length of the first optical system 31, and fLU2 represents the focal length of the second optical system 32.

Data on the lenses of the projection system 3F are listed below. The surfaces of the lenses are numbered sequentially from the enlargement side toward the reduction side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspheric surface has a surface number followed by *. Reference character R represents the radius of curvature. Reference character D represents the on-axis inter-surface distance. Reference character nd represents the refractive index. Reference character vd represents the Abbe number. Reference character f represents the focal length of the lens and is a normalized value resulting from division of the focal length by the focal length f0 of the entire projection system 3F. Reference characters R and D are expressed in millimeters.

| Reference character | Surface number | r | d | nd | vd | f |
|---|---|---|---|---|---|---|
| S | 0 | Infinity | 1507.00 | | | |
| L1 | 1* | −151.216 | 7.50 | 1.50919 | 56.32 | 13.27 |
| | 2* | 153.293 | 15.72 | | | |
| L2 | 3 | 108.025 | 3.90 | 1.83481 | 42.74 | 7.84 |
| | 4 | 42.921 | 19.90 | | | |
| L3 | 5 | 168.868 | 3.22 | 1.83481 | 42.74 | 5.65 |
| | 6 | 39.852 | 21.49 | | | |
| L4 | 7 | −67.489 | 2.83 | 1.49700 | 81.61 | 7.90 |
| | 8 | 126.699 | 31.90 | | | |
| L5 | 9 | 343.987 | 9.93 | 1.88300 | 40.81 | −8.91 |
| | 10 | −116.697 | 0.10 | | | |
| L6 | 11 | 140.347 | 8.59 | 1.88300 | 40.81 | −14.78 |
| | 12 | 3508.367 | 66.83 | | | |
| L7 | 13 | 102.056 | 9.46 | 1.61800 | 63.40 | −5.86 |
| | 14 | −64.597 | 7.44 | | | |
| L8 | 15 | −46.480 | 2.00 | 1.73800 | 32.33 | 4.34 |
| | 16 | 159.924 | 3.90 | | | |
| L9 | 17 | −121.775 | 2.07 | 1.86966 | 20.02 | 7.21 |
| | 18 | 168.975 | 2.97 | | | |
| L10 | 19 | 348.285 | 15.02 | 1.49700 | 81.61 | −7.94 |
| | 20 | −49.724 | 4.80 | | | |
| L11 | 21 | 322.067 | 13.16 | 1.43700 | 95.10 | −12.06 |
| | 22 | −71.040 | 1.00 | | | |
| L12 | 23 | −184.194 | 6.00 | 1.43700 | 95.10 | −41.14 |
| | 24 | −96.985 | 0.76 | | | |
| L13 | 25* | 4032.640 | 8.09 | 1.58699 | 59.48 | −17.76 |
| | 26* | −119.835 | 164.62 | | | |
| L14 | 27 | Infinity | 13.30 | 1.83481 | 42.72 | −14.63 |
| | 28 | −136.631 | 36.31 | | | |
| L15 | 29 | −174.092 | 7.61 | 1.73800 | 32.33 | 9.55 |
| | 30 | 147.396 | 9.28 | | | |

-continued

| Reference character | Surface number | r | d | nd | vd | f |
|---|---|---|---|---|---|---|
| L16 | 31 | −456.450 | 10.97 | 1.83481 | 42.72 | −12.42 |
|  | 32 | −93.496 | 59.77 |  |  |  |
| L17 | 33 | −115.396 | 9.34 | 1.43700 | 95.10 | −42.76 |
|  | 34 | −76.118 | 113.25 |  |  |  |
| OP | 35 | Infinity | 28.94 |  |  |  |
| L18 | 36 | −2435.763 | 4.33 | 1.48749 | 70.24 | −44.91 |
|  | 37 | −222.318 | 11.94 |  |  |  |
| L19 | 38 | 132.168 | 11.25 | 1.43700 | 95.10 | −10.42 |
|  | 39 | −80.428 | 4.16 |  |  |  |
| L20 | 40 | −72.753 | 2.01 | 1.73800 | 32.33 | 8.80 |
|  | 41 | 746.257 | 7.81 |  |  |  |
| L21 | 42 | 57.145 | 11.75 | 1.43700 | 95.10 | −11.72 |
|  | 43 | −364.451 | 0.46 |  |  |  |
| L22 | 44 | −282.772 | 4.79 | 1.73800 | 32.33 | 6.68 |
|  | 45 | 69.140 | 11.37 |  |  |  |
| L23 | 46 | 526.612 | 7.75 | 1.43700 | 95.10 | −22.69 |
|  | 47 | −139.459 | 10.85 |  |  |  |
| L24 | 48 | 205.826 | 4.11 | 1.86966 | 20.02 | −26.39 |
|  | 49 | 1005.913 | 15.95 |  |  |  |
| L25 | 50 | −508.165 | 6.80 | 1.86966 | 20.02 | −15.12 |
|  | 51 | −115.320 | 15.00 |  |  |  |
| 19 | 52 | Infinity | 70.00 | 1.51680 | 64.20 |  |
|  | 53 | Infinity | 33.98 |  |  |  |
| 18 |  | Infinity | 0.00 |  |  |  |

The aspheric coefficients are listed below.

| Surface number | 1 | 2 |
|---|---|---|
| Conic constant | −113.4845 | 1.9368 |
| Third-order aspheric coefficient | 1.365646E−04 | 1.860301E−04 |
| Fourth-order aspheric coefficient | −6.427818E−07 | −5.408699E−07 |
| Fifth-order aspheric coefficient | −1.558146E−08 | −2.181796E−08 |
| Sixth-order aspheric coefficient | 1.019665E−10 | −1.781881E−10 |
| Seventh-order aspheric coefficient | 2.648913E−12 | 7.064061E−13 |
| Eighth-order aspheric coefficient | −1.815960E−14 | 9.978711E−15 |
| Ninth-order aspheric coefficient | −7.223763E−17 | 9.847036E−16 |
| Tenth-order aspheric coefficient | 1.847902E−19 | −3.622483E−18 |
| Eleventh-order aspheric coefficient | 5.023282E−22 | 1.020015E−19 |
| Twelfth-order aspheric coefficient | −5.656668E−23 | −2.949407E−21 |
| Thirteenth-order aspheric coefficient | 1.147770E−24 | −3.428805E−23 |
| Fourteenth-order aspheric coefficient | 1.397413E−26 | 1.666800E−25 |
| Fifteenth-order aspheric coefficient | −1.426149E−28 | 1.035956E−26 |
| Sixteenth-order aspheric coefficient | 6.818235E−31 | −5.880761E−29 |
| Seventeenth-order aspheric coefficient | −1.114623E−32 | −1.180453E−31 |
| Eighteenth-order aspheric coefficient | 8.721165E−35 | −1.677796E−34 |

| Surface number | 25 | 26 |
|---|---|---|
| Conic constant | 0 | 0 |
| Fourth-order aspheric coefficient | 2.452111E−06 | 4.477898E−06 |
| Sixth-order aspheric coefficient | −2.337038E−09 | −2.779232E−09 |
| Eighth-order aspheric coefficient | −5.625725E−13 | −2.518025E−13 |
| Tenth-order aspheric coefficient | 1.121373E−15 | 1.229363E−16 |
| Twelfth-order aspheric coefficient | −1.570682E−18 | 7.790074E−21 |
| Fourteenth-order aspheric coefficient | 1.095277E−21 | 1.234944E−22 |
| Sixteenth-order aspheric coefficient | −1.721461E−25 | 2.426206E−26 |
| Eighteenth-order aspheric coefficient | −4.271688E−29 | −4.054337E−29 |
| Twentieth-order aspheric coefficient | 4.227161E−33 | 6.079880E−33 |

The projection system 3F according to the present example satisfies Conditional Expression (1) below, $$-0.5 < fLU2G3/fLU2G2 < 0 \quad (1)$$

where fLU2G2 represents the focal length of the second lens group G2 in the second optical system 32, and fLU2G3 represents the focal length of the third lens group G3 in the second optical system 32.

That is, in the present example, $$fLU2G2 = -365.19, \text{ and}$$

$$fLU2G3 = 84.18$$

are satisfied, and $$fLU2G3/fLU2G2 = -0.23$$

is satisfied.

The projection system 3F according to the present example satisfies Conditional Expression (2) below, $$|fs1/f0| > 10 \quad (2)$$

where fs1 represents the focal length of the lens L18, and f0 represents the focal length of the entire projection system 3F.

That is, in the present example, $$fs1 = 500.00, \text{ and}$$

$$f0 = -11.13$$

are satisfied, and $$|fs1/f0| = 44.91$$

is satisfied.

Furthermore, the projection system 3F according to the present example includes the lens L6, which is located on the enlargement side of the intersection position C1, where the chief ray La of the off-axis beam having the maximum angle of view intersects with the optical axis N in the first optical system 31, and is adjacent to the intersection position C1, and satisfies Conditional Expression (3) below, $$|Ra2/Ra1| > 9 \quad (3)$$

where Ra1 represents the enlargement-side radius of curvature of the lens L6, and Ra2 represents the reduction-side radius of curvature of the lens L6.

That is, in the present example, $$Ra1 = 140.35, \text{ and}$$

$$Ra2 = 3508.37$$

are satisfied, and $$|Ra2/Ra1| = 25.00$$

is satisfied.

The projection system 3F according to the present example satisfies Conditional Expression (4) below, $$0.4 < FLU1\text{ave}/FLU2\text{ave} < 0.9 \qquad (4)$$

where the focal length of each of the lenses that form the first optical system 31 and the second optical system 32 is divided by the focal length f0 of the entire projection system 3F to normalize the focal length, FLU1ave representing the average of the absolute values of the focal lengths of the lenses in the first optical system 31, and FLU2ave representing the average of the absolute values of the focal lengths of the lenses in the second optical system 32.

That is, in the present example, $$FLU1\text{ave} = 11.90, \text{ and}$$

$$FLU2\text{ave} = 18.84$$

are satisfied, and $$FLU1\text{ave}/FLU2\text{ave} = 0.63$$

is satisfied.

Furthermore, in the present example, in the third lens group G3, the Abbe number of the lens L25, which is located in a position closest to the reduction side, and the Abbe number of the lens L24, which is located in a position adjacent to the lens L25, are each smaller than 30. That is, the Abbe number of the lens L24 is 20.02, and the Abbe number of the lens L25 is 20.02.

Effects and Advantages

Figure 19:
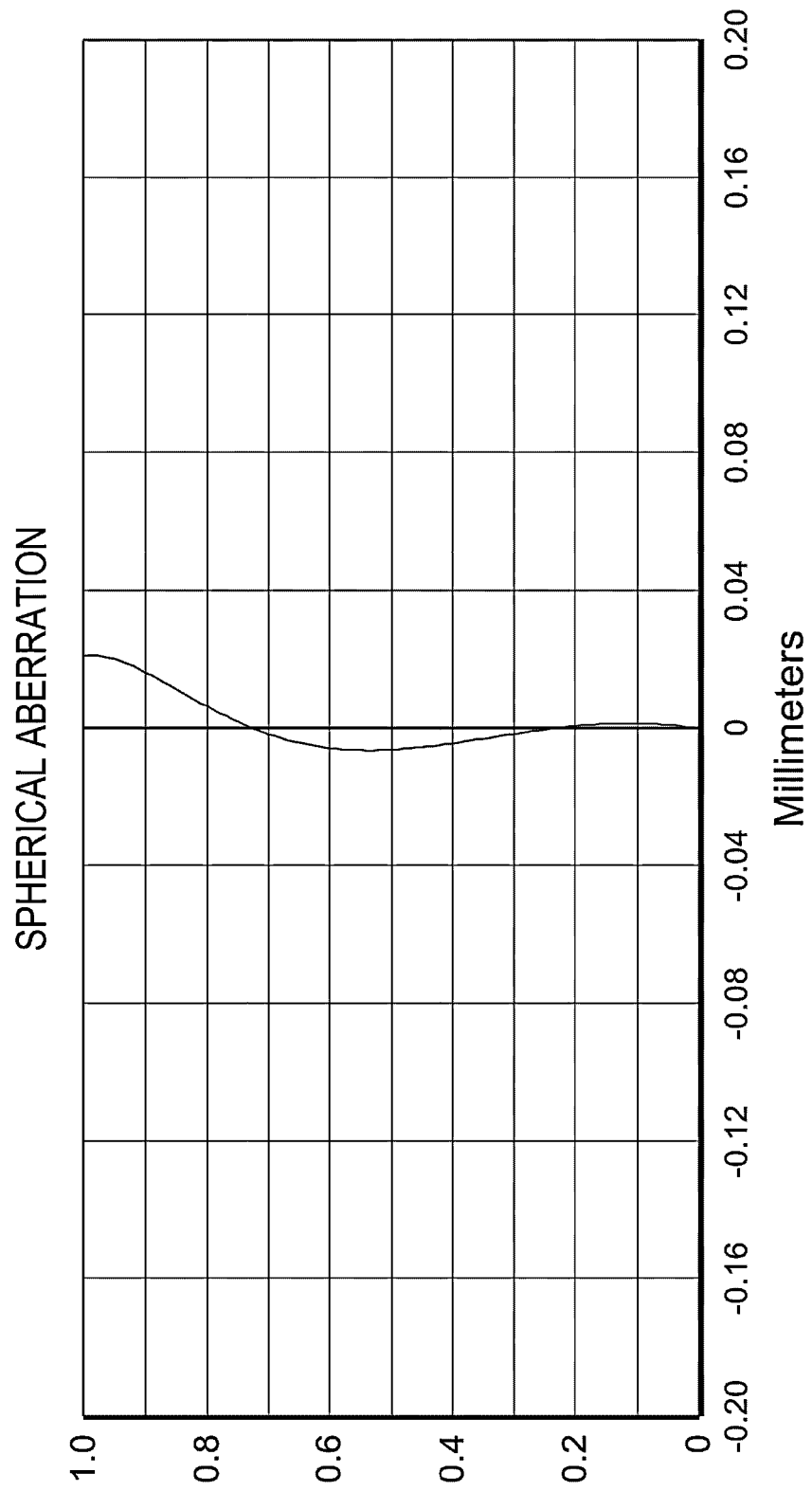
FIG. 19 shows the spherical aberration produced by the projection system according to Example 6.
Figure 20:
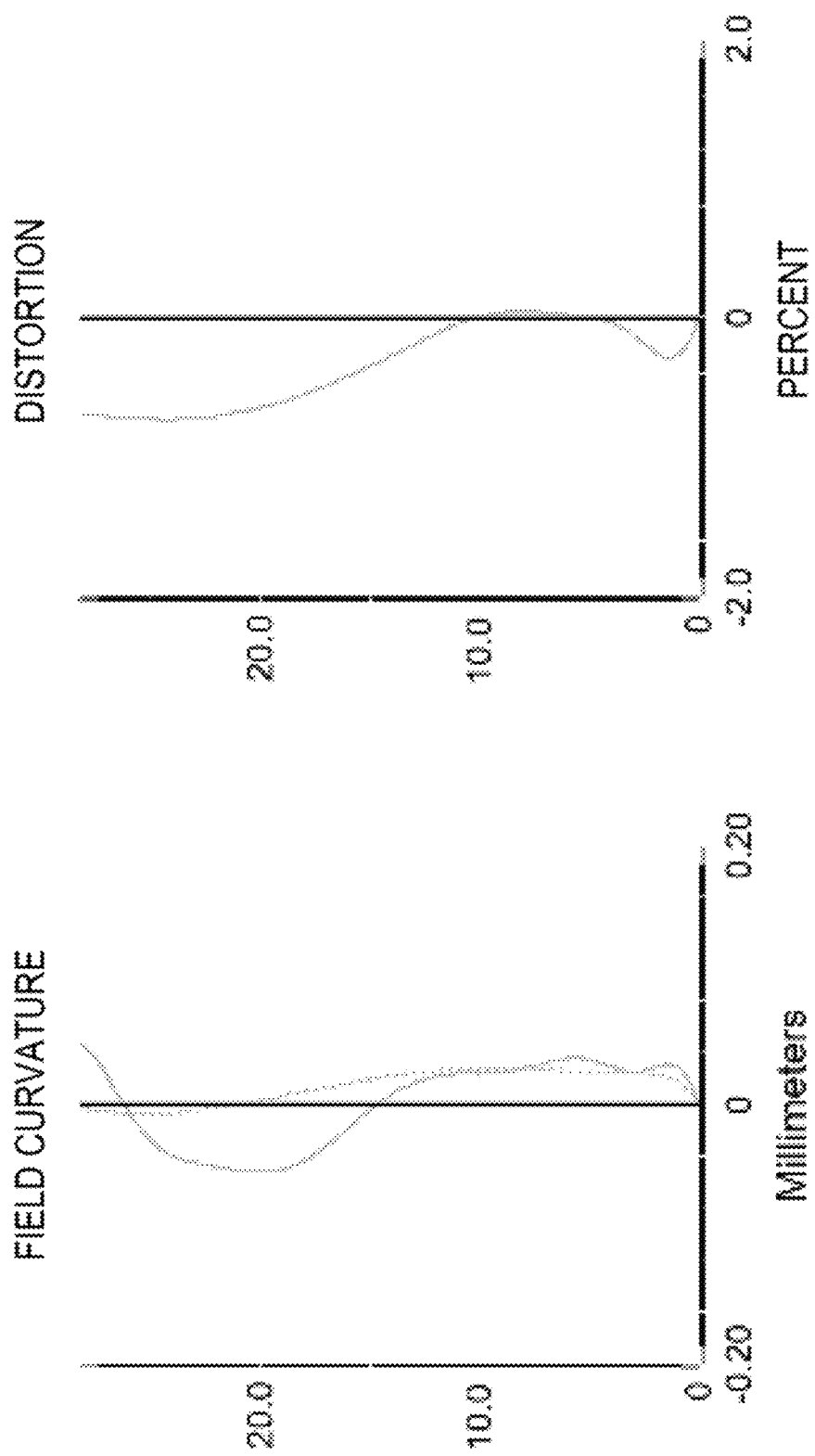
FIG. 20 shows the field curvature and the distortion produced by the projection system according to Example 6.

The projection system 3F according to the present example can provide the same effects and advantages as those provided by the projection system 3A according to Example 1. FIG. 19 shows the spherical aberration produced by the projection system 3F. FIG. 20 shows the field curvature and the distortion produced by the projection system 3F. The spherical aberration, the field curvature, and the distortion produced by the projection system 3F according to the present example are suppressed, as shown in FIGS. 19 and 20.

Variation of Example 6

The projection system 3F can include a first mirror (first deflector) and a second mirror (second deflector), which deflect the optical path of the projection system 3F, as the projection system 3A according to the variation of Example 1 can. In this case, a first mirror 33 is disposed between the first optical system 31 and the second optical system 32, and the first mirror 33 is located on the reduction side of the intermediate image 35. A second mirror 34 is disposed between the lens L17 of the second optical system 32 and the lens L18 of the second optical system 32. The second mirror 34 is located on the enlargement side of the aperture OP. The on-axis inter-surface distance between the lenses L17 and L18 is the longest of the plurality of on-axis inter-surface distances between two adjacent lenses in the second optical system 32. The second mirror 34 is therefore readily disposed between lenses L17 and L18.

The projection system 3F according to the variation of Example 6 can also provide the same effects and advantages as those provided by the projection system 3A according to the variation of Example 1.

Example 7

Figure 21:
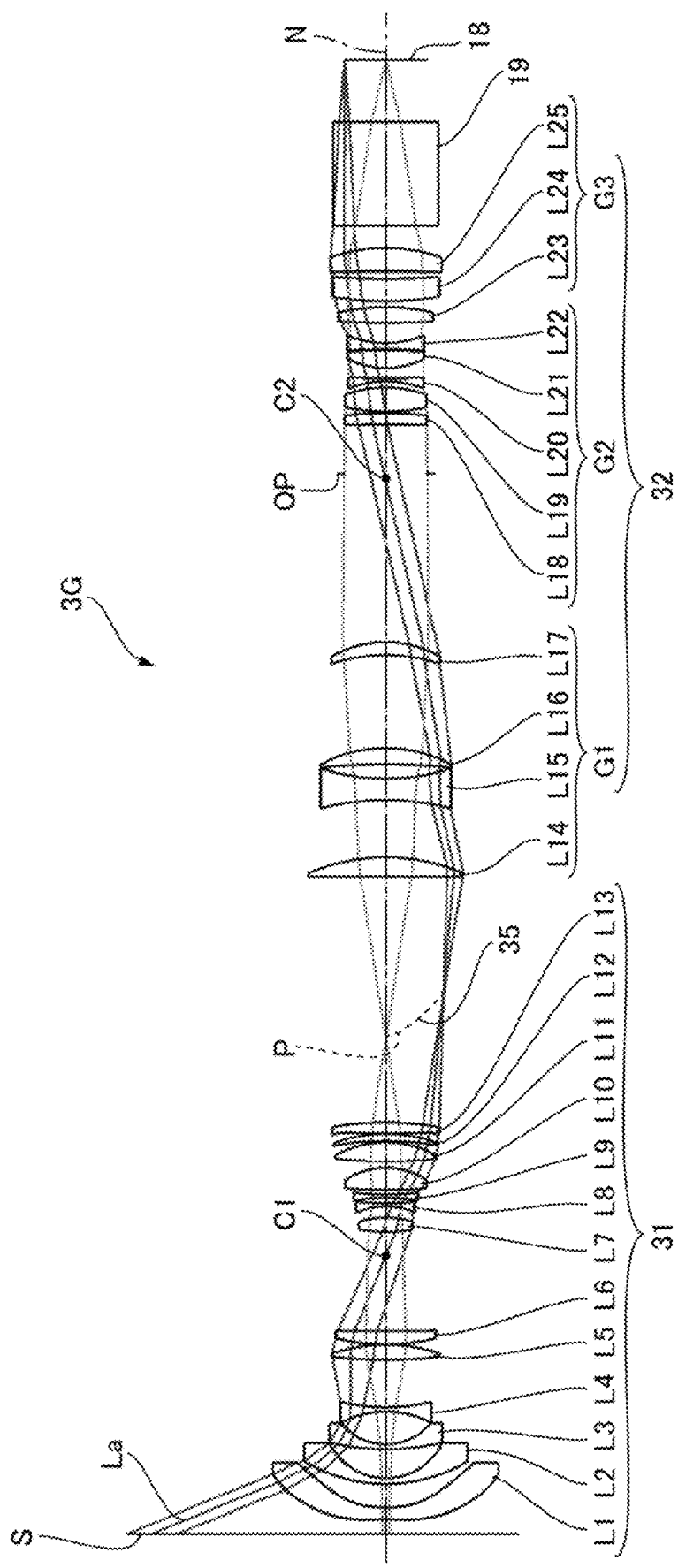
FIG. 21 is a beam diagram of a projection system according to Example 7.

FIG. 21 is a beam diagram of a projection system 3G according to Example 7. The projection system 3G includes a first optical system 31 and a second optical system 32 disposed on the reduction side of the first optical system 31, as shown in FIG. 21. The first optical system 31 has positive power. The second optical system 32 has negative power. An intermediate image 35 conjugate with the reduction-side conjugate plane and the enlargement-side conjugate plane of the projection system 3G is formed between the first optical system 31 and the second optical system 32.

The first optical system 31 includes 13 lenses L1 to L13. The lenses L1 to L13 are arranged in this order from the enlargement side toward the reduction side. The lenses L1 to L13 have the same shapes as those of the lenses of the projection system 3A according to Example 1. Furthermore, the lenses L1 to L13 each have the same power as that of the corresponding lens of the projection system 3A according to Example 1.

In the first optical system 31, there is therefore an intersection position C1, where a chief ray La of an off-axis beam having a maximum angle of view intersects with an optical axis N, between the lens L6 and the lens L7. In the first optical system 31, the lens L6, which is on the enlargement side of and adjacent to the intersection position C1, has a meniscus shape having a convex surface on the enlargement side. The lens L6 has positive power.

The second optical system 32 accommodates an aperture OP. In the present example, the aperture OP is disposed in an intersection position C2, where the chief ray La of the off-axis beam having the maximum angle of view intersects with the optical axis N in the second optical system 32. The second optical system 32 includes a first lens group G1 disposed on the enlargement side of the intersection position C2, a second lens group G2 disposed on the reduction side of the intersection position C2, and a third lens group G3 disposed on the reduction side of the second lens group G2. In more detail, the second lens group G2 is disposed in a position on the reduction side of and adjacent to the intersection position C2. The second lens group G2 includes a lens L18, a lens L19, a lens L20, a lens L21, and a lens L22 arranged sequentially from the enlargement side toward the reduction side. The number of lenses of the second lens group G2 is five. The lenses L18 and L19 each have positive power. The lens L20 has negative power. The lens L21 has convex surfaces on the enlargement and reduction sides. The lens L21 has positive power. The lens L22 has negative power.

The third lens group G3 is located between the second lens group G2 and a cross dichroic prism 19. The third lens group G3 includes a lens L23, a lens L24, and a lens L25 arranged sequentially from the enlargement side toward the reduction side. The lenses L23, L24, and L25 all have positive power. The number of lenses that form the third lens group G3 is three. The sum of the number of lenses of the second lens group G2 and the number of lenses of the third lens group G3 is therefore eight.

Liquid crystal panels 18 form images on one side of the optical axis N. The intermediate image 35 is formed on the other side of the optical axis N. The enlarged image is formed on the one side of the optical axis N. The chief ray La of the off-axis beam, which passes through the space between the lens L13 of the first optical system 31 and the lens L14 of the second optical system 32, which are lenses located on opposite sides of the intermediate image 35 in the direction of the optical axis N, approaches the optical axis N as the chief ray La travels from the reduction side toward the enlargement side, as shown in FIG. 21. A focal position P, where the off-axis beam is brought into focus in the intermediate image 35, approaches the lens L14 of the second optical system 32 as the focal position P is separate away from the optical axis.

Data on the projection system 3G according to Example 7 are listed below,

| | |
|---|---|
| f0 | −11.17 mm |
| FNo | 2.18 |
| Φ | 56.40 mm |
| BF | 102.66 mm |
| fLU1 | 16.07 mm |
| fLU2 | −901.91 mm | where f0 represents the focal length of the entire projection system 3G, FNo represents the F-number, Φ represents the effective image circle diameter, BF represents the back focal length in air, fLU1 represents the focal length of the first optical system 31, and fLU2 represents the focal length of the second optical system 32.

Data on the lenses of the projection system 3G are listed below. The surfaces of the lenses are numbered sequentially from the enlargement side toward the reduction side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspheric surface has a surface number followed by *. Reference character R represents the radius of curvature. Reference character D represents the on-axis inter-surface distance. Reference character nd represents the refractive index. Reference character vd represents the Abbe number. Reference character f represents the focal length of the lens and is a normalized value resulting from division of the focal length by the focal length f0 of the entire projection system 3G. Reference characters R and D are expressed in millimeters.

| Reference character | Surface number | r | d | nd | vd | f |
|---|---|---|---|---|---|---|
| S | 0 | Infinity | 1507.00 | | | |
| L1 | 1* | −152.761 | 7.53 | 1.50919 | 56.32 | 13.29 |
| | 2* | 153.340 | 15.73 | | | |
| L2 | 3 | 107.614 | 3.91 | 1.83481 | 42.74 | 7.85 |
| | 4 | 42.974 | 19.69 | | | |
| L3 | 5 | 170.226 | 3.25 | 1.83481 | 42.74 | 5.67 |
| | 6 | 40.134 | 21.88 | | | |
| L4 | 7 | −68.478 | 2.85 | 1.49700 | 81.61 | 7.99 |
| | 8 | 128.472 | 32.02 | | | |
| L5 | 9 | 341.550 | 10.27 | 1.88300 | 40.81 | −8.82 |
| | 10 | −115.972 | 0.10 | | | |
| L6 | 11 | 138.435 | 8.87 | 1.88300 | 40.81 | −15.38 |
| | 12 | 1453.520 | 66.60 | | | |
| L7 | 13 | 102.410 | 9.57 | 1.61800 | 63.40 | −5.84 |
| | 14 | −64.511 | 7.61 | | | |
| L8 | 15 | −46.821 | 2.00 | 1.73800 | 32.33 | 4.33 |
| | 16 | 157.917 | 3.78 | | | |
| L9 | 17 | −123.688 | 2.04 | 1.86966 | 20.02 | 7.28 |
| | 18 | 170.819 | 3.13 | | | |
| L10 | 19 | 336.960 | 14.98 | 1.49700 | 81.61 | −7.93 |
| | 20 | −50.026 | 4.24 | | | |
| L11 | 21 | 307.690 | 12.87 | 1.43700 | 95.10 | −12.02 |
| | 22 | −71.808 | 0.99 | | | |
| L12 | 23 | −193.124 | 4.83 | 1.43700 | 95.10 | −41.60 |
| | 24 | −99.852 | 0.20 | | | |
| L13 | 25* | 2650.369 | 7.51 | 1.58699 | 59.48 | −17.91 |
| | 26* | −123.204 | 164.81 | | | |
| L14 | 27 | Infinity | 13.12 | 1.83481 | 42.72 | −14.57 |
| | 28 | −136.592 | 38.64 | | | |
| L15 | 29 | −174.720 | 14.31 | 1.73800 | 32.33 | 9.45 |
| | 30 | 147.141 | 9.24 | | | |
| L16 | 31 | −480.954 | 11.07 | 1.83481 | 42.72 | −12.23 |
| | 32 | −93.508 | 62.52 | | | |
| L17 | 33 | −115.734 | 8.71 | 1.43700 | 95.10 | −42.25 |
| | 34 | −75.896 | 113.20 | | | |
| OP | 35 | Infinity | 32.69 | | | |
| L18 | 36 | −1532.789 | 7.92 | 1.48749 | 70.24 | −55.47 |
| | 37 | −253.423 | 1.00 | | | |
| L19 | 38 | 131.051 | 16.29 | 1.43700 | 95.10 | −10.34 |
| | 39 | −79.321 | 4.06 | | | |
| L20 | 40 | −70.652 | 2.01 | 1.73800 | 32.33 | 8.51 |
| | 41 | 703.598 | 7.00 | | | |
| L21 | 42 | 57.077 | 11.82 | 1.43700 | 95.10 | −11.67 |
| | 43 | −386.993 | 0.83 | | | |
| L22 | 44 | −276.142 | 4.22 | 1.73800 | 32.33 | 6.65 |
| | 45 | 69.348 | 13.49 | | | |
| L23 | 46 | 538.642 | 10.53 | 1.43700 | 95.10 | −23.68 |
| | 47 | −146.704 | 3.91 | | | |
| L24 | 48 | 203.210 | 15.09 | 1.85451 | 25.15 | −34.86 |
| | 49 | 497.451 | 5.01 | | | |
| L25 | 50 | −1187.710 | 15.41 | 1.86966 | 20.02 | −12.95 |
| | 51 | −115.497 | 15.00 | | | |
| 19 | 52 | Infinity | 70.00 | 1.51680 | 64.20 | |
| | 53 | Infinity | 41.56 | | | |
| 18 | | Infinity | 0.00 | | | |

The aspheric coefficients are listed below.

| Surface number | 1 | 2 |
|---|---|---|
| Conic constant | −114.9751 | 1.9329 |
| Third-order aspheric coefficient | 1.367549E−04 | 1.861171E−04 |
| Fourth-order aspheric coefficient | −6.436623E−07 | −5.405512E−07 |
| Fifth-order aspheric coefficient | −1.559885E−08 | −2.182088E−08 |
| Sixth-order aspheric coefficient | 1.018000E−10 | −1.781974E−10 |
| Seventh-order aspheric coefficient | 2.649989E−12 | 7.089035E−13 |
| Eighth-order aspheric coefficient | −1.813482E−14 | 1.001667E−14 |
| Ninth-order aspheric coefficient | −7.222037E−17 | 9.857217E−16 |
| Tenth-order aspheric coefficient | 1.882934E−19 | −3.616643E−18 |
| Eleventh-order aspheric coefficient | 5.303331E−22 | 1.021554E−19 |
| Twelfth-order aspheric coefficient | −5.619013E−23 | −2.945579E−21 |
| Thirteenth-order aspheric coefficient | 1.144556E−24 | −3.428363E−23 |
| Fourteenth-order aspheric coefficient | 1.399817E−26 | 1.665779E−25 |
| Fifteenth-order aspheric coefficient | −1.429990E−28 | 1.036005E−26 |
| Sixteenth-order aspheric coefficient | 6.810748E−31 | −5.887774E−29 |
| Seventeenth-order aspheric coefficient | −1.122062E−32 | −1.198372E−31 |
| Eighteenth-order aspheric coefficient | 8.544183E−35 | −2.068852E−34 |

| Surface number | 25 | 26 |
|---|---|---|
| Conic constant | 0 | 0 |
| Fourth-order aspheric coefficient | 2.429166E−06 | 4.492833E−06 |
| Sixth-order aspheric coefficient | −2.341389E−09 | −2.777026E−09 |
| Eighth-order aspheric coefficient | −5.612907E−13 | −2.525855E−13 |
| Tenth-order aspheric coefficient | 1.122402E−15 | 1.226244E−16 |

-continued

| | | |
|---|---|---|
| Twelfth-order aspheric coefficient | −1.570154E−18 | 7.684732E−21 |
| Fourteenth-order aspheric coefficient | 1.095334E−21 | 1.240795E−22 |
| Sixteenth-order aspheric coefficient | −1.721408E−25 | 2.482614E−26 |
| Eighteenth-order aspheric coefficient | −4.252996E−29 | −4.008319E−29 |
| Twentieth-order aspheric coefficient | 4.690821E−33 | 6.223394E−33 |

The projection system 3G according to the present example satisfies Conditional Expression (1) below, $$-0.5 < fLU2G3/fLU2G2 < 0 \quad (1)$$

where fLU2G2 represents the focal length of the second lens group G2 in the second optical system 32, and fLU2G3 represents the focal length of the third lens group G3 in the second optical system 32.

That is, in the present example, $$fLU2G2 = -283.07, \text{ and}$$

$$fLU2G3 = 82.93$$

are satisfied, and $$fLU2G3/fLU2G2 = -0.29$$

is satisfied.

The projection system 3G according to the present example satisfies Conditional Expression (2) below, $$|fs1/f0| > 10 \quad (2)$$

where fs1 represents the focal length of the lens L18, and f0 represents the focal length of the entire projection system 3G.

That is, in the present example, $$fs1 = 619.67, \text{ and}$$

$$f0 = -11.17$$

are satisfied, and $$|fs1/f0| = 55.47$$

is satisfied.

Furthermore, the projection system 3G according to the present example includes the lens L6, which is located on the enlargement side of the intersection position C1, where the chief ray La of the off-axis beam having the maximum angle of view intersects with the optical axis N in the first optical system 31, and is adjacent to the intersection position C1, and satisfies Conditional Expression (3) below, $$|Ra2/Ra1| > 9 \quad (3)$$

where Ra1 represents the enlargement-side radius of curvature of the lens L6, and Ra2 represents the reduction-side radius of curvature of the lens L6.

That is, in the present example, $$Ra1 = 138.43, \text{ and}$$

$$Ra2 = 1453.52$$

are satisfied, and $$|Ra2/Ra1| = 10.50$$

is satisfied.

The projection system 3G according to the present example satisfies Conditional Expression (4) below, $$0.4 < FLU1\text{ave}/FLU2\text{ave} < 0.9 \quad (4)$$

where the focal length of each of the lenses that form the first optical system 31 and the second optical system 32 is divided by the focal length f0 of the entire projection system 3G to normalize the focal length, FLU1ave representing the average of the absolute values of the focal lengths of the lenses in the first optical system 31, and FLU2ave representing the average of the absolute values of the focal lengths of the lenses in the second optical system 32.

That is, in the present example, $$FLU1\text{ave} = 11.99, \text{ and}$$

$$FLU2\text{ave} = 20.22$$

are satisfied, and $$FLU1\text{ave}/FLU2\text{ave} = 0.59$$

is satisfied.

Furthermore, in the present example, in the third lens group G3, the Abbe number of the lens L25, which is located in a position closest to the reduction side, and the Abbe number of the lens L24, which is located in a position adjacent to the lens L25, are each smaller than 30. That is, the Abbe number of the lens L24 is 25.15, and the Abbe number of the lens L25 is 20.02.

Effects and Advantages

Figure 22:
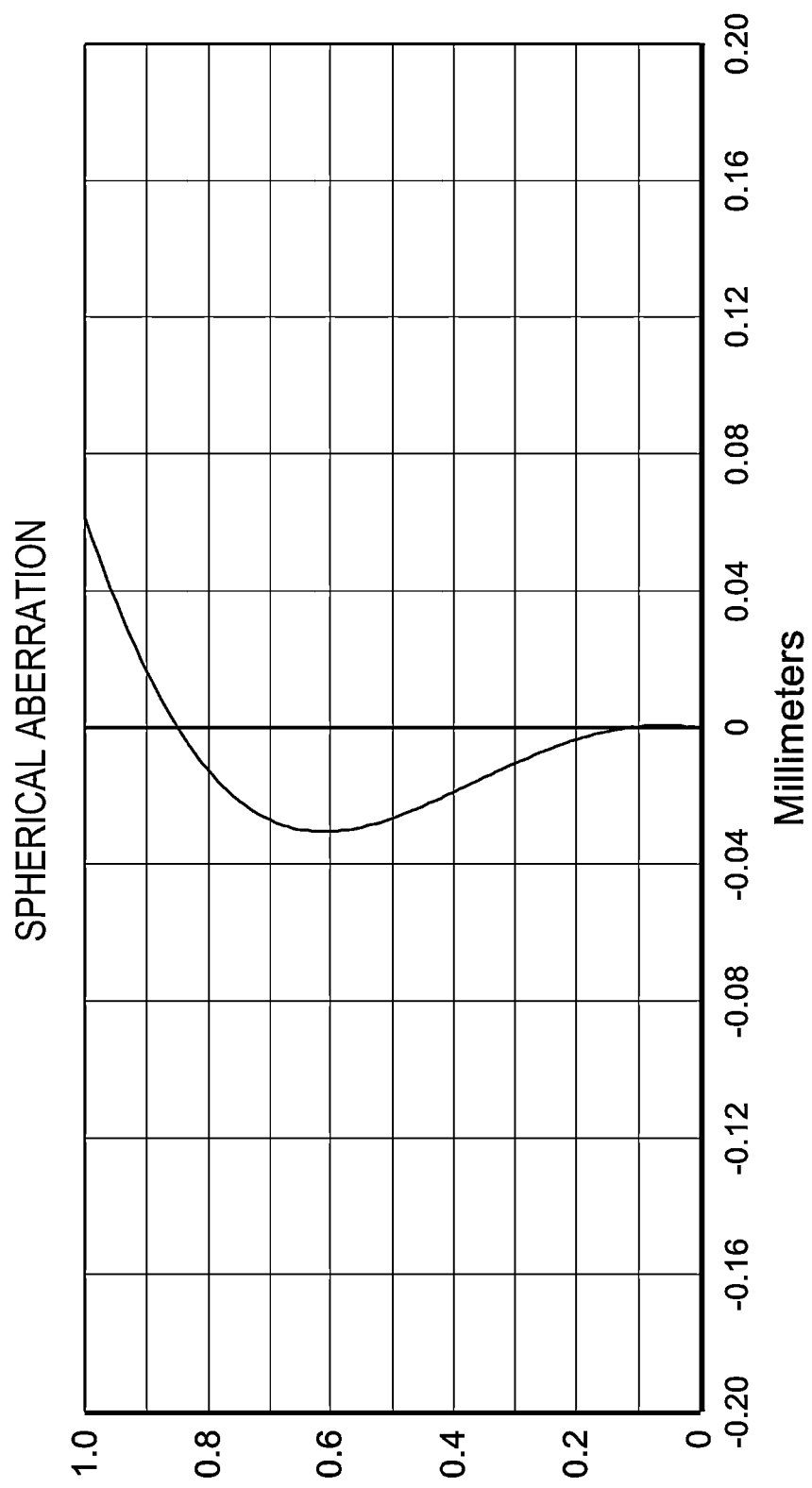
FIG. 22 shows the spherical aberration produced by the projection system according to Example 7.
Figure 23:
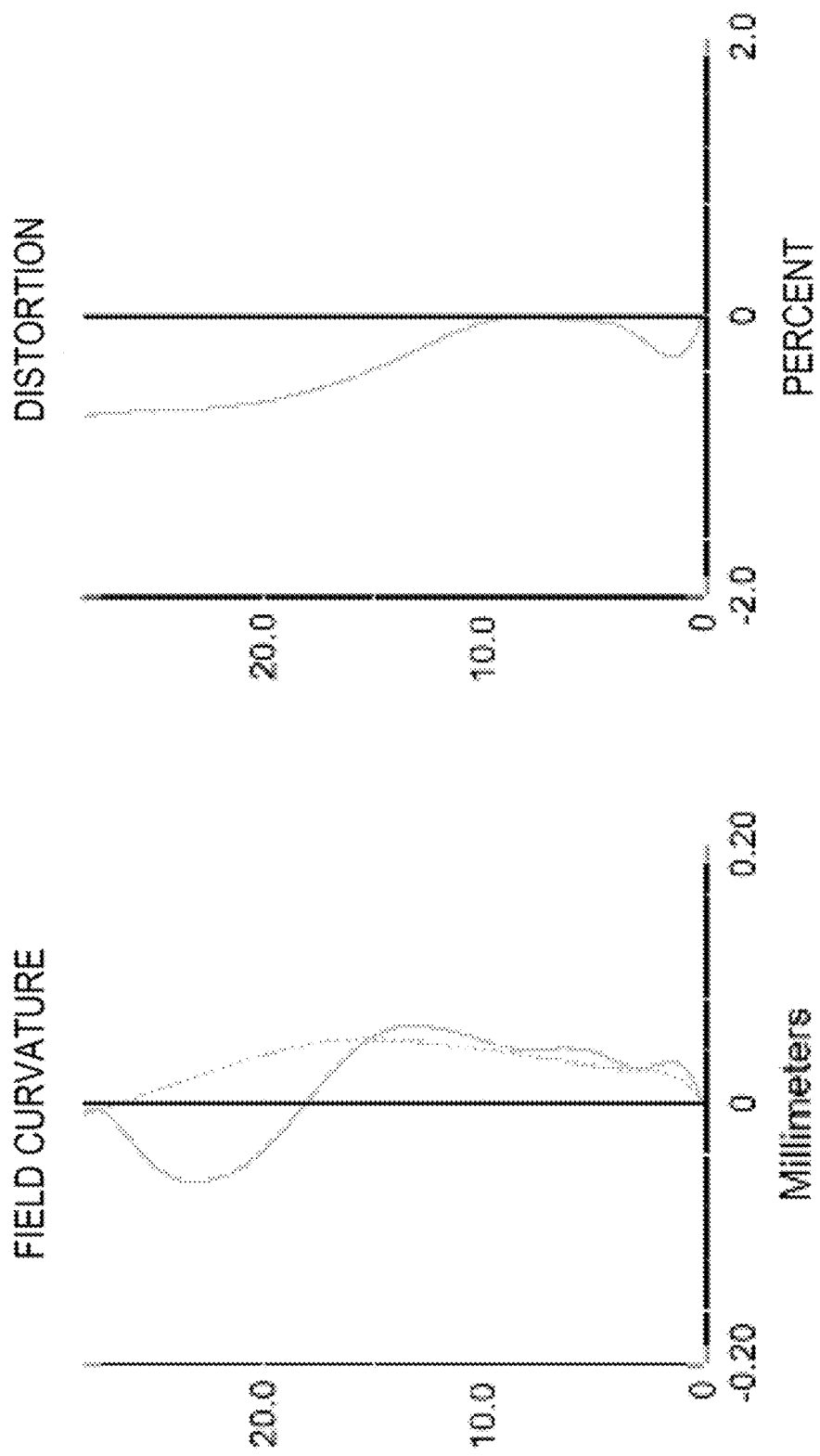
FIG. 23 shows the field curvature and the distortion produced by the projection system according to Example 7.

The projection system 3G according to the present example can provide the same effects and advantages as those provided by the projection system 3A according to Example 1. FIG. 22 shows the spherical aberration produced by the projection system 3G. FIG. 23 shows the field curvature and the distortion produced by the projection system 3G. The spherical aberration, the field curvature, and the distortion produced by the projection system 3G according to the present example are suppressed, as shown in FIGS. 22 and 23.

Variation of Example 7

The projection system 3G can include a first mirror (first deflector) and a second mirror (second deflector), which deflect the optical path of the projection system 3G, as the projection system 3A according to the variation of Example 1 can. In this case, a first mirror 33 is disposed between the first optical system 31 and the second optical system 32, and the first mirror 33 is located on the reduction side of the intermediate image 35. A second mirror 34 is disposed between the lens L17 of the second optical system 32 and the lens L18 of the second optical system 32. The second mirror 34 is located on the enlargement side of the aperture OP. The on-axis inter-surface distance between the lenses L17 and L18 is the longest of the plurality of on-axis inter-surface distances between two adjacent lenses in the second optical system 32. The second mirror 34 is therefore readily disposed between lenses L17 and L18.

The projection system 3G according to the variation of Example 7 can also provide the same effects and advantages as those provided by the projection system 3A according to the variation of Example 1.

Other Embodiments

In each of Examples, the third lens group G3 may include a compound lens having positive power. When the number of lenses in the third lens group G3 is counted, the compound lens is counted as one lens.

In each of Examples, the aperture OP is disposed in a position corresponding to the intersection position C2, where the chief ray La of the off-axis beam having the maximum angle of view intersects with the optical axis N in the second optical system 32, but not necessarily. The aperture OP may be disposed in a position different from the intersection position C2, or the aperture OP may be omitted.

What is claimed is:

1. A projection system comprising:
   a first optical system having positive power; and
   a second optical system disposed on a reduction side of the first optical system,
   wherein an intermediate image conjugate with an enlargement-side conjugate plane and a reduction-side conjugate plane of the projection system is formed between the first optical system and the second optical system,
   the second optical system includes
   a first lens group disposed on the enlargement side of a first intersection position where a chief ray of an off-axis beam having a maximum angle of view intersects with an optical axis of the projection system in the second optical system,
   a second lens group disposed on the reduction side of the first intersection position and having negative power, and
   a third lens group disposed on the reduction side of the second lens group and having positive power,
   the second lens group includes a first lens having positive power, a second lens disposed on the reduction side of the first lens and having positive power, and a third lens disposed on the reduction side of the second lens and having negative power,
   the third lens group includes two lenses each having positive power, and
   a conditional expression (1) below is satisfied, $$-0.5 < fLU2G3/fLU2G2 < 0 \quad (1)$$

where fLU2G2 is a focal length of the second lens group, and fLU2G3 is a focal length of the third lens group.

2. The projection system according to claim 1, further comprising:
   a first deflector disposed between the first optical system and the second optical system; and
   a second deflector disposed in the second optical system.

3. The projection system according to claim 1,
   wherein the first optical system includes a fourth lens disposed in a position closest to the intermediate image in the first optical system and a fifth lens disposed in a position closest to the intermediate image in the second optical system, and
   the chief ray of the off-axis beam having the maximum angle of view that passes through a space between the fourth lens and the fifth lens approaches the optical axis as the chief ray travels from the reduction side to the enlargement side.

4. The projection system according to claim 1,
   wherein a focal position where the off-axis beam is brought into focus in the intermediate image approaches the second optical system as the focal position is separate away from the optical axis.

5. The projection system according to claim 1,
   wherein a conditional expression (2) below is satisfied, $$|fs1/f0| > 10 \quad (2)$$

where fs1 is a focal length of the first lens, and f0 is a focal length of the entire projection system.

6. The projection system according to claim 1,
   wherein the projection system includes no jointed lens.

7. The projection system according to claim 1,
   wherein a sum of the number of lenses of the second lens group and the number of lenses of the third lens group is greater than or equal to seven.

8. The projection system according to claim 1,
   wherein the first optical system includes a sixth lens disposed on the enlargement side of a second intersection position where the chief ray of the off-axis beam having the maximum angle of view intersects with the optical axis in the first optical system, the sixth lens being adjacent to the second intersection position, and
   a conditional expression (3) below is satisfied, $$|Ra2/Ra1| > 9 \quad (3)$$

where Ra1 is an enlargement-side radius of curvature of the sixth lens, and Ra2 is a reduction-side radius of curvature of the sixth lens.

9. The projection system according to claim 1,
   wherein the two lenses of the third lens group are a seventh lens disposed in a position closest to the reduction side and an eighth lens disposed on the enlargement side of the seventh lens and adjacent to the seventh lens,
   the seventh lens and the eighth lens are each a single lens, and Abbe numbers of the seventh lens and the eighth lens are each smaller than 30.

10. The projection system according to claim 1,
    wherein a focal length of each of the lenses that form the first and second optical systems is a normalized value resulting from division of the focal length by a focal length of the entire projection system, and
    a conditional expression (4) below is satisfied, $$0.4 < FLU1\text{ave}/FLU2\text{ave} < 0.9 \quad (4)$$

where FLU1ave is an average of absolute values of the focal lengths of the lenses in the first optical system, and FLU2ave is an average of absolute values of the focal lengths of the lenses in the second optical system.

11. A projector comprising:
    a light modulator modulating light emitted from a light source; and
    the projection system according to claim 1 and projecting the light modulated by the light modulator.

12. A projection system comprising:
    a first optical system having positive power; and
    a second optical system disposed on a reduction side of the first optical system,
    wherein an intermediate image conjugate with an enlargement-side conjugate plane and a reduction-side conjugate plane of the projection system is formed between the first optical system and the second optical system,
    the second optical system includes
    a first lens group disposed on the enlargement side of a first intersection position where a chief ray of an off-axis beam having a maximum angle of view intersects with an optical axis of the projection system in the second optical system,
    a second lens group disposed on the reduction side of the first intersection position and having negative power, and a third lens group disposed on the reduction side of the second lens group and having positive power, the second lens group includes a first lens having positive power, a second lens disposed on the reduction side of the first lens and having positive power, and a third lens disposed on the reduction side of the second lens and having negative power, the third lens group includes two lenses each having positive power, and a conditional expression (2) below is satisfied, $$|fs1/f0|>10 \qquad (2)$$

where fs1 is a focal length of the first lens, and f0 is a focal length of the entire projection system.

13. A projection system comprising:

a first optical system having positive power; and a second optical system disposed on a reduction side of the first optical system, wherein an intermediate image conjugate with an enlargement-side conjugate plane and a reduction-side conjugate plane of the projection system is formed between the first optical system and the second optical system, the second optical system includes a first lens group disposed on the enlargement side of a first intersection position where a chief ray of an off-axis beam having a maximum angle of view intersects with an optical axis of the projection system in the second optical system, a second lens group disposed on the reduction side of the first intersection position and having negative power, and a third lens group disposed on the reduction side of the second lens group and having positive power, the second lens group includes a first lens having positive power, a second lens disposed on the reduction side of the first lens and having positive power, and a third lens disposed on the reduction side of the second lens and having negative power, the third lens group includes two lenses each having positive power, the first optical system includes a sixth lens disposed on the enlargement side of a second intersection position where the chief ray of the off-axis beam having the maximum angle of view intersects with the optical axis in the first optical system, the sixth lens being adjacent to the second intersection position, and a conditional expression (3) below is satisfied, $$|Ra2/Ra1|>9 \qquad (3)$$

where Ra1 is an enlargement-side radius of curvature of the sixth lens, and Ra2 is a reduction-side radius of curvature of the sixth lens.

* * * * *